United States Patent
He et al.

(10) Patent No.: US 12,534,762 B2
(45) Date of Patent: Jan. 27, 2026

(54) TREATING ATOPIC DERMATITIS BY TARGETING THE WNT PATHWAY

(71) Applicant: Children's Medical Center Corporation, Boston, MA (US)

(72) Inventors: Xi He, Jamaica Plain, MA (US); Maorong Chen, Jamaica Plain, MA (US)

(73) Assignee: Children's Medical Center Corporation, Boston, MA (US)

( * ) Notice: Subject to any disclaimer, the term of this patent is extended or adjusted under 35 U.S.C. 154(b) by 1302 days.

(21) Appl. No.: 17/280,411

(22) PCT Filed: Sep. 27, 2019

(86) PCT No.: PCT/US2019/053502
§ 371 (c)(1),
(2) Date: Mar. 26, 2021

(87) PCT Pub. No.: WO2020/069344
PCT Pub. Date: Apr. 2, 2020

(65) Prior Publication Data
US 2022/0033904 A1    Feb. 3, 2022

Related U.S. Application Data

(60) Provisional application No. 62/738,182, filed on Sep. 28, 2018.

(51) Int. Cl.
*C12Q 1/6883* (2018.01)
*A61K 45/06* (2006.01)
*A61P 35/00* (2006.01)

(52) U.S. Cl.
CPC .......... *C12Q 1/6883* (2013.01); *A61K 45/06* (2013.01); *A61P 35/00* (2018.01)

(58) Field of Classification Search
CPC . C12Q 1/6883; C12Q 2600/156; A61P 35/00; G01N 2800/52; G01N 33/5041; G01N 2800/202
See application file for complete search history.

(56) References Cited

U.S. PATENT DOCUMENTS

| | | | |
|---|---|---|---|
| 7,652,043 | B2 | 1/2010 | Beachy et al. |
| 2007/0219257 | A1 | 9/2007 | Beachy et al. |
| 2016/0303137 | A1 | 10/2016 | Radovich et al. |

FOREIGN PATENT DOCUMENTS

| | | |
|---|---|---|
| WO | WO 2010/101849 | 9/2010 |
| WO | WO 2013/130364 | 9/2013 |
| WO | WO 2014/175832 | 10/2014 |
| WO | WO 2014/189466 | 11/2014 |
| WO | WO 2015/094118 | 6/2015 |
| WO | WO 2015/094119 | 6/2015 |
| WO | WO 2015/187094 | 12/2015 |

OTHER PUBLICATIONS

Duraiswamy, Athisayamani Jeyaraj, et al. ("Discovery and optimization of a porcupine inhibitor." Journal of medicinal chemistry 58.15 (2015): 5889-5899).*
Ho, Soo Yei, and Thomas H. Keller. ("The use of porcupine inhibitors to target Wnt-driven cancers." Bioorganic & medicinal chemistry letters 25.23 (2015): 5472-5476).*
Alwan et al., "UBPY-mediated epidermal growth factor receptor (EGFR) de-ubiquitination promotes EGFR degradation," Journal of Biological Chemistry, Jan. 19, 2007, 282(3):1658-69.
Blagodatski et al., "Targeting the Wnt pathways for therapies," Molecular and Cellular Therapies, Dec. 2014, 2(1), 15 pages.
Blanpain et al., "Epidermal stem cells of the skin," Annu. Rev. Cell Dev. Biol., Nov. 10, 2006, 22:339-73.
Chen et al., "Pharmacological inhibition of porcupine induces regression of experimental skin fibrosis by targeting Wnt signalling," Annals of the Rheumatic Diseases, Apr. 1, 2017, 76(4):773-8.
Chen et al., "Small molecule-mediated disruption of Wnt-dependent signaling in tissue regeneration and cancer," Nature Chemical Biology, Feb. 2009, 5(2):100-7.
Clevers, "Wnt/β-catenin signaling in development and disease," Cell, Nov. 3, 2006, 127(3):469-80.
De Robertis et al., "Dorsal-ventral patterning and neural induction in Xenopus embryos," Annu. Rev. Cell Dev. Biol., Jun. 2004, 20:285-308.
Dodge et al., "Diverse chemical scaffolds support direct inhibition of the membrane-bound O-acyltransferase porcupine," Journal of Biological Chemistry, Jun. 29, 2012, 287(27):23246-54.
Duraiswamy et al., "Discovery and optimization of a porcupine inhibitor," Journal of Medicinal Chemistry, Aug. 13, 2015, 58(15):5889-99.
Eichenfield et al., "Guidelines of care for the management of atopic dermatitis: section 1. Diagnosis and assessment of atopic dermatitis," Journal of the American Academy of Dermatology, Feb. 1, 2014, 70(2):338-51.
Elias et al., "Mechanisms of abnormal lamellar body secretion and the dysfunctional skin barrier in patients with atopic dermatitis," Journal of Allergy and Clinical Immunology, Oct. 1, 2014, 134(4):781-91.
Emrick et al., "Tissue-specific contributions of Tmem79 to atopic dermatitis and mast cell-mediated histaminergic itch," Proceedings of the National Academy of Sciences, Dec. 18, 2018, 115(51):E12091-100.
Esparza-Gordillo et al., "A common variant on chromosome 11q13 is associated with atopic dermatitis," Nature Genetics, May 2009, 41(5):596-601.
Eubelen et al., "A molecular mechanism for Wnt ligand-specific signaling," Science, Aug. 17, 2018, 361(6403), 77 pages.

(Continued)

Primary Examiner — Kimberly Chong
(74) Attorney, Agent, or Firm — Fish & Richardson P.C.

(57) ABSTRACT

Methods of treating subjects with atopic dermatitis, e.g., associated with mutations in the TMEM79 gene, using Wnt inhibitors, e.g., porcupine inhibitors.

16 Claims, 37 Drawing Sheets
Specification includes a Sequence Listing.

(56) References Cited

OTHER PUBLICATIONS

Gammons et al., "Multiprotein complexes governing Wnt signal transduction," Current Opinion in Cell Biology, Apr. 1, 2018, 51:42-9.

Glinka et al., "Dickkopf-1 is a member of a new family of secreted proteins and functions in head induction," Nature, Jan. 1998, 391(6665):357-62.

Hao et al., "ZNRF3 promotes Wnt receptor turnover in an R-spondin-sensitive manner," Nature, May 2012, 485(7397):195-200.

Heasman et al., "βCatenin signaling activity dissected in the early Xenopus embryo: a novel antisense approach, " Developmental Biology, Jun. 1, 2000, 222(1):124-34.

Ho et al., "The use of porcupine inhibitors to target Wnt-driven cancers," Bioorganic & Medicinal Chemistry Letters, Dec. 1, 2015, 25(23):5472-6.

Houben et al., "A keratinocyte's course of life," Skin Pharmacology and Physiology, Dec. 21, 2007, 20(3):122-32.

Hu et al., "Loss-of-function mutations in filaggrin gene associate with psoriasis vulgaris in Chinese population," Human Genetics, Jul. 2012, 131(7):1269-74.

Irvine et al., "Filaggrin mutations associated with skin and allergic diseases," New England Journal of Medicine, Oct. 6, 2011, 365(14):1315-27.

Jiang et al., "Dishevelled promotes Wnt receptor degradation through recruitment of ZNRF3/RNF43 E3 ubiquitin ligases," Molecular Cell, May 7, 2015, 58(3):522-33.

Jiang et al., "Inactivating mutations of RNF43 confer Wnt dependency in pancreatic ductal adenocarcinoma," Proceedings of the National Academy of Sciences, Jul. 30, 2013, 110(31):12649-54.

Kelleher et al., "Retracted: Skin barrier dysfunction measured by transepidermal water loss at 2 days and 2 months predates and predicts atopic dermatitis at 1 year," Apr. 2015, 135(4), 930-5 e1.

Kim et al., "Ubiquitin-specific protease 8 is a novel prognostic marker in early-stage lung adenocarcinoma," Pathology International, Jun. 2017, 67(6):292-301.

Koo et al., "Tumour suppressor RNF43 is a stem-cell E3 ligase that induces endocytosis of Wnt receptors," Nature, Aug. 2012, 488(7413):665-9.

Liu et al., "Targeting Wnt-driven cancer through the inhibition of Porcupine by LGK974," Proceedings of the National Academy of Sciences, Dec. 10, 2013, 110(50):20224-9.

Ma et al., "Recurrent gain-of-function USP8 mutations in Cushing's disease," Cell Research, Mar. 2015. 25(3):306-17.

MacDonald et al., "Wnt/β-catenin signaling: components, mechanisms, and diseases," Developmental Cell, Jul. 21, 2009, 17(1):9-26.

Madan et al., "Wnt addiction of genetically defined cancers reversed by PORCN inhibition," Oncogene, Apr. 2016, 35(17):2197-207.

Margolis et al., "The persistence of atopic dermatitis and filaggrin (FLG) mutations in a US longitudinal cohort," Journal of Allergy and Clinical Immunology, Oct. 1, 2012, 130(4):912-7.

Mizuno et al., "Regulation of epidermal growth factor receptor down-regulation by UBPY-mediated deubiquitination at endosomes," Molecular Biology of the Cell, Nov. 2005, 16(11):5163-74.

Mukai et al., "Balanced ubiquitylation and deubiquitylation of Frizzled regulate cellular responsiveness to Wg/Wnt," The EMBO Journal, Jul. 7, 2010, 29(13):2114-25.

Nemoto-Hasebe et al., "FLG mutation p. Lys4021X in the C-terminal imperfect filaggrin repeat in Japanese patients with atopic eczema," British Journal of Dermatology, Dec. 2009, 161(6):1387-90.

Niehrs, "Regionally specific induction by the Spemann-Mangold organizer," Nature Reviews Genetics, Jun. 2004, 5(6):425-34.

Niendorf et al., "Essential role of ubiquitin-specific protease 8 for receptor tyrosine kinase stability and endocytic trafficking in vivo," Molecular and Cellular Biology, Jul. 1, 2007, 27(13):5029-39.

Nomura et al., "Unique mutations in the *filaggrin* gene in Japanese patients with ichthyosis vulgaris and atopic dermatitis," Journal of Allergy and Clinical Immunology, Feb. 1, 2007, 119(2):434-40.

Oyoshi et al., "Cellular and molecular mechanisms in atopic dermatitis," Advances in Immunology, Jan. 1, 2009, 102:135-226.

Palmer et al., "Common loss-of-function variants of the epidermal barrier protein filaggrin are a major predisposing factor for atopic dermatitis," Nature Genetics, Apr. 2006, 38(4):441-6.

PCT International Preliminary Report on Patentability in International Appln. No. PCT/US2019/053502, dated Apr. 8, 2021, 11 pages.

PCT International Search Report and Written Opinion in International Appln. No. PCT/US2019/053502, dated Feb. 25, 2020, 15 pages.

Poulsen et al., "Pharmacophore model for Wnt/Porcupine inhibitors and its use in drug design," Journal of Chemical Information and Modeling, Jul. 27, 2015, 55(7):1435-48.

Proffitt et al., "Pharmacological inhibition of the Wnt acyltransferase PORCN prevents growth of WNT-driven mammary cancer," Cancer Research, Jan. 15, 2013, 73(2):502-7.

Reincke et al., "Mutations in the deubiquitinase gene USP8 cause Cushing's disease," Nature Genetics, Jan. 2015, 47(1):31-8.

Row et al., "The ubiquitin isopeptidase UBPY regulates endosomal ubiquitin dynamics and is essential for receptor down-regulation," Journal of Biological Chemistry, May 5, 2006, 281(18):12618-24.

Sandilands et al., "Filaggrin in the frontline: role in skin barrier function and disease," Journal of Cell Science, May 1, 2009, 122(9):1285-94.

Sasaki et al., "A homozygous nonsense mutation in the gene for Tmem79, a component for the lamellar granule secretory system, produces spontaneous eczema in an experimental model of atopic dermatitis, " Journal of Allergy and Clinical Immunology, Nov. 1, 2013, 132(5):1111-20.

Saunders et al., "Tmem79/Matt is the matted mouse gene and is a predisposing gene for atopic dermatitis in human subjects," Journal of Allergy and Clinical Immunology, Nov. 1, 2013, 132(5):1121-9.

Spergel et al., "Atopic dermatitis and the atopic march," Journal of Allergy and Clinical Immunology, Dec. 1, 2003, 112(6):S118-27.

Thomsen, "Atopic dermatitis: natural history, diagnosis, and treatment," International Scholarly Research Notices, Apr. 2014, vol. 2014, 8 pages.

Tollefson et al., "Atopic dermatitis: skin-directed management," Pediatrics, Dec. 1, 2014, 134(6):e1735-44.

Visser et al., "Impact of atopic dermatitis and loss-of-function mutations in the filaggrin gene on the development of occupational irritant contact dermatitis." British Journal of Dermatology, Feb. 2013. 168(2):326-32.

Wang et al., "The development of highly potent inhibitors for porcupine," Journal of Medicinal Chemistry, Mar. 28, 2013, 56(6):2700-4.

Xia et al., "USP8 promotes smoothened signaling by preventing its ubiquitination and changing its subcellular localization," PLoS Biology, Jan. 10, 2012, 10(1):e1001238, 16 pages.

Yan et al., "High expression of ubiquitin-specific protease 8 (USP8) is associated with poor prognosis in patients with cervical squamous cell carcinoma," Medical Science Monitor: International Medical Journal of Experimental and Clinical Research, Jul. 2018, 24:4934.

Yeh et al., "Wnt antagonists target porcupine and Axin," Nature Chemical Biology, Feb. 2009, 5(2):74-5.

Yoshikawa et al., "Transcriptional analysis of hair follicle-derived keratinocytes from donors with atopic dermatitis reveals enhanced induction of IL32 gene by IFN-γ," International Journal of Molecular Sciences, Feb. 2013, 14(2):3215-27.

Zhang et al., "Tiki1 is required for head formation via Wnt cleavage-oxidation and inactivation," Cell, Jun. 22, 2012, 149(7):1565-77.

\* cited by examiner

| | | | |
|---|---|---|---|
| Homo | 1 | MTEQ----------ETL--ALL------------------------------- |
| Pan | 1 | MTEQ----------ETL--ALL------------------------------- |
| Mus | 1 | MTEP----------ETL--ALL------------------------------- |
| Rattus | 1 | MTEP----------ETL--ALL------------------------------- |
| Gallus | 1 | MAAADPTLPPEEV--ALL------------------------------- |
| Xenopus | 1 | MVAP------EAP--EKQRDVDNGVVSESAELPKVTAQPNMNVDQARPIKSNRPLDHGED |
| Danio | 1 | MDKG----------PPGPVAVP------------------------------- |
| Latimeria | 1 | MSAS----------EPL--ATS------------------------------- |
| | | | |
| Homo | 11 | -EVKRS-----DSPEKSSP---------QALVPNGRQPEGEGGAES-------- |
| Pan | 11 | -EVKRS-----DSPEKSSP---------QALVPNGRQPEGEGGAES-------- |
| Mus | 11 | -DMKEP-----ETPEKSPP---------QALVL--QSEEEGGTES-------- |
| Rattus | 11 | -DMKDT-----EISEKSPP---------QASVL--QPEEEGGTES-------- |
| Gallus | 17 | -ELGKA-----APPDEDPP---------A------------------------ |
| Xenopus | 53 | VDRKPTLDPQDSPERKKLKSVGFCEVDISTTLLQ------NGASEDQSCDRSLDSGSLN |
| Danio | 13 | -Q---------TPQ--------------------------------------- |
| Latimeria | 11 | -KA-------------------------------------------------- |

*FIG. 8A*

| | | | |
|---|---|---|---|
| Homo | 42 | ----------------------PG------------- | ---------------AESLRVGSSAGSPTAIEGA |
| Pan | 42 | ----------------------PG------------- | ---------------AESLRVGSSAGSPTAIEGA |
| Mus | 39 | ----------------------PG------------- | ---------------TESLRVGSSVGSPIVREGP |
| Rattus | 39 | ----------------------PG------------- | ---------------AESLRVGSSVGSPTVREGP |
| Gallus | 31 | ------------------------------------- | ---------------------------------- |
| Xenopus | 106 | NDKDIAMDLPESKDQSSPITTGLPLQCRKHSVPTCLCKECVENYLNLNESVEEPHVEEGG | |
| Danio | 17 | ----WV------------------------------- | A---EVDKLTKDVNSTEDE |
| Latimeria | 13 | ------------------------------------- | IKNLDGKKDLNDVG |
| Homo | 63 | EDGLDSTVSEAATL----------------------- | ----PWG-TGPQPS---- |
| Pan | 63 | EDGLDSTVSEAATL----------------------- | ----PWG-TGPQPS---- |
| Mus | 60 | EDGPDSTISEAATL----------------------- | ----PWG-TDPHPS---- |
| Rattus | 60 | EDGPDSTISEAATL----------------------- | ----PWG-TDPHPS---- |
| Gallus | 31 | --PDDGRGDPDATL----------------------- | ----LWD-QRQHGT---- |
| Xenopus | 166 | EDGGDLLCADSLSLDSNLVKSRSGSERSRSLVLLEEDDYGPRY-EDAQVT---- | |
| Danio | 35 | EEPMKSAKMEPSTL----------------------- | ----PWP-ENKPETQIPPVRD---DDKL |
| Latimeria | 27 | EKAENDLIHCSNTL----------------------- | ----EWSGTNPASL-CD---DDKL |

*FIG. 8A (cont)*

```
Homo        86  ------------------------------------------------------------APFPDPPGW-RDI---EP------
Pan         86  ------------------------------------------------------------APFPDPPGW-RDI---EP------
Mus         83  ------------------------------------------------------------APLPDPPGW-RDI---EP------
Rattus      83  ------------------------------------------------------------APLPDPPGW-RDI---GP------
Gallus      52  ------------------------------------------------------------QGQPEPTDTKRRS---SP------
Xenopus    215  ------------------------------------------------------------LPYPDYSKP-PDHITRLSNAGL
Danio       65  ------------------------------------------------------------GETTSVRSDCTSLRGGLSRTESEREEFMMKEKRKTGEDW-REM---EA------
Latimeria   57  NSGKVLANMEPLPAAEE------------EPSGLEKG----ESFVADEGV-KDR---PP------

Homo       100  -EP------PESE----------PLTKLEELPEDDANLLPEKAARAFV-PIDLQ------CIE
Pan        100  -EP------PESE----------PLTKLEELPEDDANLLPEKAARAFV-PIDLQ------CIE
Mus         97  -EP------LESE----------APTKSEEPFKEDANLLPEKTVRAFV-PIDLQ------CIE
Rattus      97  -EL------LESE----------APIKSEEPLKEDANLLPEKTVRAFV-PIDLQ------CIE
Gallus      67  -EGAHDDPKEGT-----------PACPPPEADGEEDPGLPVMADHVFV-PIDLH------CIE
Xenopus    236  FEP------CEDQ----------AEKREAEDLTGEEDCESQKVIPAFFIQHE-RQESFSGSSH
Danio      109  -GK------EERVSDIGLRNGVKSTLTEIELEEVNTMPENAARVFS-PS-IT-------ILR
Latimeria   96  -AQDENVCQELD-----------KPLKSPSHDGEEDNVMPPSAAQVFV-PS-IR-------IVP
```

*FIG. 8A (cont)*

```
Homo       139  RQPQEDLI-----------------VRCEAG--EGECR-TFMPP-----------------------R
Pan        139  RQPQEDLI-----------------VRCEAG--EGECR-TFMPP-----------------------R
Mus        136  RKPQEERI-----------------LHRDAG--PGELR-NFLPA-----------------------R
Rattus     136  RKPQEERI-----------------KHREAG--PGELR-NFLPA-----------------------R
Gallus     111  RTPAEQRK-----------------QQPTRSPRRRAGR-AVLPPGTDPTASSQSRPSSLVAPH
Xenopus    282  KKVQLEMC-----------------EHLDSDKREAEVE-PLLRS-----------------------H
Danio      155  STSQQEAA-----------------EHWRDQ--EEEARSPFLGS-----------------------H
Latimeria  139  HSAHNPDAKKSMDLLEMHEMISLENENG--IHERQ--PFLNS-----------------------S
```

*FIG. 8A (cont)*

|  | | |
|---|---|---|
| Homo sapiens | 1 | LTGLFEAVSRLIYWLTFAVGRSFRGF |
| Mus musculus | 1 | LTGLFAISRLIYWLTFAVGRSFRGFGYGLTF---- |
| R. norvegicus | 1 | LTGLFAISRLIYWLTFAVGRSFRGFGYGLTF---- |
| Pan troglodytes | 1 | LTGLFEAVSRLIYWLTFAVGRSFRGFGYGLTF---- |
| Gallus gallus | 1 | LTGLFAISRLTYWLSYAFGRSFRGFGYGLTF---- |
| Xenopus laevis | 1 | LTGLFAISRLTYWLSFAVGRSFRGFGFAMTF---- |
| Danio rerio | 1 | LTCLFALSQLIYWLSFAVGRSFRGFGYGLAF---- |
| L. chalumnae | 1 | LTIVFAFGRLLYWVAAACGSSLRGVGFGFSFL---- |
| Mgst1 | 1 | LTGLFAISRLIYWLAFAIGSAFRGFGFGLTF---- |
| Mgst2 | 1 | LSGPDLSTALMHFRIFVGARIYHTIAYLTPLPQPNRG |
| Mgst3 | 1 | GWYFNQVFAACLGLLYIYARHKYFWGYAEAAEKRI-- |
| Flap | 1 | -VYHPRIASGLGLAWI-IGRVLYAYGYYTGDPSKR-- |
| Ltc4 | 1 | LLCSQVPAAFAGLMYL-FVRQKYFVGYLGERTQST-- |
|  | 1 | IFFHEGAAALCGLFY-LFARLRYFQGYARSAQLRL-- |

Tmem79

FIG. 8D

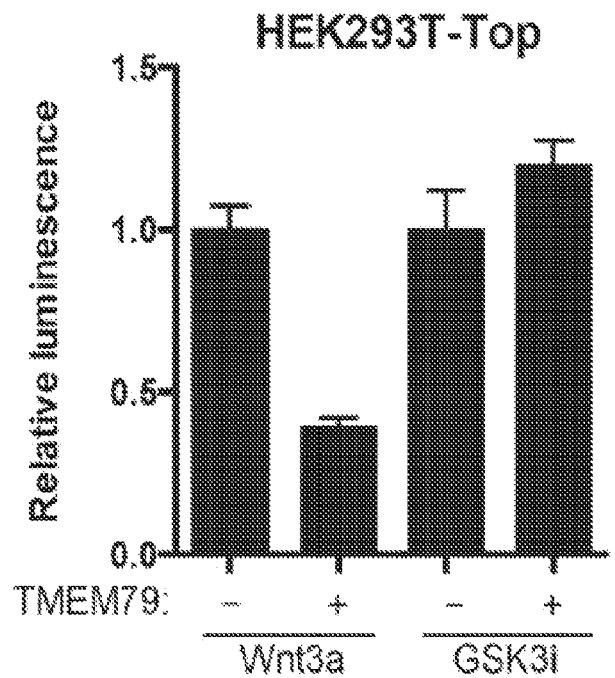
FIG. 9E
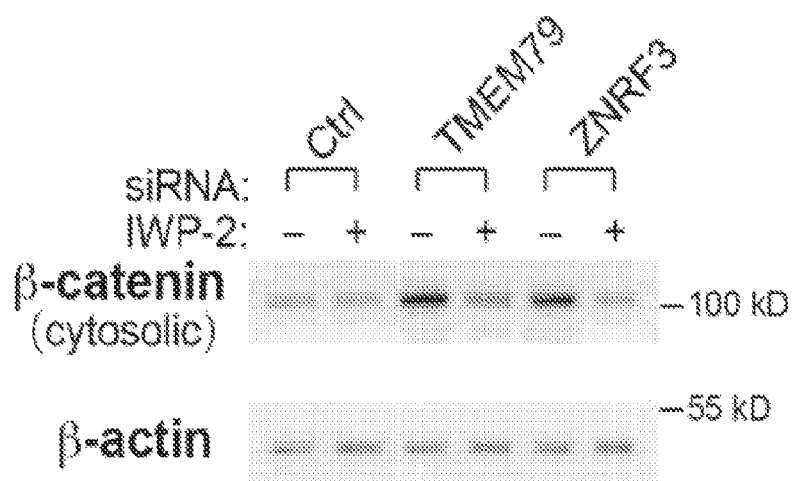
FIG. 10A
FIG. 10B

TREATING ATOPIC DERMATITIS BY TARGETING THE WNT PATHWAY

CROSS-REFERENCE TO RELATED APPLICATIONS

This application is a National Stage entry of International Patent Application No. PCT/US2019/053502, filed on Sep. 27, 2019, which claims the benefit of U.S. Provisional Application Ser. No. 62/738,182 filed on Sep. 28, 2018. The entire contents of the foregoing application are incorporated herein by reference.

STATEMENT OF FEDERALLY SPONSORED RESEARCH

This invention was made with government support under Grant Number GM126120, awarded by the National Institutes of Health. The government has certain rights in the invention

SEQUENCE LISTING

This application contains a Sequence Listing that has been submitted electronically as an ASCII text file named "Sequence Listing.txt." The ASCII text file, created on Mar. 12, 2021, is 42,027 bytes in size. The material in the ASCII text file is hereby incorporated by reference in its entirety.

TECHNICAL FIELD

Described herein are methods for treating atopic dermatitis in subjects, e.g., subjects who have mutations in TMEM79, using Wnt inhibitors, e.g., small molecule inhibitors of porcupine.

BACKGROUND

Atopic dermatitis (AD), also known as atopic eczema, is a common chronic and relapsing inflammatory disorder of the skin and is frequently associated with atopic asthma and allergies (Spergel, J. M. and A. S. Paller, J Allergy Clin Immunol, 112 (6 Suppl): p. S118-27, 2003; Thomsen, S. F., ISRN Allergy, 2014: p. 354250, 2014; Oyoshi, M. K., et al., Adv Immunol, 102: p. 135-226, 2009). AD affects 20% of infants/children with changing severity over the years, and can persist into adulthood in 15% of the cases (Oyoshi, M. K., et al., Adv Immunol, 102: p. 135-226, 2009). In some instances AD leads to fatal bacterial and viral infections (Oyoshi, M. K., et al., Adv Immunol, 102: p. 135-226, 2009; Tollefson, M. M., A. L. Bruckner, and D. Pediatrics, 134 (6): p. e1735-44, 2014). There are no effective curative therapies for AD, which is associated with tremendous physical, psychological, and financial burden to the patients and their families, with loss of school attendance in children and loss of productivity in adults and draining of significant health care resources (Oyoshi, M. K., et al., Adv Immunol, 102: p. 135-226, 2009). Pruritic and relapsing eczematous dermatitis, mechanical damages and inflammation of the skin, and elevated serum IgE levels are major clinical features of the disease (Tollefson, M. M., A. L. Bruckner, and D. Pediatrics, 134 (6): p. e1735-44, 2014; Eichenfield, L. F., et al., J Am Acad Dermatol, 70 (2): p. 338-51, 2014). The cause of AD is complex and not fully understood, with evidence of both genetic and environmental risk factors being involved in associated skin barrier defects and immune dysfunctions (Irvine, A. D., W. H. McLean, and D. Y. Leung, N Engl J Med, 365 (14): p. 1315-27, 2011). The current prevailing view is that skin barrier anomaly plays a primary role and leads to secondary immune responses to antigens that enter through the damaged barrier, resulting in skin inflammation and other clinical symptoms of AD. Indeed mutations in the filaggrin gene (FLG), which encodes the skin barrier protein filaggrin, are found in 15% of AD patients (Oyoshi, M. K., et al., Adv Immunol, 102: p. 135-226, 2009; Palmer, C. N., et al., Nat Genet, 38 (4): p. 441-6, 2006).

SUMMARY

Atopic dermatitis (AD) is a common inflammatory disease of the skin, affecting 20% of infants/children without effective therapies. The recessive matted (ma) mouse mutant exhibits AD phenotypes as a result of a nonsense/truncation mutation of the Tmem79/matted gene, which encodes Tmem79 (also called Mattrin), a multi-span transmembrane protein of unknown molecular function. The TMEM79/MATT locus in human exhibits a significant association with AD, making it a likely AD predisposing gene. In a genome-wide CRISPR-Cas9 loss-of-function screen in HEK293T cells, we identified TMEM79 as a potent and specific inhibitor of WNT/β-catenin signaling, likely through negative regulation of the FRIZZLED (FZ) family of WNT receptors. Our findings thus indicate that down-regulation of WNT signaling by TMEM79 is likely critical for skin barrier formation, and that abnormal (high) WNT signaling likely underlies AD phenotypes in ma mice and in at least some AD patients. In HEK293T cells elevated WNT signaling caused by TMEM79 knockdown can be suppressed by a small molecule that specifically inhibits WNT secretion; thus, these compounds can be used for AD therapy, e.g., using topical application of small molecule WNT inhibitors to ameliorate AD.

Thus, provided herein are methods for treating a subject who has atopic dermatitis (AD), comprising administering a therapeutically effective amount of a Wnt inhibitor, e.g., a porcupine (PORCN) inhibitor, to a subject in need thereof. In some embodiments, the subject has a mutation or SNP (single nucleotide polymorphism) in TMEM79, e.g., a mutation shown in Table 1 or a mutation that is associated with AD. In some embodiments, the subject does not have a FLG mutation associated with AD, e.g., has wild type FLG.

Also provided herein are methods for treating a subject who has atopic dermatitis (AD) that include obtaining a sample comprising genomic DNA from the subject; performing an assay to determine presence or absence of a mutation in TMEM79, e.g., a mutation that is shown in Table 1 or associated with AD, in the genomic DNA from the subject; and administering a therapeutically effective amount of a porcupine (PORCN) inhibitor to a subject who has a mutation in TMEM79, e.g., that is shown in Table 1 or associated with AD.

In some embodiments, performing an assay to determine presence or absence of a mutation in TMEM79 comprises performing an assay detecting the presence of a mutation in TMEM79 known to be associated with AD. In some embodiments, the mutation known to be associated with AD is a methionine at rs6684514.

In some embodiments, performing an assay to determine presence or absence of a mutation in TMEM79 comprises: sequencing all or part of a TMEM79 gene; comparing the sequence to a reference sequence in an unaffected subject; identifying a sequence that differs from the reference sequence as a mutation; determining whether the mutation has an effect on TMEM79 activity or expression; and identifying a subject who has a sequence that differs from the reference sequence and reduces TMEM79 activity or expression as having a mutation in TMEM79 that is associated with AD.

In additional aspects, provided are methods for treating a subject who has atopic dermatitis (AD) comprising obtaining a sample comprising affected skin cells from the subject; performing an assay to determine a level or activity of TMEM79 in the cells from the subject; detecting a reduction in level or activity of TMEM 79 in the sample; and administering a therapeutically effective amount of a Wnt inhibitor, e.g., a porcupine (PORCN) inhibitor, to a subject who has a reduced level or activity of TMEM79 in the sample.

In some embodiments, the subject does not have a mutation in FLG, e.g., has a wild type FLG or does not have a FLG mutation associated with AD.

In some embodiments of the methods described herein, the Wnt inhibitor is a PORCN inhibitor, e.g., selected from the group consisting of LGK974; C59; ETC-159; ETC-131; IWP compounds (e.g., IWP-2 and IWP-L6; GNF6231; Compound 3; compound 4; compound 5; and Compound 6.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF DRAWINGS

FIGS. 8A-8D shows an evolutionary comparison of vertebrate TMEM79 proteins, Related to FIG. 1. Panel A is a ClustalW alignment of TMEM79 proteins from Human (*Homo sapiens*, SEQ ID NO: 27), Chimpanzee (Pan troglodytes, SEQ ID NO: 28), Rat (*Rattus norvegicus*, SEQ ID NO: 29), Mouse (*Mus musculus*, SEQ ID NO: 30), Chicken (*Gallus gallus*, SEQ ID NO: 31), Frog (*Xenopus laevis*, SEQ ID NO: 32), Zebra fish (*Danio rerio*, SEQ ID NO: 33), Coelacanth (*Latimeria chalumnae*, SEQ ID NO: 34). Black and grey represent identical and conservative amino acid residues, respectively. Panel B is the phylogenetic tree showing homology among TMEM79 proteins from Human, Chimpanzee, Rat, Mouse, Chicken, Frog, Zebra fish, Coelacanth based on Neighbor-Joining phylogenetic methods. Distances in the cladogram are derived from amino acid substitutions. Coelacanth protein is used as an out-group. Panel C shows orthologous comparisons of vertebrate TMEM79 proteins in percent identity using ClustalW alignment. Panel D is a ClustalW alignment of vertebrate TMEM79 protein Human (SEQ ID NO: 27), Chimpanzee (SEQ ID NO: 28), Rat (SEQ ID NO: 29), Mouse (SEQ ID NO: 30), Chicken (SEQ ID NO: 31), Frog (SEQ ID NO: 32), Zebra fish (SEQ ID NO: 33), Coelacanth (SEQ ID NO: 34) with mouse MAPEG superfamily members Mgst1 (SEQ ID NO: 35), Mgst2 (SEQ ID NO: 36), Mgst3 (SEQ ID NO: 37), Flap (SEQ ID NO: 38) and Ltc4s (SEQ ID NO: 39). Asterisk indicates two conserved residues within a region of sequence similarity corresponding to mouse Tmem 79 R332 and Y339.

FIGS. 9A-9E further shows that TMEM79 is a specific inhibitor for Wnt/β-catenin signaling, (related to FIG. 2). Panels A and B show that TMEM79 affected neither the CAMP/PKA pathway, assayed by a CRE (cAMP responsive element)-driven reporter, or the EGF/EGFR pathway, assayed by an SRE (serum response element)-driven reporter). Panels C and D shows depletion of TMEM79 by siRNAs affected neither the CRE- or SRE-driven reporter. Panel E shows TMEM79 inhibited the TOP-Flash reporter induced by Wnt3a but not by a GSK3 inhibitor (GSK3i).

FIGS. 10A-10F shows that TMEM79 inhibits Wnt/β-catenin signaling by reducing surface level of frizzled receptor, (related to FIG. 3). Panel A shows depletion of TMEM79 or ZNRF3 via an siRNA in HEK293T cells induced cytosolic β-catenin stabilization, which was prevented by IWP-2. Panel B shows genomic DNA sequencing showing frame shift mutations in TMEM79 alleles in of T79KO clones picked (SEQ ID NOs: 40 and 41). Panel C shows overexpression of TMEM79 and ZNRF3 in ZRKO and T79KO cells. Panel D shows mature FZD5 (the upper band) was glycosylated, and was de-glycosylated by PNGase and converted to the lower band (immature FZD5). Panel E shows ZNRF3ΔRING, a mutant of the RING domain deletion, bound to mature FZD5, and immature FZD5 (possibly during its transit through the ER to PM). Panel F shows lysosome inhibitor bafilomycin A1 (BAF A1), but not proteasome inhibitor MG132, inhibited TMEM79-induced degradation of immature FZD5. BAF A1 increased both mature and immature forms of FZD5 (compare lanes 1 and 3). BAF A1 blocked TMEM79-induced degradation of immature FZD5, but did not increase mature FZD5 (compare lanes 3 and 4), consistent with TMEM79 preventing FZD maturation from the ER to the PM by shuttling FZD5 to the lysosome. MG132 did not affect levels of immature and mature FZD5 in the absence (compare lanes 1 and 5) or presence of TMEM79 (compare lanes 2 and 6). Thus it appears that TMEM79 promotes degradation of immature FZD5 through the lysosome, whereas ZNRF3 promotes degradation of mature FZD5 through the lysosome as well (Koo et al., 2012).

DETAILED DESCRIPTION

Figure 1A:
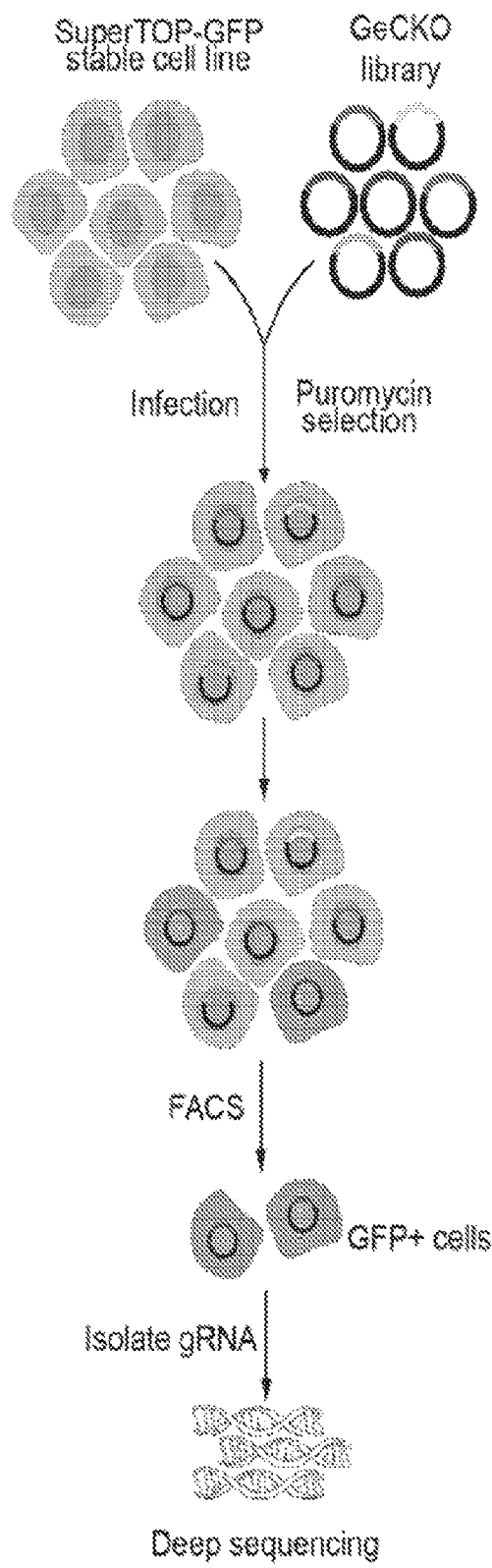
FIGS. 1A-1D show identification of TMEM79 as an inhibitor for Wnt/β-catenin signaling through genome-wide loss-of-function screening using the CRISPR-Cas9 system. Panel A is an outline of the screening strategy for negative components of Wnt/β-catenin signaling using the HEK293T-TOP-EGFP reporter line. Panel B shows representative images of the reporter line with and without GeCKO library application. GFP+ cells (original in color) were enriched by FACS. Scale bar, 200 µm. Panel C is a scatterplot showing enrichment of sgRNAs after screening. Y-axis: number of sgRNAs for each gene. X-axis: sgRNA NGS reads for each gene. Panel D is a schematic diagram of TMEM79 (predicted). pY280*, a nonsense mutation coded by the matted allele.
Figure 1B:
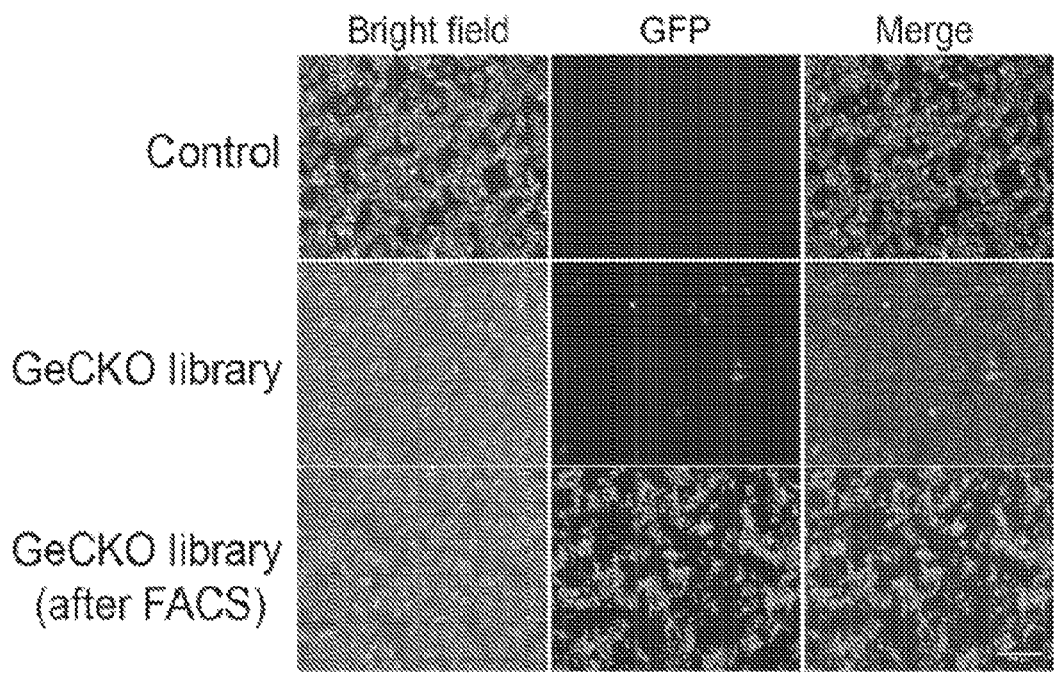
Figure 1C:
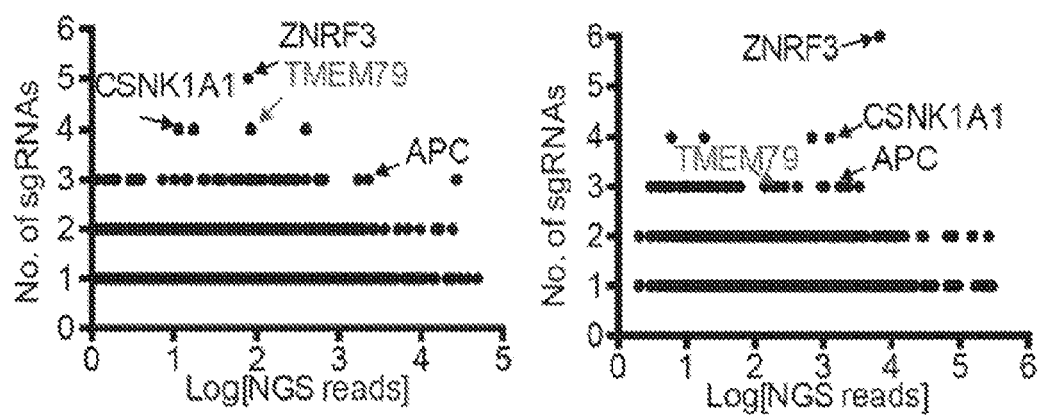
Figure 1D:
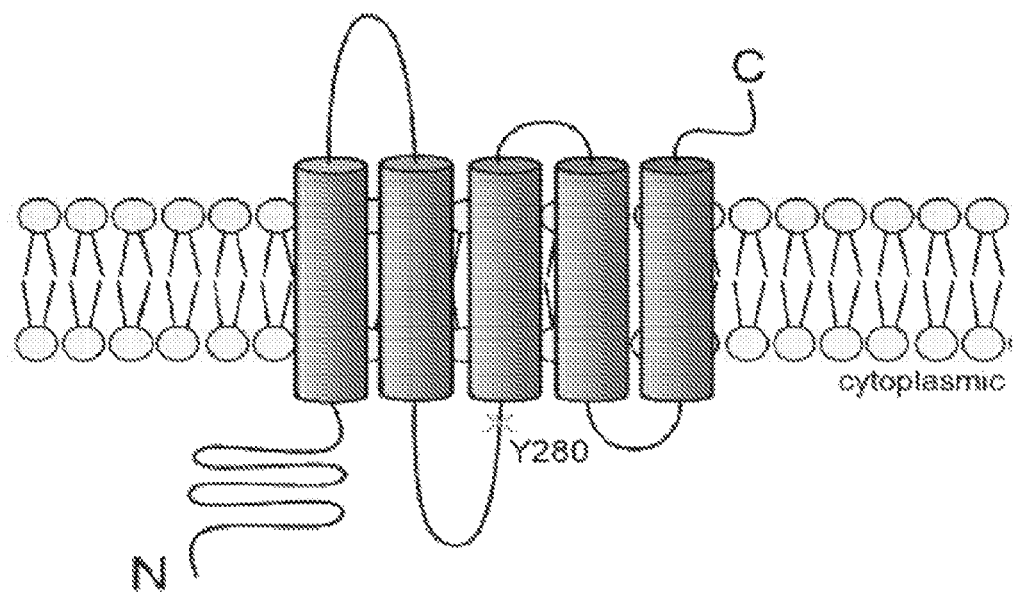

The skin barrier provides a protective shield for the body to prevent water loss and entry of irritants, allergens and pathogens, and is formed by specialized and differentiated keratinocytes in the outermost layer of epidermis (Sandilands, A., et al., J Cell Sci, 122 (Pt 9): p. 1285-94, 2009; Houben, E., K. De Paepe, and V. Rogiers, Skin Pharmacol Physiol, 20 (3): p. 122-32, 2007). The skin is in a perpetual state of self-renewal throughout life, with epidermal stem cells giving rise to differentiated keratinocytes to maintain the integrity of the barrier (Blanpain, C. and E. Fuchs, Annu Rev Cell Dev Biol, 22: p. 339-73, 2006). Thus it seems likely that at least some AD predisposing genes that are yet to be discovered may be involved in regulation of epidermal homeostasis and differentiation.

It was shown recently that matted (ma) mice exhibit prominent AD phenotypes with abnormal skin barrier formation, transepidermal water loss, hypersensitivities to allergens and skin inflammation, and elevated serum IgE levels (Sasaki, T., et al., J Allergy Clin Immunol, 132 (5): p. 1111-1120 e4, 2013; Saunders, S. P., et al., J Allergy Clin Immunol, 132 (5): p. 1121-9, 2013). The autosomal recessive ma allele was found to be a nonsense mutation in the Tmem79 gene, which encodes an uncharacterized five-pass transmembrane protein, Tmem79/Mattrin, which is expressed in differentiated keratinocytes in the skin (Saunders, S. P., et al., J Allergy Clin Immunol, 2013. 132 (5): p. 1121-9). The ma allele (c.840C>G, p.Y280*) results in a truncated Tmem79 protein, which likely represents a hypomorph or loss-of-function product, as transgenic expression of the full length Tmem 79 rescues the ma mutant phenotypes (Sasaki, T., et al., J Allergy Clin Immunol, 132 (5): p. 1111-1120 e4, 2013). Importantly an SNP (single nucleotide polymorphism) in the coding region of human TMEM79 gene shows a significant association with AD, suggesting that TMEM79 is an AD predisposing gene (Sasaki, T., et al., J Allergy Clin Immunol, 132 (5): p. 1111-1120 e4, 2013; Saunders, S. P., et al., J Allergy Clin Immunol, 132 (5): p. 1121-9, 2013). The molecular basis of TMEM79 function and its potential role in AD pathogenesis is unknown.

In a genome-wide CRISPR-Cas9 screen we identified TMEM79 gene product as a negative regulator of WNT signaling, likely acting through down-regulation of the cell surface level of the Frizzled (FZ) family of WNT receptors. Our results suggest the hypothesis that inhibition of Wnt signaling by Tmem 79 is involved in keratinocyte differentiation and skin barrier formation and an elevated Wnt signaling likely underlies AD phenotypes in ma mice. This hypothesis is consistent with and enhances our current understanding of Wnt control of skin and epidermal homeostasis, and suggests that pharmacological intervention to counter elevated WNT signaling in AD skin may represent a novel treatment strategy. Indeed a new class of small molecule compounds has been developed as specific inhibitors of WNT production (Chen, B., et al., Nat Chem Biol, 5 (2): p. 100-7, 2009; Liu, J., et al., Proc Natl Acad Sci USA, 110 (50): p. 20224-9, 2013) and is in phase I clinical trial for cancer therapeutics. We show herein a connection between Tmem79 and Wnt signaling in AD pathogenesis and therapeutic implications thereof.

Atopic Dermatitis

Atopic dermatitis (AD) is a common chronic and relapsing inflammatory disorder of the skin and is frequently associated with atopic asthma and allergies (Spergel, J. M. and A. S. Paller, J Allergy Clin Immunol, 112 (6 Suppl): p. S118-27, 2003; Thomsen, S. F., ISRN Allergy, 2014: p. 354250, 2014; Oyoshi, M. K., et al., Adv Immunol, 102: p. 135-226, 2009). AD affects 20% of infants/children with changing severity over the years, and can persist into adulthood in 15% of the cases (Oyoshi, M. K., et al., Adv Immunol, 102: p. 135-226, 2009). In some instances AD can lead to fatal bacterial and viral infections (Oyoshi, M. K., et al., Adv Immunol, 102: p. 135-226, 2009; Tollefson, M. M., A. L. Bruckner, and D. Pediatrics, 134 (6): p. e1735-44, 2014). AD is associated with tremendous physical, psychological, and financial burden to the patients and their families, with loss of school attendance in children and loss of productivity in adults and draining of significant health care resources (Oyoshi, M. K., et al., Adv Immunol, 102: p. 135-226, 2009). Pruritic and relapsing eczematous dermatitis, mechanical damages and inflammation of the skin, and elevated serum IgE levels are major clinical features of the disease (Tollefson, M. M., A. L. Bruckner, and D. Pediatrics, 134 (6): p. e1735-44, 2014; Eichenfield, L. F., et al., J Am Acad Dermatol, 70 (2): p. 338-51, 2014). The cause of AD is complex and not fully understood, with evidence of both genetic and environmental risk factors being involved in associated skin barrier defects and immune dysfunctions (Irvine, A. D., W. H. McLean, and D. Y. Leung, N Engl J Med, 365 (14): p. 1315-27, 2011). The current prevailing view is that skin barrier anomaly plays a primary role and leads to secondary immune responses to antigens that enter through the damaged barrier, resulting in skin inflammation and other clinical symptoms of AD.

There are no curative therapies for AD, and the current treatment options are almost entirely based on managing immune responses and inflammation, such as by topical steroids, topical calcineurin or PDE4 inhibitors, or by injection of the newly FDA-approved Dupixent (dupilumab, an IL-4 receptor a inhibitor). Some of these medicines may not be applicable to patients who have other allergic symptoms. The use of these immune modulators is associated with known (and unknown) side effects, some of which can be severe, in particular in long term usages.

Given the prevalence of AD, and genetic data and the prevailing view that skin barrier defects are likely the primary instigator of AD pathogenesis, it is surprising that there is no drug that directly targets defective skin barrier for AD therapeutics. One possible reason is that there has been a lack of good understanding and suitable drug target. Our identification of TMEM79 and its known association with AD in mice and human, and our discovery of its role in modulating WNT signaling in skin homeostasis highlights an important opportunity for targeting the WNT pathway for AD treatment. As described herein, Porcupine (PORCN) inhibitors, which prevent WNT production and are currently under development for cancer therapeutics, correct hyper-activation of the WNT pathway caused by TMEM79 deficiency in human cell lines. Thus these PORCN inhibitors can be used for targeting skin barriers for AD therapeutics through topical applications.

TMEM79 Mutations in AD

As shown herein, in subjects who have AD, e.g., associated with mutant TMEM79 expression or activity, Wnt inhibitors such as PORCN inhibitors. The methods can include identifying subjects who have AD that is associated with mutant TMEM79 expression or activity, and selecting those subjects for treatment with a Wnt inhibitor, e.g. a PORCN inhibitor.

These methods can include obtaining a sample from the subject, e.g., a sample comprising genomic DNA or proteins. The sample can be, e.g., of affected skin, e.g., from a skin biopsy (e.g., a punch, excisional, or shave biopsy)., or hair follicle-derived keratinocytes (see, e.g., Yoshikawa et al., Int. J. Mol. Sci. 2013, 14, 3215-3227) Alternatively, where genomic DNA is evaluated, the sample can be from any cell or tissue that includes genomic DNA, e.g., a sample comprising tissue, whole blood, plasma, serum, or cheek/buccal cell swab.

The methods can then include evaluating the presence and/or level of TMEM79 protein or mRNA in the sample, and comparing the presence and/or level with one or more references, e.g., a control reference that represents a normal level of TMEM79 protein or mRNA e.g., a level in an unaffected subject, and/or a disease reference that represents a level of the proteins associated with AD, e.g., a level in a subject (or representative of a cohort of subjects) having AD. Alternatively, the methods can then include evaluating the presence of TMEM79 mutations, e.g., determining the sequence of the TMEM79 gene, in the sample, and comparing the sequence with a control sequence that represents a normal sequence of TMEM79 in an unaffected subject, and/or a disease reference that represents a sequence in a subject who has AD. A mutation is a difference from the wild type sequence; in the present methods, a disease-associated or disease causing mutation is one that reduces TMEM79 function or expression sufficiently to elevate Wnt signaling. The methods can include determining that that subject has a mutation in TMEM79, e.g., a mutation that is known to or suspected be associated with AD. In cases where a new mutation is found, the methods can include determining whether the mutation is consequential, e.g., whether the mutation reduces TMEM79 function or expression sufficiently to elevate Wnt signaling as compared to Wnt signaling in an unaffected control subject (or cohort of unaffected control subjects). In some embodiments, a mutation in TMEM79 (i.e., a difference from the wild type reference sequence) that causes an alteration in the protein, e.g., a change in at least one amino acid, or that causes a decrease in expression levels, is considered a mutation associated with AD. An exemplary control reference sequence of human TMEM79 mRNA can be found at GenBank Acc. No. NM_032323.2; an exemplary protein sequence is NP_115699.1 (this protein is sometimes referred to as mattrin). An exemplary control reference genomic sequence is at GenBank Ref. No. NC_000001.11, Range 156282913-156292443 (Reference GRCh38.p7 Primary Assembly). Disease-associated mutations in TMEM79 are known in the art and include a missense SNP, rs6684514 (a G>A variation, GCGGCAGCCCCAAGAAGACCTTATC[A/G]TGCGCTGTGAGGCAGGCGAGGGC GA (SEQ ID NO:1, NM_032323.2: c.439G>A), described in Saunders et al., J Allergy Clin Immunol. 2013 November; 132 (5): 1121-1129. Other SNPs that insert premature stop codons and may also be associated with AD include rs151038552; rs200148935; rs377138185; rs747950770; rs759375927; rs762551106; rs763385646; rs770744177; rs772406094; rs776515216; rs779278975; and rs1325209653. See Table 1 and also Elias and Wakefield, J Allergy Clin Immunol. 2014 October; 134 (4): 781-791.e1, for a discussion of a potential role for TMEM79/mattrin in lamellar body secretion. Copy Number Variations (CNV) in TMEM79 have also been reported and CNV (loss) may also be associated with risk of developing AD.

TABLE 1

TMEM79 SNPs

| SEQ ID NO | SNP | Sequence | Functional Consequence/TMEM79 |
|---|---|---|---|
| SEQ ID NO: 1 | rs6684514 | GCGGCAGCCCCAAGAAGACCTTATC[A/G]TGCGCTGTGAGGCAGGCGAGGGCGA | Missense or stop gained Val147Met |
| SEQ ID NO: 2 | rs151038552 | ACTTACCAAGCTAGAGGAGCTGCCC[A/G/T]AAGACGATGCCAACCTGCTGCCTGA | missense or stop gained: E115 |
| SEQ ID NO: 3 | rs200148935 | TCATTCTCTTCCCTTGCCTACTATA[C/G/T]GGGGCATATGCCTTCCTGCCGTTTG | synonymous codon or stop gained: Y216 |
| SEQ ID NO: 4 | rs377138185 | CCTCCGACTACAGGCCCCGCCCCTG[A/C/G]GGCTGAGCCTCTCCGCCCTCGCCCT | missense or stop gained: W393 |
| SEQ ID NO: 5 | rs747950770 | CTGGACTACCCGGACCACGCCCGCT[A/C/T]GGCCTCCGACTACAGGCCCCGCCCC | missense or stop gained: S384 |
| SEQ ID NO: 6 | rs759375927 | AGTCGGTCCAGCTCTTTATTCTCTA[A/C]TTCTTCAACCTGGCCGTGCTTTCCA | stop gained: Y294 |
| SEQ ID NO: 7 | rs762551106 | ACGGCGGGAGGTGGAGATCCACCGG[C/G/T]GATATGTGGCCCAGTCGGTCCAGCT | missense or stop gained: R282 |
| SEQ ID NO: 8 | rs763385646 | CCGTGCCTTCGTGCCTATTGACCTA[C/T]AGTGCATTGAGCGGCAGCCCCAAGA | stop gained: Q135 |
| SEQ ID NO: 9 | rs770744177 | TGCGGGAGCTGTGGAGACCGTGAGT[A/G]GCTAAGGGCTGTGGCCTCCGTGGGA | stop gained: W197 |
| SEQ ID NO: 10 | rs772406094 | CCGGCGATATGTGGCCCAGTCGGTC[C/T]AGCTCTTTATTCTCTACTTCTTCAA | stop gained: Q289 |
| SEQ ID NO: 11 | rs776515216 | CTGTGAGGCAGGCGAGGGCGAGTGC[C/T]GAACCTTCATGCCCCCCCGGGTCAC | stop gained: R157 |
| SEQ ID NO: 12 | rs779278975 | CTGCCACCGAGAGCCGCCTGGACTA[C/G]CCGGACCACGCCCGCTCGGCCTCCG | stop gained: Y378 |
| SEQ ID NO: 13 | rs28372828 | TGATGCTCGGCCCTTTCCAAGGAAA[C/G/T]TTTCACATGCACTTTTTGTTTGTTT | 5' Intron variant near gene |
| SEQ ID NO: 14 | rs192228711 | TGTTCCCTGCAGGATGACATGACCT[C/T]GTGGTAGATCCCAGAACTGAGGCCC | 5' UTR |

TABLE 1-continued

TMEM79 SNPs

| SEQ ID NO | SNP | Sequence | Functional Consequence/TMEM79 |
|---|---|---|---|
| SEQ ID NO: 15 | rs2842883 | GTGGACTTGAGGAGGGCAGGGCCTG[C/G]CTGGTGTGGGGAGCAGGAGGATTTC | intron |
| SEQ ID NO: 16 | rs3795728 | GGACTTCGCCCCCAGGCCTAGGACC[C/G]CGGTGGGTGGAACCCTGCTACTGCC | intron |
| SEQ ID NO: 17 | rs6679145 | TCTGCCCCCAGCTTACTGCCTCTTG[C/T]GCCCTTCCCCTGCCTTTTCTGACCC | 3' UTR |
| SEQ ID NO: 18 | rs1325209653 | GTAAGTGAGGCTGCCACCTTGCCCT[A/G]GGGGACTGGCCCTCAGCCCAGTGCT | stop gained: Y78 |

Twenty to thirty (15% in some publications) percent of subjects with AD have a heterozygous or homozygous mutation in the filaggrin gene (FLG). In some embodiments, the methods can include detecting the presence of a mutation in the filaggrin gene (FLG) and excluding those subjects from treatment, or treating those subjects with a treatment that does not include a Wnt inhibitor or PORCN inhibitor. An exemplary sequence of human FLG mRNA can be found at GenBank Acc. No. NM_002016.1; an exemplary protein sequence is NP_002007.1. An exemplary reference genomic sequence is at GenBank Ref. No. NG_016190.1, Range 5001-28029 (Reference GRCh38.p7 Primary Assembly). Disease-associated mutations in FLG typically lead to production of truncated profilaggrin molecule that cannot be cleaved to produce filaggrin proteins. A number of AD-associated FLG mutations are known in the art and include R501X, 2282del4, R2447X, S3247X (which account for more than 90% of the FLG mutations in European populations, see Irvine et al., N Engl J Med 2011; 365:1315-27), S2554X (Nomura et al., J. Allergy Clin. Immun. 119:434-440, 2007), K4022X (Hu et al., Hum. Genet. 131:1269-1274, 2012), K4021X (Nemoto-Hasebe et al., Brit. J. Derm. 161:1387-1390, 2009), 3321delA (Nomura et al., J. Allergy Clin. Immun. 119:434-440, 2007), and others described in Margolis et al., J Allergy Clin Immunol. 2012 October; 130 (4): 912-7; Visser et al., Br J Dermatol. 2013 February; 168 (2): 326-332; Irvine et al., N Engl J Med 2011; 365:1315-27 and Esparza-Gordillo et al., Nat Genet 2009; 41:596-601.

Various methods that are known within the art can be used for the identification and/or isolation and/or purification of a biological marker from a sample. An "isolated" or "purified" biological marker is substantially free of cellular material or other contaminants from the cell or tissue source from which the biological marker is derived i.e., partially or completely altered or removed from the natural state through human intervention. For example, nucleic acids contained in the sample are first isolated according to standard methods, for example using lytic enzymes, chemical solutions, or isolated by nucleic acid-binding resins following the manufacturer's instructions. The presence and/or level of a protein can be evaluated using methods known in the art, e.g., using standard electrophoretic and quantitative immunoassay methods for proteins, including but not limited to, Western blot; enzyme linked immunosorbent assay (ELISA); biotin/avidin type assays; protein array detection; radio-immuno-assay; immunohistochemistry (IHC); immune-precipitation assay; FACS (fluorescent activated cell sorting); mass spectrometry (Kim (2010) Am J Clin Pathol 134:157-162; Yasun (2012) Anal Chem 84 (14): 6008-6015; Brody (2010) Expert Rev Mol Diagn 10 (8): 1013-1022; Philips (2014) PLOS One 9 (3): e90226; Pfaffe (2011) Clin Chem 57 (5): 675-687). The methods typically include revealing labels such as fluorescent, chemiluminescent, radioactive, and enzymatic or dye molecules that provide a signal either directly or indirectly. As used herein, the term "label" refers to the coupling (i.e. physically linkage) of a detectable substance, such as a radioactive agent or fluorophore (e.g. phycoerythrin (PE) or indocyanine (Cy5), to an antibody or probe, as well as indirect labeling of the probe or antibody (e.g. horseradish peroxidase, HRP) by reactivity with a detectable substance.

In some embodiments, an ELISA method may be used, wherein the wells of a mictrotiter plate are coated with an antibody against which the protein is to be tested. The sample containing or suspected of containing the biological marker is then applied to the wells. After a sufficient amount of time, during which antibody-antigen complexes would have formed, the plate is washed to remove any unbound moieties, and a detectably labelled molecule is added. Again, after a sufficient period of incubation, the plate is washed to remove any excess, unbound molecules, and the presence of the labeled molecule is determined using methods known in the art. Variations of the ELISA method, such as the competitive ELISA or competition assay, and sandwich ELISA, may also be used, as these are well-known to those skilled in the art.

In some embodiments, an IHC method may be used. IHC provides a method of detecting a biological marker in situ. The presence and exact cellular location of the biological marker can be detected. Typically a sample is fixed with formalin or paraformaldehyde, embedded in paraffin, and cut into sections for staining and subsequent inspection by confocal microscopy. Current methods of IHC use either direct or indirect labelling. The sample may also be inspected by fluorescent microscopy when immunofluorescence (IF) is performed, as a variation to IHC.

Mass spectrometry, and particularly matrix-assisted laser desorption/ionization mass spectrometry (MALDI-MS) and surface-enhanced laser desorption/ionization mass spectrometry (SELDI-MS), is useful for the detection of biomarkers of this invention. (See U.S. Pat. Nos. 5,118,937; 5,045,694; 5,719,060; 6,225,047)

The presence and/or level of a nucleic acid can be evaluated using methods known in the art, e.g., using polymerase chain reaction (PCR), reverse transcriptase polymerase chain reaction (RT-PCR), quantitative or semi-quantitative real-time RT-PCR, digital PCR i.e. BEAMing ((Beads, Emulsion, Amplification, Magnetics) Diehl (2006)

Nat Methods 3:551-559); RNAse protection assay; Northern blot; various types of nucleic acid sequencing (Sanger, pyrosequencing, NextGeneration Sequencing); fluorescent in-situ hybridization (FISH); or gene array/chips) (Lehninger Biochemistry (Worth Publishers, Inc., current addition; Sambrook, et al, Molecular Cloning: A Laboratory Manual (3. Sup.rd Edition, 2001); Bernard (2002) Clin Chem 48 (8): 1178-1185; Miranda (2010) Kidney International 78:191-199; Bianchi (2011) EMBO Mol Med 3:495-503; Taylor (2013) Front. Genet. 4:142; Yang (2014) PLOS One 9 (11): e110641); Nordstrom (2000) Biotechnol. Appl. Biochem. 31 (2): 107-112; Ahmadian (2000) Anal Biochem 280:103-110. In some embodiments, high throughput methods, e.g., protein or gene chips as are known in the art (see, e.g., Ch. 12, Genomics, in Griffiths et al., Eds. Modern genetic Analysis, 1999, W. H. Freeman and Company; Ekins and Chu, Trends in Biotechnology, 1999, 17:217-218; MacBeath and Schreiber, Science 2000, 289 (5485): 1760-1763; Simpson, *Proteins and Proteomics: A Laboratory Manual*, Cold Spring Harbor Laboratory Press; 2002; Hardiman, *Microarrays Methods and Applications: Nuts & Bolts*, DNA Press, 2003), can be used to detect the presence and/or level of TMEM79 mRNA or protein. Measurement of the level of a biomarker can be direct or indirect. For example, the abundance levels of TMEM79 can be directly quantitated. Alternatively, the amount of a biomarker can be determined indirectly by measuring abundance levels of cDNA, amplified RNAs or DNAs, or by measuring quantities or activities of RNAs, or other molecules that are indicative of the expression level of the biomarker. In some embodiments, a technique suitable for the detection of alterations in the structure or sequence of nucleic acids, such as the presence of deletions, amplifications, or substitutions, can be used for the detection of TMEM79.

RT-PCR can be used to determine the expression of TMEM79 (U.S. Patent No. 2005/0048542A1). The first step in expression profiling by RT-PCR is the reverse transcription of the RNA template into cDNA, followed by its exponential amplification in a PCR reaction (Ausubel et al (1997) *Current Protocols of Molecular Biology*, John Wiley and Sons). To minimize errors and the effects of sample-to-sample variation, RT-PCR is usually performed using an internal standard, which is expressed at constant level among tissues, and is unaffected by the experimental treatment. Housekeeping genes, such GAPDH are most commonly used.

Gene arrays are prepared by selecting probes that comprise a polynucleotide sequence, and then immobilizing such probes to a solid support or surface. For example, the probes may comprise DNA sequences, RNA sequences, co-polymer sequences of DNA and RNA, DNA and/or RNA analogues, or combinations thereof. The probe sequences can be synthesized either enzymatically in vivo, enzymatically in vitro (e.g. by PCR), or non-enzymatically in vitro.

In some embodiments, the presence and/or level of TMEM79 is comparable to the presence and/or level of TMEM79 in the disease reference, and the subject has one or more symptoms associated with AD, then the subject can be treated with a Wnt inhibitor as described herein. In some embodiments, the subject has no overt signs or symptoms of AD, but the presence and/or level of TMEM79 or TMEM79 sequence is comparable to the presence and/or level or sequence of TMEM79 in the disease reference, and the subject optionally has one or more risk factors for developing AD, then the subject has an increased risk of developing AD, and can be treated as described herein. In some embodiments, once it has been determined that a person has AD, or has an increased risk of developing AD based on the presence of TMEM79 mutations or aberrant expression or activity, then a treatment as described herein can be administered.

Suitable reference values can be determined using methods known in the art, e.g., using standard clinical trial methodology and statistical analysis. The reference values can have any relevant form. The predetermined level can be a single cut-off (threshold) value, such as a median or mean, or a level that defines the boundaries of an upper or lower quartile, tertile, or other segment of a clinical trial population that is determined to be statistically different from the other segments. It can be a range of cut-off (or threshold) values, such as a confidence interval. It can be established based upon comparative groups, such as where association with risk of developing disease or presence of disease in one defined group is a fold higher, or lower, (e.g., approximately 2-fold, 4-fold, 8-fold, 16-fold or more) than the risk or presence of disease in another defined group. It can be a range, for example, where a population of subjects (e.g., control subjects) is divided equally (or unequally) into groups, such as a low-risk group, a medium-risk group and a high-risk group, or into quartiles, the lowest quartile being subjects with the lowest risk and the highest quartile being subjects with the highest risk, or into n-quantiles (i.e., n regularly spaced intervals) the lowest of the n-quantiles being subjects with the lowest risk and the highest of the n-quantiles being subjects with the highest risk.

In some embodiments, the predetermined level is a level or occurrence in the same subject, e.g., at a different time point, e.g., an earlier time point.

Subjects associated with predetermined values are typically referred to as reference subjects. For example, in some embodiments, a control reference subject does not have a disorder described herein (e.g., AD).

A disease reference subject is one who has (or has an increased risk of developing) AD. An increased risk is defined as a risk above the risk of subjects in the general population.

Thus, in some cases the level of TMEM79 in a subject being less than a reference level of TMEM79 is indicative of a clinical status (e.g., indicative of a disorder as described herein, e.g., AD. In other cases the level of TMEM79 in a subject being greater than or equal to the reference level of TMEM79 is indicative of the absence of disease or normal risk of the disease. In some embodiments, the amount by which the level in the subject is the less than the reference level is sufficient to distinguish a subject from a control subject, and optionally is a statistically significantly less than the level in a control subject. In cases where the level of TMEM79 in a subject being equal to the reference level of TMEM79 the "being equal" refers to being approximately equal (e.g., not statistically different).

The predetermined value can depend upon the particular population of subjects (e.g., human subjects) selected. For example, an apparently healthy population will have a different 'normal' range of levels of TMEM79 than will a population of subjects which have, are likely to have, or are at greater risk to have, a disorder described herein. Accordingly, the predetermined values selected may take into account the category (e.g., sex, age, health, risk, presence of other diseases) in which a subject (e.g., human subject) falls. Appropriate ranges and categories can be selected with no more than routine experimentation by those of ordinary skill in the art.

In characterizing likelihood, or risk, numerous predetermined values can be established.

In some cases, the reference comprises a predetermined value for a meaningful level of TMEM79, e.g., a control reference level that represents a normal level of TMEM79, e.g., a level in an unaffected subject or a subject who is not at risk of developing a disease described herein, and/or a disease reference that represents a level of the proteins associated with conditions associated with TMEM79, e.g., a level in a subject having AD. In some embodiments, the absence of TMEM79 expression or activity, or a significant decrease in TMEM79 expression or activity as compared to a control (unaffected) reference, indicates that the subject has or is a risk of developing AD and can be treated as described herein.

Wnt Inhibitors

The present methods can include the selection and/or administration of a treatment including a Wnt inhibitor. A Wnt inhibitor modulates a member of the Wnt pathway, reducing Wnt/β-catenin singalling overall. Members of the Wnt pathway include CK1α, CBP, GSK3, COX2, COX1, COX2, Antioxidant, β-catenin-TCF, DVL, Tankyrase 1, tankyrase 2, Porcupine, Frizzled, WNTs, SAM68, and CBP (see Kahn, Nat Rev Drug Discov. 2014 July; 13 (7): 513-532). Compounds that modulate these targets include OTSA101, Vanticitumab, Foxy-5, Pyrvinium, ICG-001, Celecoxib, Sulindac, Quercetin, EGCG, AMG785, AMG162, HSC, Wnt3a, Curcumin, Resveratrol, PKF115-584, CGP049090, iCRT3, iCRT5, iCRT14, 2,4 diaminoquinazoline series, PNU-74654, BC21, NSC 668036, FJ9, 3289-8625, IWR-1, XAV939, G007-LK, IWP2, OMP-18R5 (mAb), LGK974, OMP-54F28 (FZD8-Fc fusion), CWP232291, and PRI-724 (see Blagodatsi et al., Molecular and Cellular Therapies20142: 28, and Table 1 of Kahn, 2014).

Porcupine Inhibitors

In some embodiments, the Wnt inhibitor inhibits (e.g., binds to and inhibits) Porcupine (PORCN), a membrane-bound O-acyltransferase, which affects Wnt signaling by palmitoleating the Wnts and is essential for Wnt secretion and function (Duraiswamy et al., J Med Chem. 2015 Aug. 13; 58 (15): 5889-99). A number of small molecule inhibitors of PORCN are known in the art, including LGK974 (Liu et al., Proc Natl Acad Sci USA. 2013 Dec. 10; 110 (50): 20224-9; Jiang et al., Proc Natl Acad Sci USA. 2013 Jul. 30; 110 (31): 12649-54); C59 (Proffitt et al., Cancer Res. 2013 Jan. 15; 73 (2): 502-7); ETC-159 and ETC-131 (aka ETC-1922159, Madan et al., Oncogene. 2016 Apr. 28; 35 (17): 2197-2207); IWP compounds including IWP-L6 (Chen et al., Nat Chem Biol. 2009 February; 5 (2): 100-7; Wang et al., J Med Chem. 2013 Mar. 28; 56 (6): 2700-4; Dodge et al., J Biol Chem. 2012 Jun. 29; 287 (27): 23246-54); GNF6231 (Liu et al., Annals of the Rheumatic Diseases Published Online First: 2 Feb. 2017, doi: 10.1136/annrheumdis-2016-210294); Compounds 3-5 (Duraiswamy et al., J Med Chem. 2015 Aug. 13; 58 (15): 5889-99); Compound 6 (Poulsen, et al., J. Chem. Inf. Model., 55 (2015), p. 1435) and Other Porcupine inhibitors. See also Ruey and Peterson, Nature Chemical Biology 5, 74-75 (2009); WO2014189466; WO2015094119; WO2015094118; PCT/SG2015/050132; WO2014175832; WO2013130364; WO2010101849; Ho and Keller, Bioorg. Med. Chem. Lett. 25 (2015) 5472-5476.

Pharmaceutical Compositions and Methods of Administration

The methods described herein include the use of pharmaceutical compositions comprising a PRCN inhibitor as an active ingredient.

Pharmaceutical compositions typically include a pharmaceutically acceptable carrier. As used herein the language "pharmaceutically acceptable carrier" includes saline, solvents, dispersion media, coatings, antibacterial and antifungal agents, isotonic and absorption delaying agents, and the like, compatible with pharmaceutical administration. Supplementary active compounds can also be incorporated into the compositions, e.g., steroids.

Pharmaceutical compositions are typically formulated to be compatible with its intended route of administration. Examples of routes of administration include parenteral, e.g., intravenous, intradermal, subcutaneous, oral (e.g., inhalation), transdermal (topical), transmucosal, and rectal administration.

Methods of formulating suitable pharmaceutical compositions are known in the art, see, e.g., *Remington: The Science and Practice of Pharmacy*, 21st ed., 2005; and the books in the series *Drugs and the Pharmaceutical Sciences: a Series of Textbooks and Monographs* (Dekker, NY).

In some embodiments, administration of a PORCN inhibitor as described herein can be by topical application. For topical administration, the active compounds can be formulated into ointments, salves, gels, foams, lotions, serums, oils, balms, or creams as generally known in the art. In some embodiments, compositions comprising a PORCN inhibitor for topical application can further comprise cosmetically-acceptable carriers or vehicles and any optional components. A number of such cosmetically acceptable carriers, vehicles and optional components are known in the art and include carriers and vehicles suitable for application to skin (e.g., sunscreens, creams, milks, lotions, masks, serums, etc.), see, e.g., U.S. Pat. Nos. 6,645,512 and 6,641,824. In particular, optional components that may be desirable include, but are not limited to absorbents, anti-acne actives, anti-caking agents, anti-cellulite agents, anti-foaming agents, anti-fungal actives, anti-inflammatory actives, anti-microbial actives, anti-oxidants, antiperspirant/deodorant actives, anti-skin atrophy actives, anti-viral agents, anti-wrinkle actives, artificial tanning agents and accelerators, astringents, barrier repair agents, binders, buffering agents, bulking agents, chelating agents, colorants, dyes, enzymes, essential oils, film formers, flavors, fragrances, humectants, hydrocolloids, light diffusers, nail enamels, opacifying agents, optical brighteners, optical modifiers, particulates, perfumes, pH adjusters, sequestering agents, skin conditioners/moisturizers, skin feel modifiers, skin protectants, skin sensates, skin treating agents, skin exfoliating agents, skin lightening agents, skin soothing and/or healing agents, skin thickeners, sunscreen actives, topical anesthetics, vitamin compounds, and combinations thereof. Also provided herein are topical formulations, e.g., ointments, salves, gels, foams, lotions, serums, oils, balms, or creams, comprising a PORCN inhibitor. In some embodiments, the topical formulation comprises a PORCN inhibitor e.g., LGK974, e.g., 1-5 mM of a PORCN inhibitor (e.g., 1.5 mM of a PORCN inhibitor), with one or more of N methyl-pyrrolidone (e.g., 5-10%, e.g., 6.25%), isopropyl myristate (e.g., 5-10%, e.g., 6.25%), in petroleum jelly (e.g., 75-90%, e.g., 87.5%) (vol/vol). See, e.g., Barry et al., J Invest Dermatol, 1984. 82 (1): p. 49-52; U.S. Pat. No. 6,054,140; Hedstrom et al., Proc Natl Acad Sci USA, 2014. 111 (6): p. 2325-30; U.S. Pat. Nos. 5,082,862; 4,772,460.

In one embodiment, the therapeutic compounds are prepared with carriers that will protect the therapeutic compounds against rapid elimination from the body, such as a controlled release formulation, including implants and microencapsulated delivery systems. Biodegradable, biocompatible polymers can be used, such as ethylene vinyl acetate, polyanhydrides, polyglycolic acid, collagen, polyorthoesters, and polylactic acid. Such formulations can be prepared using standard techniques, or obtained commercially, e.g., from Alza Corporation and Nova Pharmaceuticals, Inc. Liposomal suspensions (including liposomes targeted to selected cells with monoclonal antibodies to cellular antigens) can also be used as pharmaceutically acceptable carriers. These can be prepared according to methods known to those skilled in the art, for example, as described in U.S. Pat. No. 4,522,811.

The pharmaceutical compositions can be included in a container, pack, or dispenser together with instructions for administration.

EXAMPLES

The invention is further described in the following examples, which do not limit the scope of the invention described in the claims.

Example 1. The Role of TMEM79 and PORCN in Atopic Dermatitis (AD)

Materials and Methods

The materials and methods described herein are non-limiting, exemplary methods for the present invention. Other suitable methods and materials known in the art may also be used, and would be appreciated by a person of ordinary skill in the art.

Plasmids. Mouse Tmem 79 was tagged with Myc or Flag or both at the C-terminus. FZD1-8 were tagged with 2×HA or V5 epitope right after the signal peptide. HA-USP8 was generated by PCR-subcloning using Flag-HA-USP8 (Addgene, #22608) as template. V5-FZD5-K0 was generated by site-directed mutagenesis (cytoplasmic lysines 347, 434, 439, 442, 445, 525, 546 and 578 were substituted with arginines). ZNRF3-HA was a gift from Dr. Feng Cong. HA tag in pcDNA3-HA-Ubiquitin (Addgene, #18712) was replaced with 6×His by PCR cloning to make His-Ubiquitin. Xenopus laevis tmem79 and usp8 cDNAs were PCR amplified from Xenopus stage 10 cDNA library and cloned into pCS2+ vector. SuperTopflash vector 7TFP was obtained from Addgene (#24308). Renilla was PCR amplified from pRL-TK (Promega) and subcloned into lentiviral vector pHage-EF1α. To make lentiviral Top-EGFP reporter plasmid, 7×TCF promoter and EGFP were amplified from 7TFP and pEGFP-NI (Clontech) vectors, respectively, and subcloned into lentiviral vector pHage. Generating Top-EGFP stable line and genome wide CRISPR/Cas9 screening and data analysis. HEK293T cells were transduced with Top-EGFP lentivirus. Monoclonal cell populations that were GFP positive after Wnt3a treatment were manually selected in 96-well plates and expanded for screening. We performed positive selection screen for negative Wnt/β-catenin regulators following published protocols using human GeCKO v.2 sgRNA library (Addgene #1000000049) (Sanjana et al., 2014, Nature Methods, 11:783-784). Briefly, we transduced Top-EGFP cells with GeCKO library at MOI (multiplicity of infection) of ~0.3. After selection by puromycin for 2 weeks, GFP positive cells were sorted by BD FACSAriaII cell sorter and cultured for additional 4 days. Genomic DNA of the sorted cells was extracted using the Blood and Cell Culture DNA mini kit (Qiagen). The genomic region containing gRNAs was PCR-amplified. PCR products from 10 independent reactions were purified using QIAquick Gel Extraction Kit (Qiagen) and pooled for deep sequencing. We used Mageck to analyze the sequencing data (Li et al., 2014, Genome Biology 15:554). All reads in fastq files were mapped to the sgRNA library and a list of genes based on raw read counts was generated. Top-ranked genes with high numbers (3 to 6) of unique sgRNAs and high read counts were validated using 2 or more shRNAs.

Cell culture, immunofluorescence, RNA interference and dual luciferase assay. HEK293T cells (ATCC #CRL-11268) and its derivatives were maintained in DMEM supplemented with 10% FBS, penicillin, and streptomycin. ZRKO (ZNRF3 and RNF43 double knockout) cell line was a gift from F. Cong. The FZD null cell line (Fz1-10 knockout) was a gift from B. Vanhollebeke. For immunofluorescence, HEK293T cells were grown on poly-L-lysine-coated glass coverslips. Cells were transfected with Snap-FZD5 and after 24 hours washed with PBS and fixed with 4% paraformaldehyde for 10 min at room temperature. The cells were labeled with 1 μM SNAP-Surface® 488 (BioLabs) for 15 min at room temperature. To visualize endogenous TMEM79, PDI, TGN46 and EEA1, cells were permeabilized with 0.2% Triton X-100 in PBS for 5 min, blocked with 10% normal goat serum and then incubated with respective antibodies for 1 hour at room temperature followed by incubation with secondary antibodies (Alexa Fluor 594 goat anti-rabbit immunoglobulin and Alexa Fluor 488 goat anti-mouse immunoglobulin, Invitrogen). Cells were mounted in Prolong Diamond Antifade Mountant with DAPI (Thermofisher Scientific) and imaged using a Zeiss LSM700 confocal microscope. siRNA transfection was done using Lipofectamine RNAiMAX (Thermofisher Scientific, #13778075). Duplex siRNAs targeting TMEM79 and ZNRF3 were purchased from Sigma. The sequences are as follows: TMEM79-1, 5-CAGGCGAGGGCGAGUGCCGAAdTdT-3 (SEQ ID NO: 19), TMEM79-2, 5-CCAUGAGUUCCCGCCUGAUdTdT-3 (SEQ ID NO: 20). ZNRF3, 5-CGGCUGCUACACUGAGGACUAdTdT-3 (SEQ ID NO: 21). For Top-Flash reporter assay, cells were transduced sequentially with Supertopflash (7TFP, Addgene) and EF1α-Renilla lentiviruses. Cells were plated in 24 well plates and transfected the following day in triplicate using FuGENE HD (Promega, #E2312). Dual luciferase reporter assays were performed using Dual-Luciferase® Reporter Assay System (Promega, #E1960) according to manufacturer's instruction. Representative results are shown from one of three (or more) independent experiments. Immunoblotting, cell surface protein labeling and immunoprecipitation. Total cell lysates in NP40 lysis buffer (50 mM Tris, pH 7.5, 150 mM NaCl, 1 mM EDTA, 1% NP40, 10% glycerol, 10 mM NaF, and protease inhibitor cocktail, pH=7.4) were prepared by gentle rotating at 4° C., followed by centrifugation at top speed for 10 min at 4° C. Samples were run on a SDS-PAGE and transferred to Immobilon-P membrane. To isolate the cytoplasmic fraction of β-catenin, cells were incubated with 0.015% digitonin (in PBS supplemented protease inhibitor cocktail) by gentle rotating at 4° C. for 10 min. Indirect immunochemistry using a secondary antibody conjugated with horseradish peroxidase was visualized using ECL reagents on LAS-4000 imager (FujiFilm). Cell surface proteins were biotinylated using EZ-LinkTMSulfo-NHS—SS-Biotin (Thermo Fisher Scientific) according to manufacturer's protocol. Biotinylated proteins were enriched by Pierce® Streptavidin agarose resins. For immunoprecipitation, transfected HEK293T cells were lysed in NP40 lysis buffer. Cell lysates were incubated with antibody conjugated Agarose beads (Pierce™ Anti-c-Myc Agarose, #20168; Pierce™ Anti-HA Agarose, #26181; Anti-Flag M2 affinity gel, Sigma, A2220; Anti-V5 Agarose Affinity Gel, Sigma, A7345) at 4° C. over night. Beads were washed with lysis buffer 5 times and proteins were eluted in 2× sample buffer.

Generation of HEK293T knockout (KO) cell lines. KO cell lines were generated using CRISPR/Cas9 according to protocols (Ran et al., 2013, Nature Protocols 8:2281-2308). Briefly, HEK293T cells were transiently transfected with sgRNA plasmids containing Cas9 and selected with puromycin for 2-3 days. Monoclonal populations by limiting dilution were isolated in 96-well plate. To screen for TMEM79 KO and USP8 KO, sgRNA target regions were PCR amplified and characterized by Sanger sequencing. PCR products that showed multiple peaks around the target site in chromatogram were then cloned in PCRTM4 Blunt-TOPO® (Thermo Fisher Scientific). Individual colonies were sequenced to ensure frame shift indels.

Tandem affinity purification and mass spectrometry. HEK293T cells stably expressing EGFP or TMEM79-Myc-Flag were washed in cold PBS and lysed in NP40 lysis buffer. Cleared cell lysates were incubated with Anti-Flag M2 affinity gel at 4° C. with gentle rotation for 4 hours. The beads were washed 5 times with lysis buffer. Bound proteins were eluted with the Flag peptide. The protein elution was then incubated with Anti-c-Myc Agarose beads overnight at 4° C. Proteins were eluted with the c-Myc peptide, resolved on 4-12% NuPage gel (Thermo Fisher Scientific), and stained with The SilverQuest™ Silver Staining Kit (Thermo Fisher Scientific). Visible gel bands and negative control lane were sliced and sent to the Mass Spectrometry Core for analysis. Ubiquitylation assay. His-ubiquitin along with V5-tagged FZD5, TMEM79 and USP8 were transfected into HEK293T cells. 24 hours post transfection, cells were treated with Bafilomycin A1 (Sigma) overnight, washed and collected in ice-cold PBS with 10 mM N-ethyl maleimide (Sigma). Cells were lysed in lysis buffer containing 8 M urea, 100 mM Na2HPO4, 0.5% NP40, 10 mM Tris-HCl (pH 8.0), 10 mM imidazole and 10 mM β-mercaptoethanol. After sonication, lysates were cleared by centrifugation and incubated with nickel beads (Ni-NTA, Qiagen) for 3 hours at room temperature. Beads were washed with lysis buffer with 0.2% SDS. His-tagged proteins were eluted with 2× sample buffer and boiled at 100° C. for 5 min. Eluates were then diluted 10-fold in regular lysis buffer and subjected to immunoprecipitation with Anti-V5 Agarose gel. Immunoprecipitates were resolved by SDS-PAGE and analyzed by immunoblotting assay.

*Xenopus* embryo manipulations. Procedures for embryo manipulation, reverse transcription PCR and in situ hybridization were performed as previously described (Zhang et al., 2012, Cell, 149:1565-1577). The full length *Xenopus laevis* Tmem79 cDNA was used to make in situ sense and antisense probes.

mRNA and Morpholino injection. For animal cap assays, indicated mRNAs (Tmem79, 100 and 200 pg; Xwnt8, 10 pg; β-catenin 50 pg; Xnr1, 250 pg; BMP4, 100 pg) were injected into the animal pole at 4-cell stage, and animal caps were dissected at stage 9 (in the case of Xwnt8, Xnr1, BMP4) or at stage 8.5 and treated with recombinant proteins (bFGF, 100 ng/ml; hShh, 1.5 ng/mL) until stage 10 before RT-PCR. For Neural induction assay the MO (20 ng) for Tmem79, Usp8 or β-catenin was injected into the animal pole at 4-cell stage, and animal caps were dissected at stage 9 and treated with recombinant protein Noggin (500 ng/mL) until stage 18 before RT-PCR. To examine Tmem79 and Usp8 MOs specificity, 500 μg of mRNA of *Xenopus* Tmem79, mouse Tmem79, *Xenopus* Usp8 or xmutUsp8 (*Xenopus* Usp8 mutated for mismatches with the MO) were injected with a control MO, Tmem79 MO or Usp8 MO (20 ng) into the animal pole at the 2-cell stage and cultured til stage 10 for Western blotting. To knockdown the endogenous xTmem79 or xUsp8, 20 ng of control MO, Tmem79 MO or Usp8 MO were injected into two dorso-animal blastomeres at the 8-cell stage and the phenotype was scored at stage 35. To rescue the Tmem79 MO phenotype, 200 μg of mTmem 79, 20 ng of Usp8 MO or 10 ng of β-catenin MO was injected together with Tmem79 MO (20 ng). RT-PCR primers and Morpholinos. RT-PCT primer for *Xenopus laevis* Tmem 79: Forward, 5'-GGGAGGTGACCATTCACCAG-3' (SEQ ID NO: 22); Reverse, 5'-AGACCGTAGCCAAATCCACG-3' (SEQ ID NO: 23). The MO sequences: Tmem79.S MO, 5'-TCTGGAGCAACCATTGGACTTCTGT-3' (SEQ ID NO: 24); Tmem79.L MO, 5'-TGTTTCAGGAGACACCAT-TGGACTT-3' (SEQ ID NO: 25); Usp8 MO, 5'-GCTGCAAATTCTCCTCTCTTATCAA-3' ((SEQ ID NO: 26; Gene Tools, LLC). Phylogeny analysis and protein sequences. TMEM79 protein sequences were derived from full-length NCBI accessions and genomic sequences. Human (*Homo sapiens*): NP_115699.1 (SEQ ID NO: 27), Chimpanzee (Pan troglodytes): XP_001165258.1 (SEQ ID NO: 28), Rat (*Rattus norvegicus*): NP_001029068.1 (SEQ ID NO: 29), Mouse (*Mus musculus*): NP_077208.1 (SEQ ID NO: 30), Chicken (*Gallus gallus*): XP_024999333.1 (SEQ ID NO: 31), Frog (*Xenopus laevis*): XP_018089022.1 (SEQ ID NO: 32), Zebra fish (*Danio rerio*): XP_009290676.1 (SEQ ID NO: 33) and Coelacanth (*Latimeria chalumnae*): XP_014351966.1 (SEQ ID NO: 34). The Protein sequences encoded by mouse MAPEG family (Membrane-Associated Proteins in Eicosanoid and Glutathione metabolism, pfam01124) members protein sequences were derived from full-length NCBI accessions and genomic sequences. Mgst1: NP_001334418 (SEQ ID NO: 35), Mgst2: NP_001297411.1 (SEQ ID NO: 36), Mgst3: NP_079845.1 (SEQ ID NO: 37), Flap: NP_033793.1 (SEQ ID NO: 38) and Ltc4s: NP_032547.1 (SEQ ID NO: 39). The Protein sequences from different vertebrate species of TMEM79 were aligned using ClustalW2 multiple sequence-alignment software. The protein sequence from MAPEG superfamily members were aligned to TMEM79 using ClustalW2 multiple sequence alignment software. Black color represent identical amino acid residues and grey color represent conservative amino acid residues. The TMEM79 evolutionary history was inferred using the Neighbor-Joining method (Saitou and Nei, 1987, Molecular biology and evolution 4:406-425). The optimal tree with the sum of branch length=2.71961709 is shown. The percentages of replicate trees in which the associated taxa clustered together in the bootstrap test (1000 replicates) are shown next to the branches (Felsenstein, 1985, Evolution; international journal of organic evolution 39:783-791). The tree is drawn to scale, with branch lengths in the same units as those of the evolutionary distances used to infer the phylogenetic tree. The evolutionary distances were computed using the Poisson correction method (Zuckerkandl and Pauling, 1965, Evolutionary divergence and convergence in proteins. Edited in Evolving Genes and Proteins by V. Bryson and H. J. Vogel, pp. 97-166. Academic Press, New York) and are in the units of the number of amino acid substitutions per site. This analysis involved 8 amino acid sequences. All ambiguous positions were removed for each sequence pair (pairwise deletion option). There were a total of 534 positions in the final dataset. Evolutionary analyses were conducted in MEGA X (Kumar et al., 2018, Molecular Biology and Evolution 35:1547-1549). The identity between species was determined by GeneCode software.

TMEM79 is a Specific Antagonist of Wnt Signaling

Figure 8B:
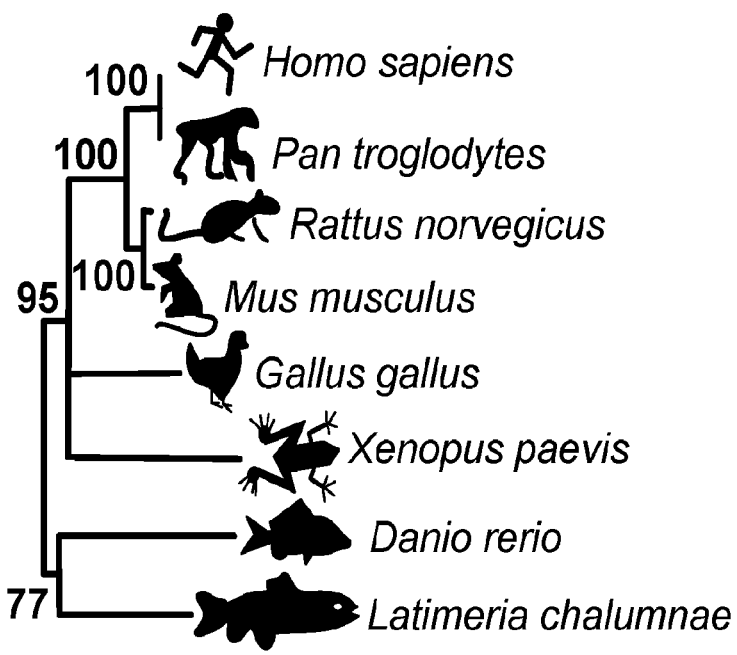
Figure 8C:
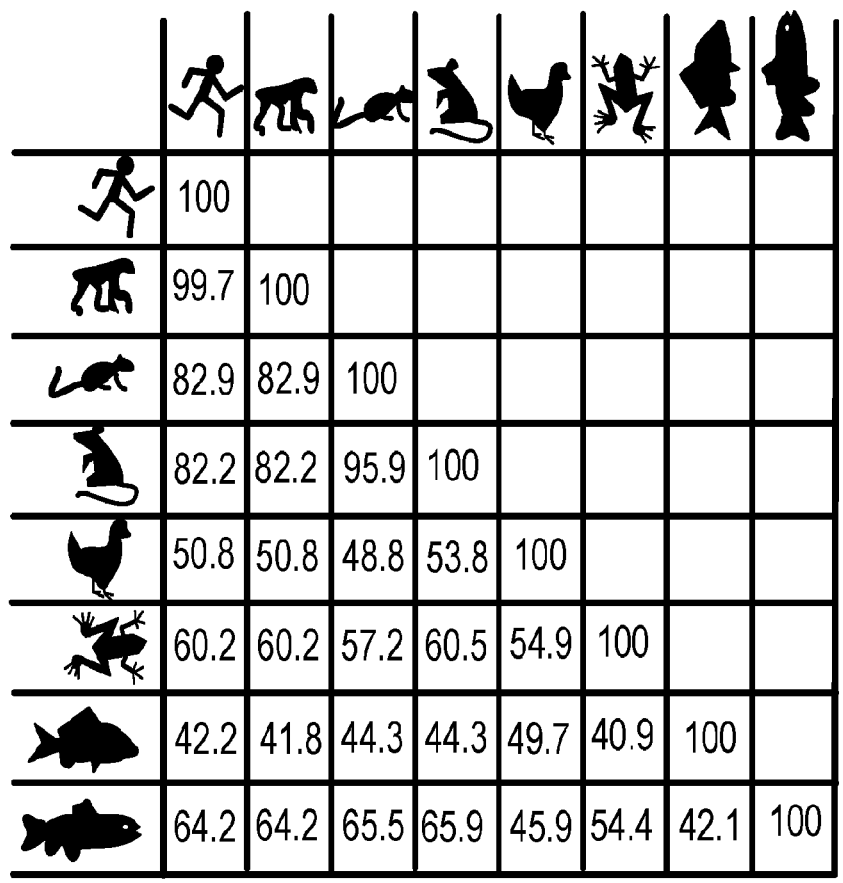
Figure 9A:
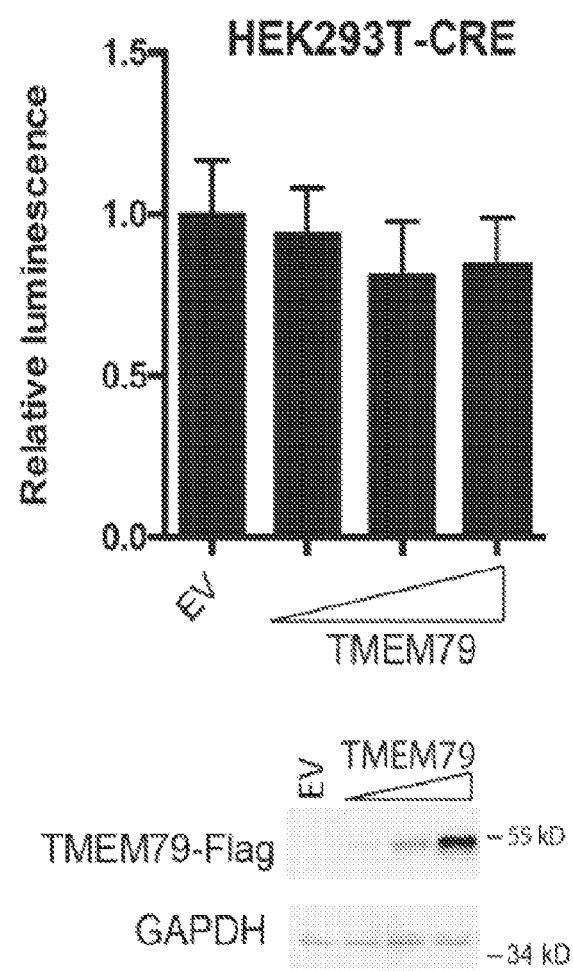
Figure 9B:
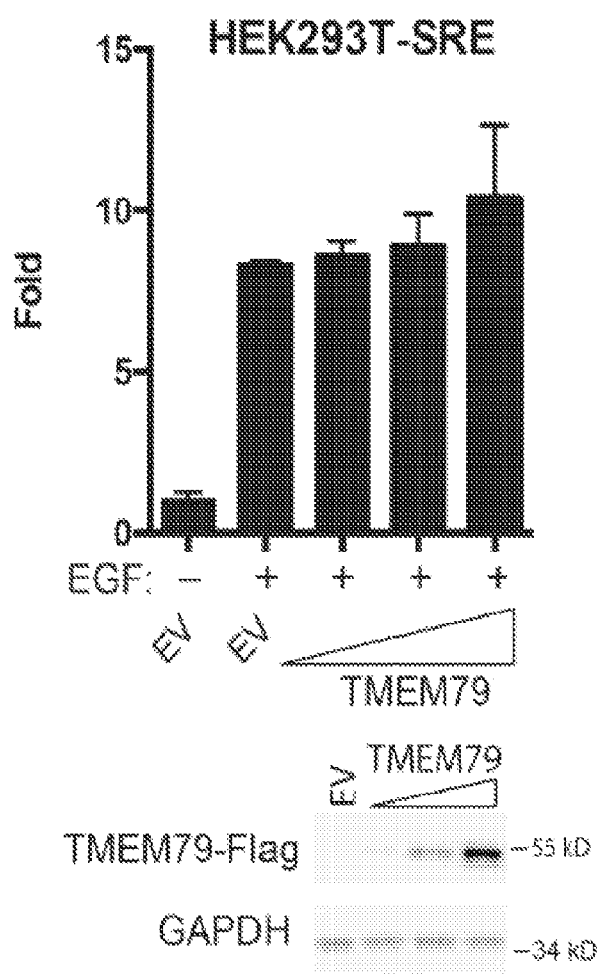
Figure 9C:
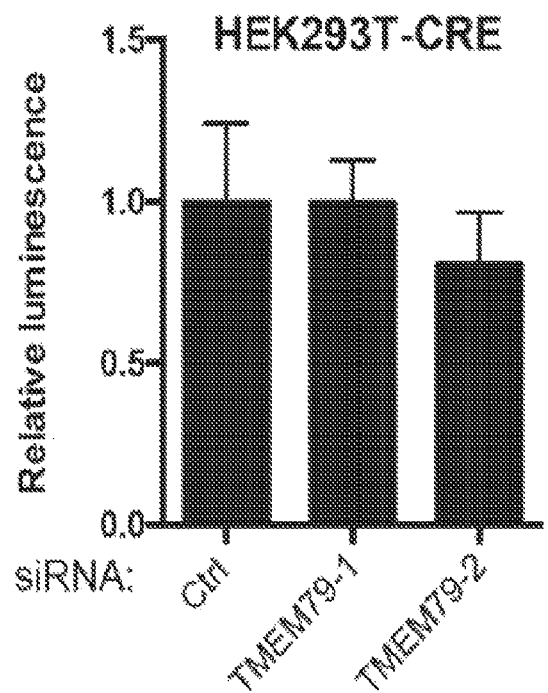
Figure 9D:
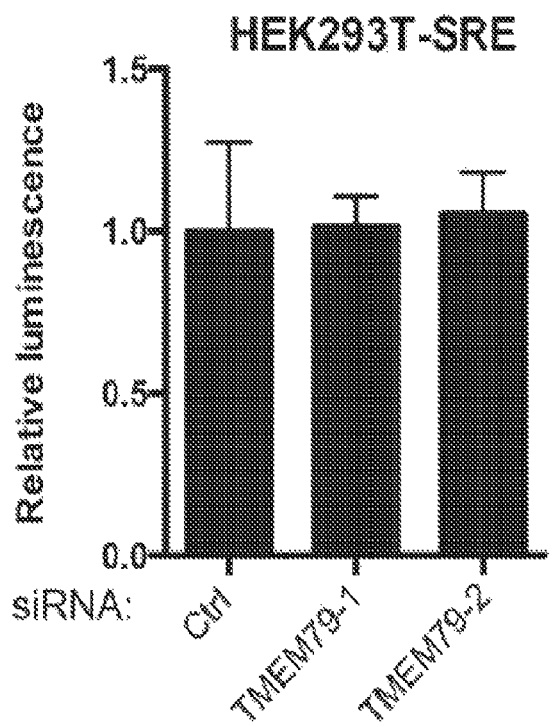
Figure 10C:
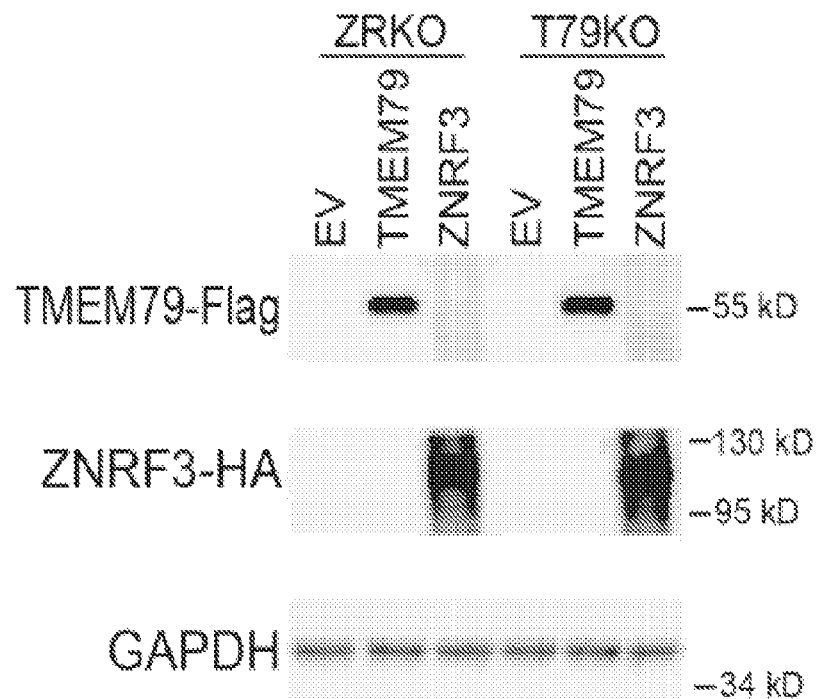
Figure 10D:
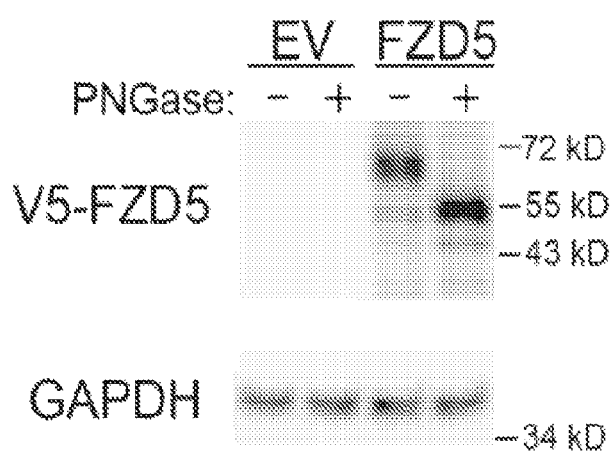
Figure 10E:
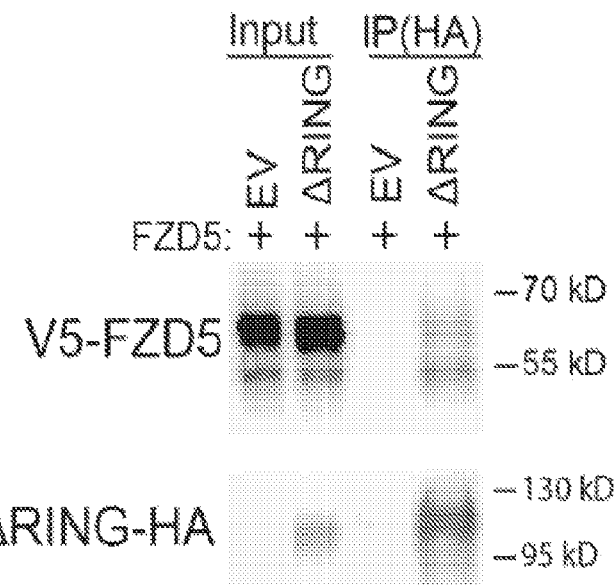
Figure 10F:
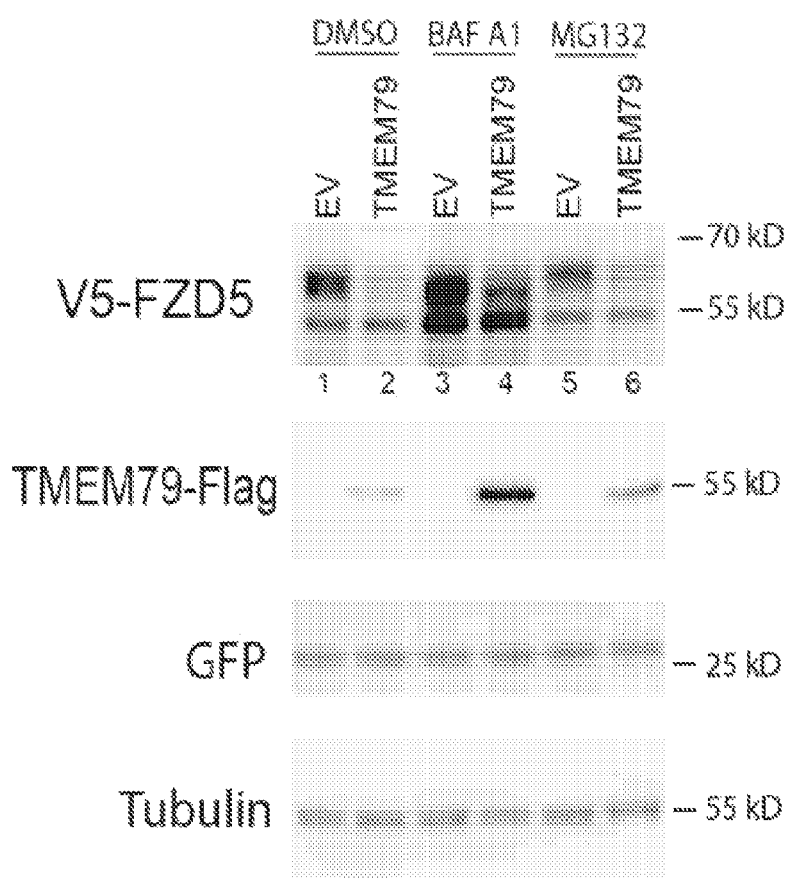
Figures 11A, 11B:
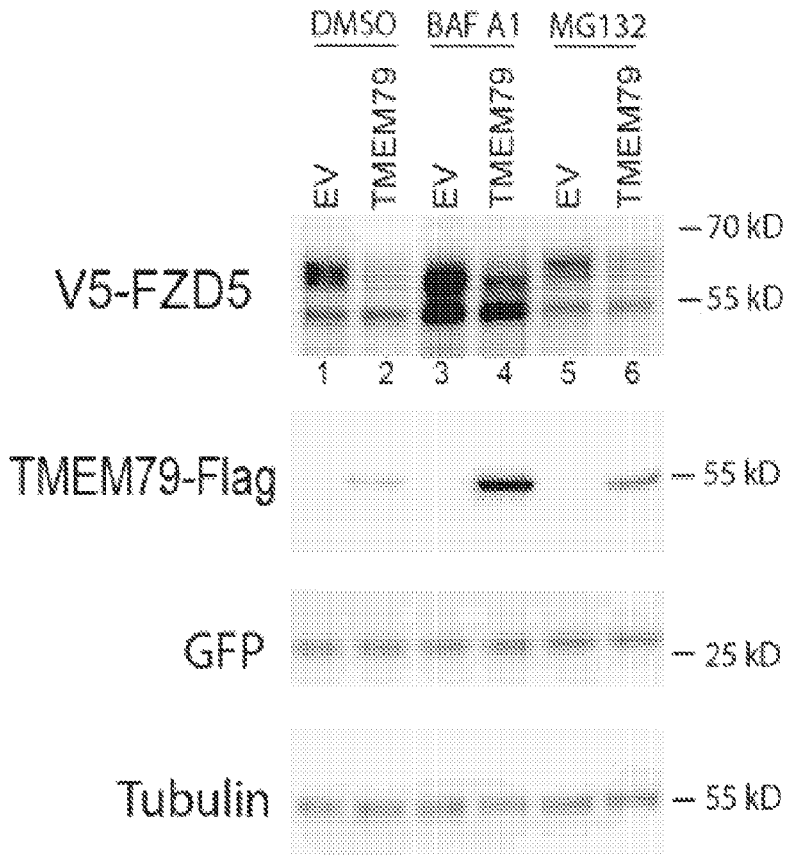
FIGS. 11A-11F show identification of USP8 as a TMEM79 binding partner by tandem affinity purification-coupled mass spectrometry, (related to FIG. 5). Panel A shows tandem affinity purified proteins were resolved by SDS-PAGE gel and visualized by silver staining. Identical IPs of EGFP-expressing cell extracts served as a negative control. The TMEM79 bait protein is marked, as is the gel fraction that led to USP8 mass spectrum identification. Panel B is genomic DNA sequencing showing frame shift mutations in USP8 KO alleles (SEQ ID NOs: 42 and 43). Panel C shows ZNRF3 inhibited Top-Flash reporter activity effectively in USP8 KO cells. Panel D shows overexpression of TMEM79 did not affect FZD5 and USP8 interaction. This experiment most likely ruled out a simple scenario that TMEM79 inhibits USP8 deubiquitination of FZD5 by competing with FZD5 for USP8. Panel E shows FZD5 bound to USP8 in the absence of TMEM79 in T79KO cells. Panel F shows USP8 bound to TMEM79 in the absence of FZD in FZD null cells.
Figure 11C:
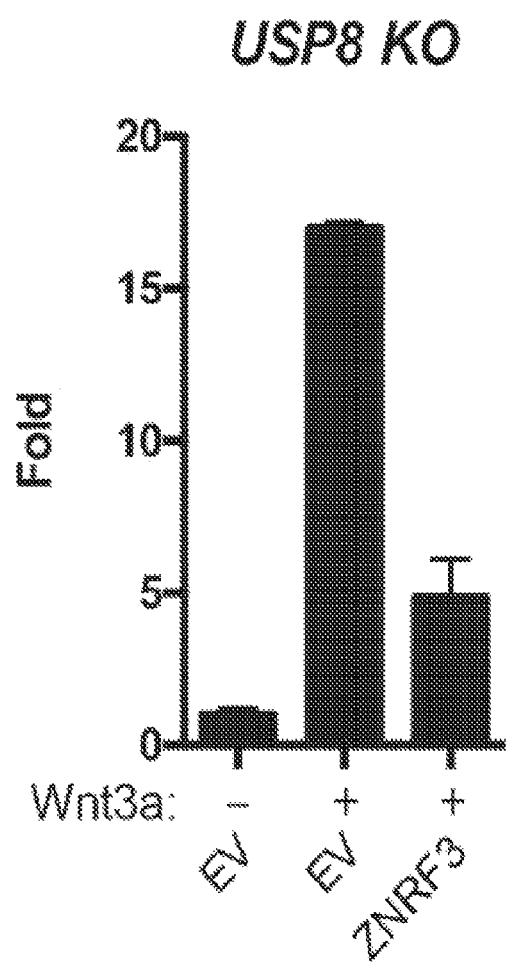
Figure 11D:
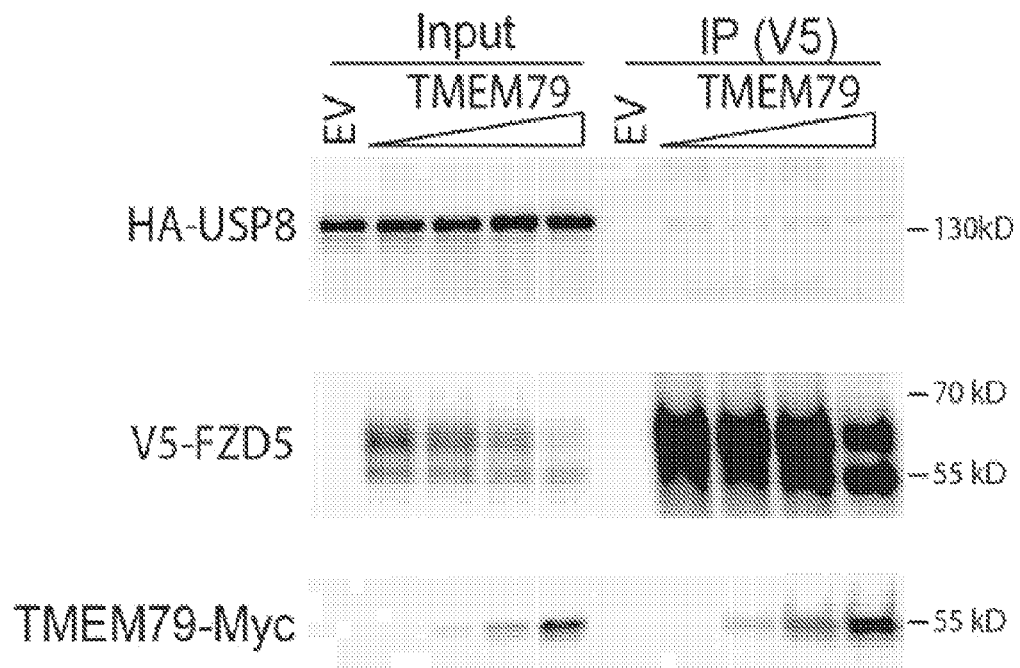
Figure 11E:
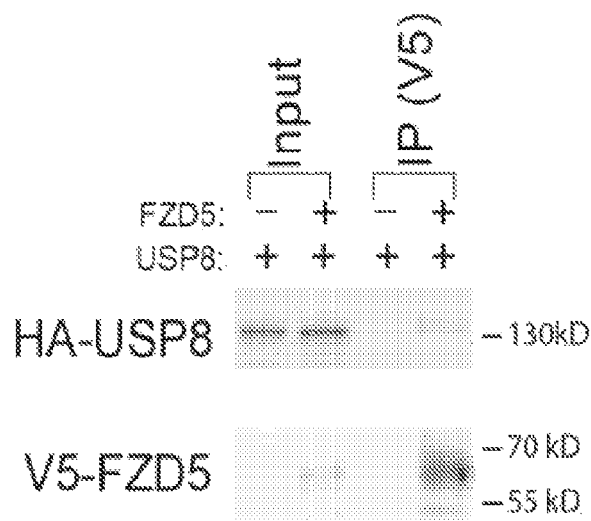
Figure 11F:
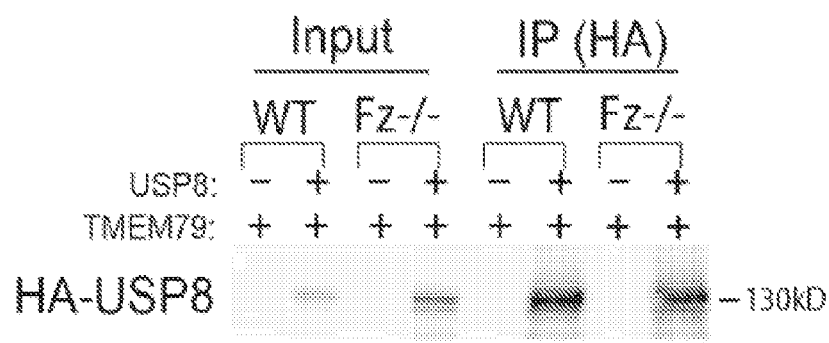
Figure 12A:
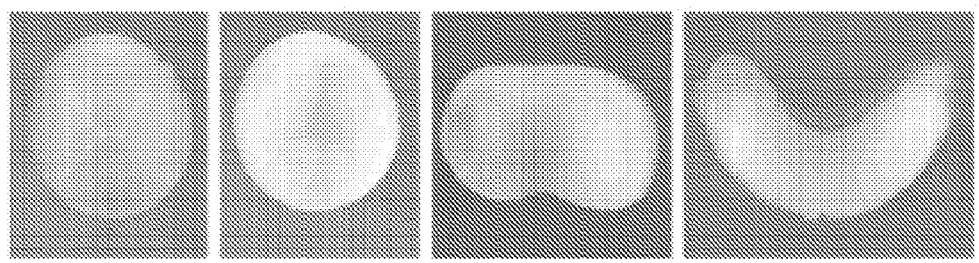
FIGS. 12A-12E show that Tmem79 is required for anterior neural patterning without affecting the head organizer, (related to FIG. 6). Panel A shows that a Tmem79 sense probe did not show any hybridization signal. Panel B shows that Tmem79MO inhibited protein synthesis of the *Xenopus* Tmem79 (xTmem79) mRNA, but not of the mouse Tmem79 (mTmem79) mRNA. Panel C shows Usp8MO inhibited protein synthesis from the *Xenopus* Usp8 (xUsp8) mRNA, but not the mutant Usp8 (x-mutUsp8) mRNA, in which several nucleotides in the MO-targeting 5'-UTR of xUsp8 has been altered. GAPDH is a protein loading control. Panel D shows Tmem79 MO reduced expression of anterior and mid/hind brain markers Bf1, Krox20, and En2, an anterior (cement gland) marker Xag, and a neuronal marker ntubulin, examined at stage 16. Co-injection of TMEM79 with Tmem79MO rescued expression of these markers. Panel E shows Tmem 79MO affected neither expression of head organizer genes (Goossecoid, Chordin, Dkk1, and Lim1) nor that of dorsal genes (xnr3 and xnot) at stages 10.5-11.
Figure 12B:
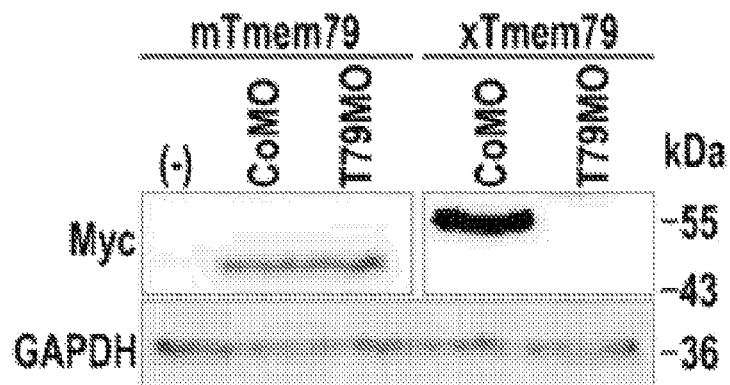
Figure 12C:
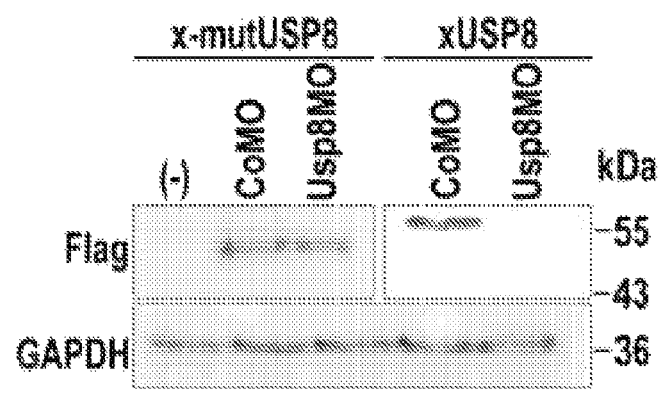
Figure 12D:
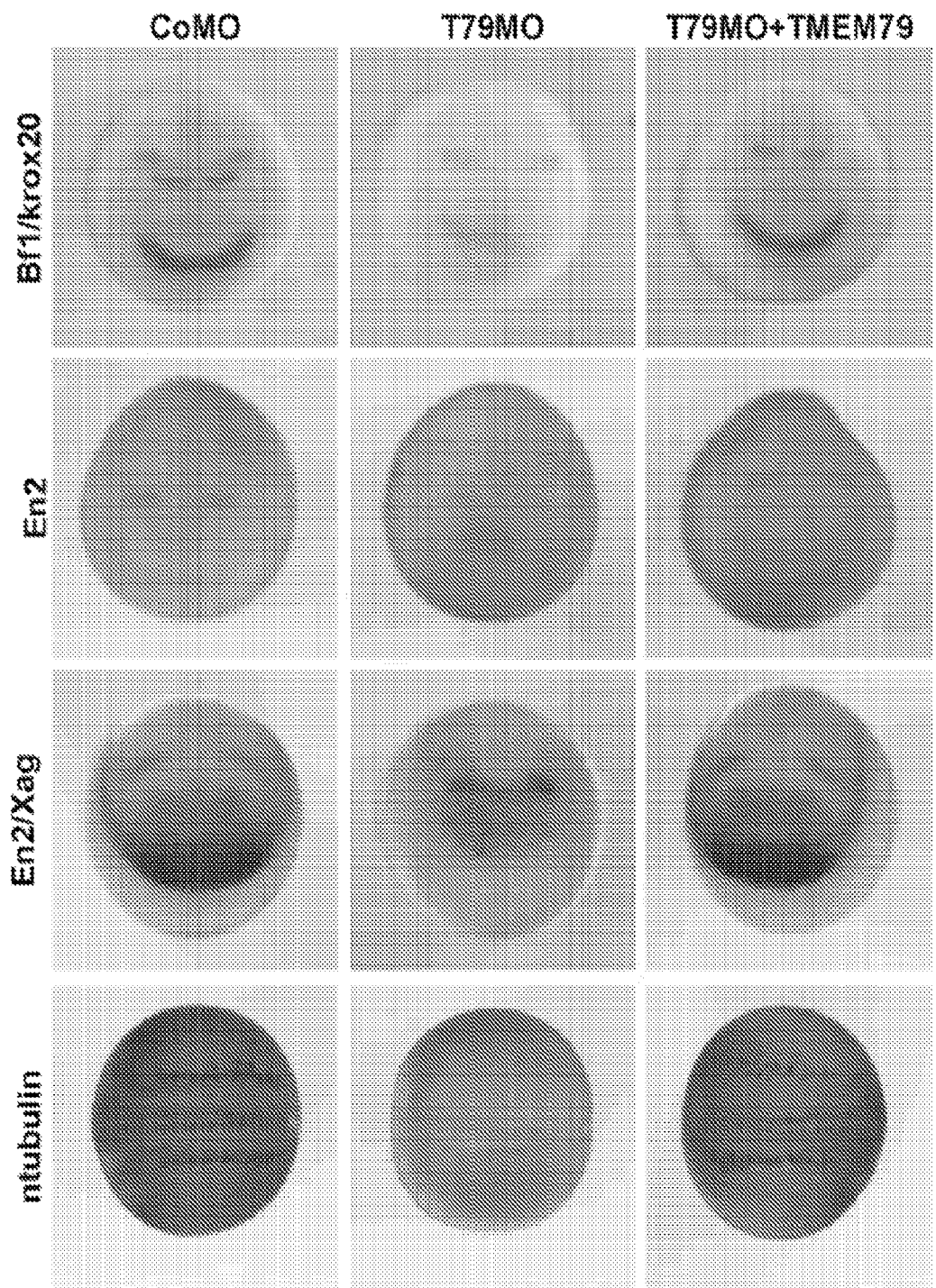
Figure 12E:
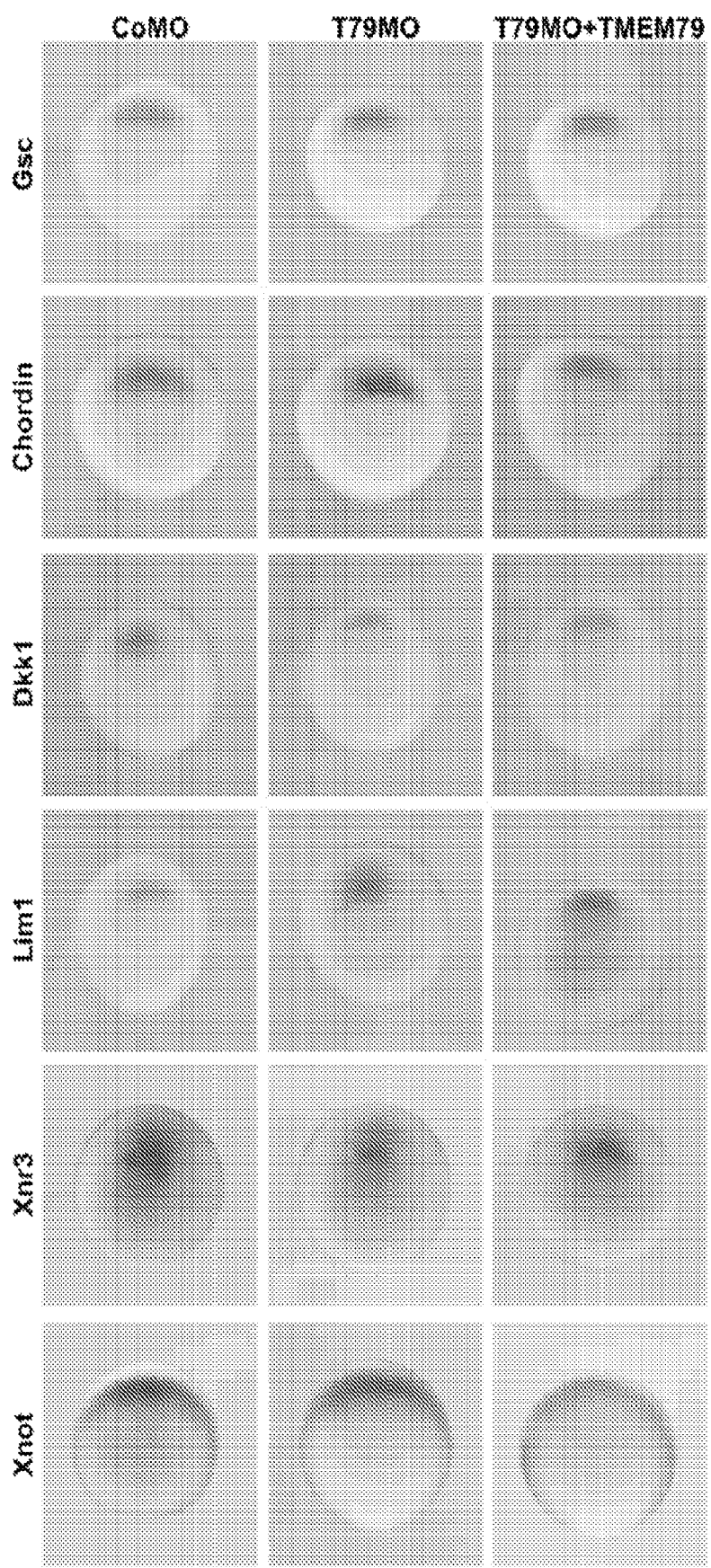

The Wnt/β-catenin pathway, which regulates gene expression through Wnt-regulated transcription coactivator β-catenin, plays central roles in embryogenesis, homeostasis, and human diseases (Clevers, H., Cell, 2006. 127 (3): p. 469-80; MacDonald, B. T., K. Tamai, and X. He, Dev Cell, 2009. 17 (1): p. 9-26). We performed genome-wide CRISPR/Cas9 loss-of-function screening in human HEK293T cells for negative components of Wnt/β-catenin signaling using an established Wnt-responsive reporter system (FIG. 1, Panels A and B). Validating our screening strategy, top hits from two independent screens were mostly identical and included genes encoding known Wnt pathway components, such as APC (the adenomatous polyposis coli gene product) and CK1a (casein kinase 1α), both components of the β-catenin destruction complex (Gammons and Bienz, 2018, Current opinion in cell biology 51:42-49; MacDonald et al., 2009, Developmental cell 17:9-26), as well as ZNRF3 (FIG. 1, Panel C). RNF43 is minimally expressed in HEK293T cells (Hao et al., 2012, Nature 485:195-200.). Among top hits we focused on TMEM79, which encodes a putative five-pass transmembrane protein (Sasaki et al., 2013; Saunders et al., 2013) (FIG. 1, Panels C and D and FIG. 8). Of interest, a Tmem79 gene mutation in matted (Tmem 79ma/ma) mice causes atopic dermatitis (AD) and matted hair phenotypes, and TMEM79 is a predisposition gene for AD in human (Sasaki et al., 2013, The Journal of allergy and clinical immunology 132:1111-1120 e1114; Saunders et al., 2013, The Journal of allergy and clinical immunology 132:1121-1129.).

Figure 2A:
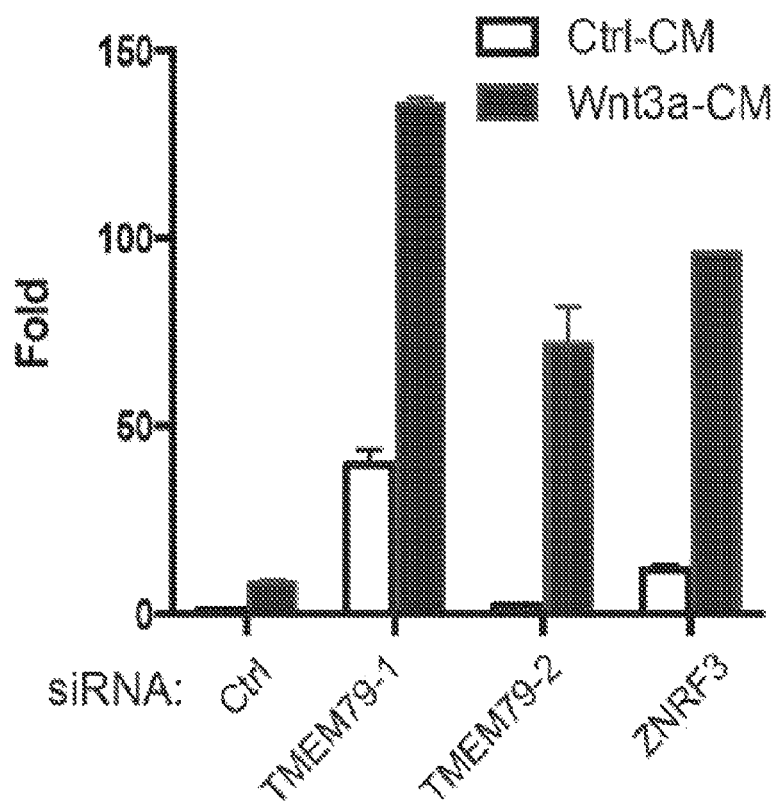
FIGS. 2A-2C show that TMEM79 is a specific inhibitor for Wnt/β-catenin signaling. Panel A shows that siRNA depletion of TMEM79 enhanced Top-Flash reading. A ZNRF3 siRNA acted as a positive control. CM, conditioned medium. Panel B shows TMEM79 dose-dependently decreased Top-Flash reading. FOP, negative control (mutant) luciferase reporter. EV, empty vector. Inset: immunoblot of TMEM79 proteins, with β-actin as loading control. Panel C shows in animal pole explants of Xenopus embryos, TMEM79 inhibited xnr3 expression induced by Wnt8 but not by β-catenin. TMEM79 did not inhibit target gene expression induced by Nodal, FGF, BMP, or Shh. WE, whole embryo. Uninj, uninjected.
Figure 2B:
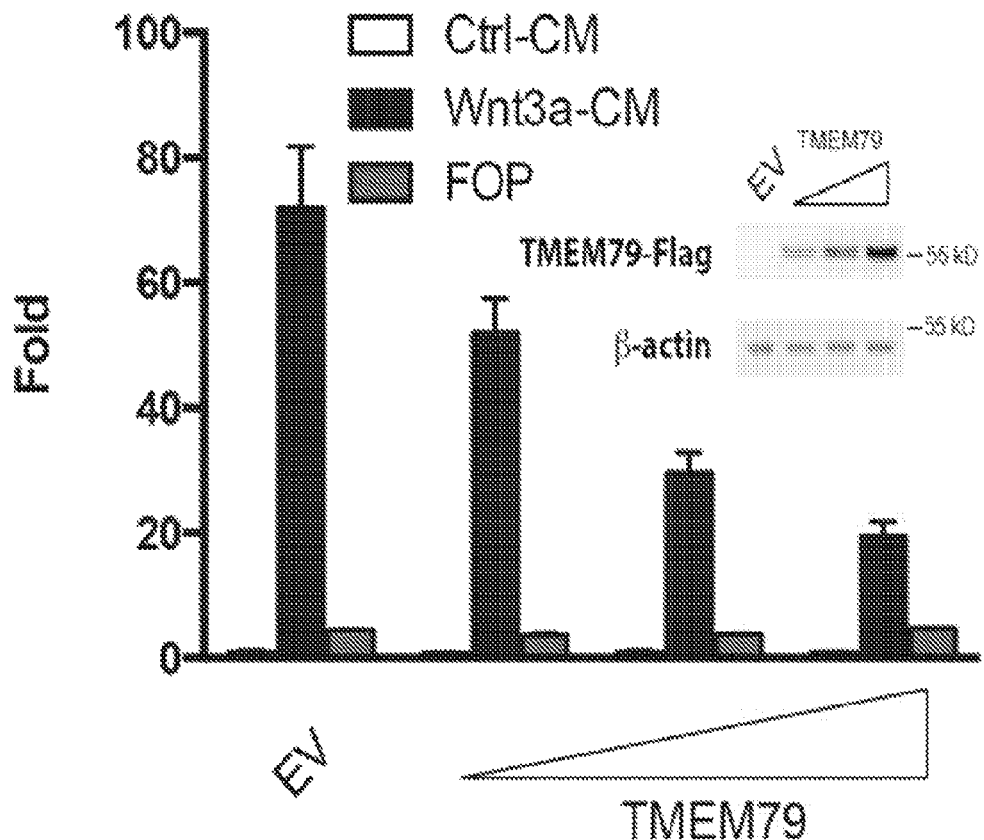
Figure 2C:
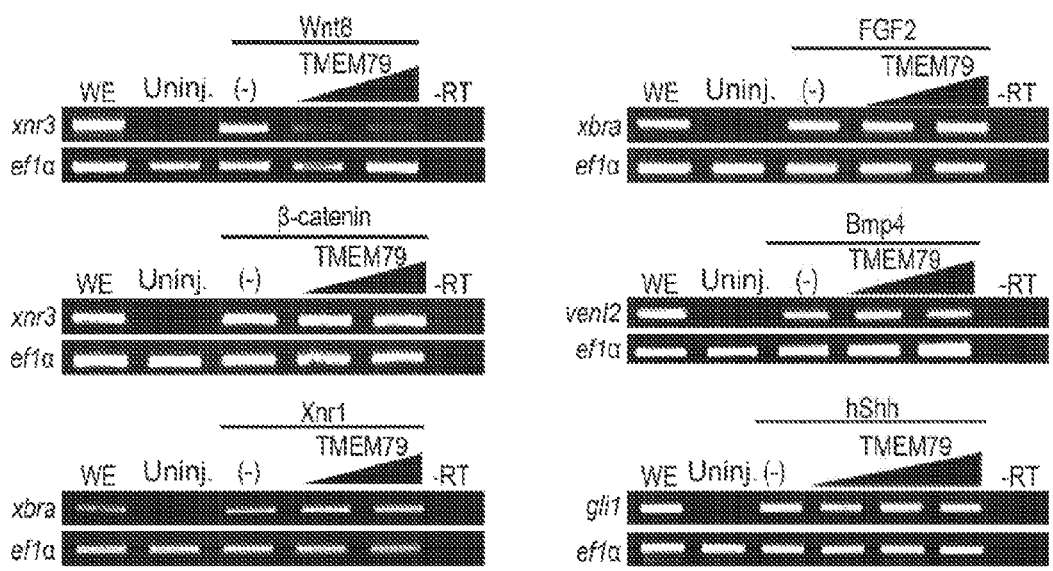
Figure 3A:
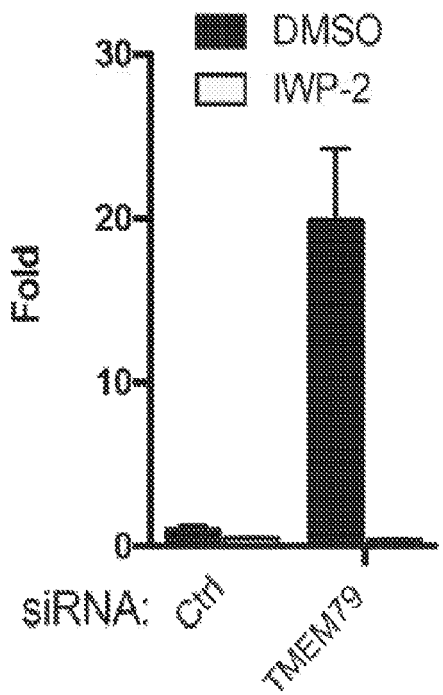
FIGS. 3A-3J show TMEM79 down-regulation of surface levels of FZD independent of ZNRF3/RNF43. Panel A demonstrates that IWP-2 abolished Top-Flash reporter expression induced by a TMEM79 siRNA. Panel B shows phosphorylation of LRP6 and DVL2 was elevated in T79KO and ZRKO cells, and the elevation was inhibited by IWP-2. Panel C shows that endogenous FZD5 levels were elevated in T79KO and ZRKO cells comparably. Panels D and E show that TMEM79 and ZNRF3 inhibited Wnt signaling independent of each other. Panel F shows co-IP of TMEM79-Flag with endogenous FZD5 but not LRP6. Panel G shows TMEM79 bound to each FZD (FZD1 to 8) but not SMO. Panel H shows that TMEM79 bound preferentially to immature form of FZD5. Panel I shows that TMEM79 reduced the surface level of FZD5 using the cell surface protein biotinylation assay. Note either TMEM79 or ZNRF3 reduced the upper band (the matured and biotinylated form) of FZD5 in the input lanes and streptavidin bead-precipitated lanes. strep, streptavidin agarose. Panel J shows that FZD5-K0 was resistant to down-regulation by TMEM79 or ZNRF3.
Figure 3B:
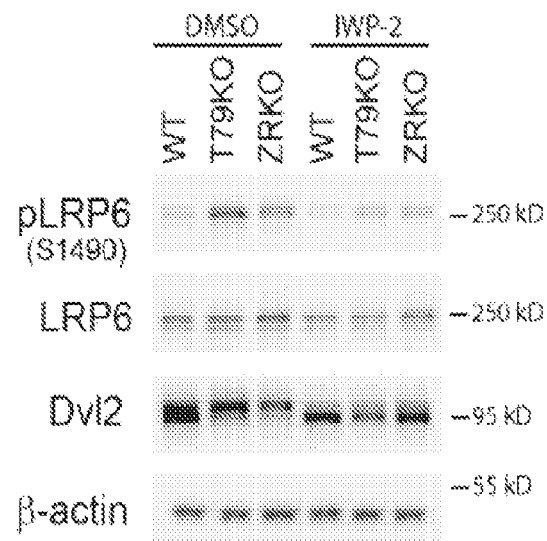
Figure 3C:
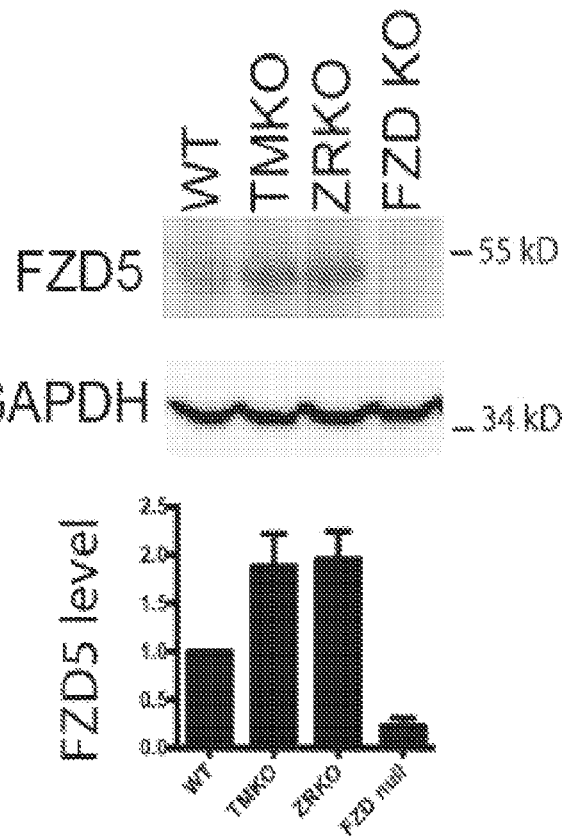
Figure 3D:
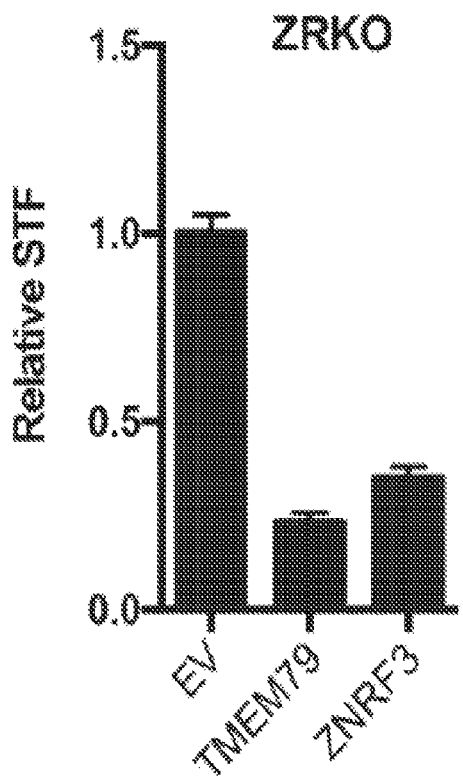
Figure 3E:
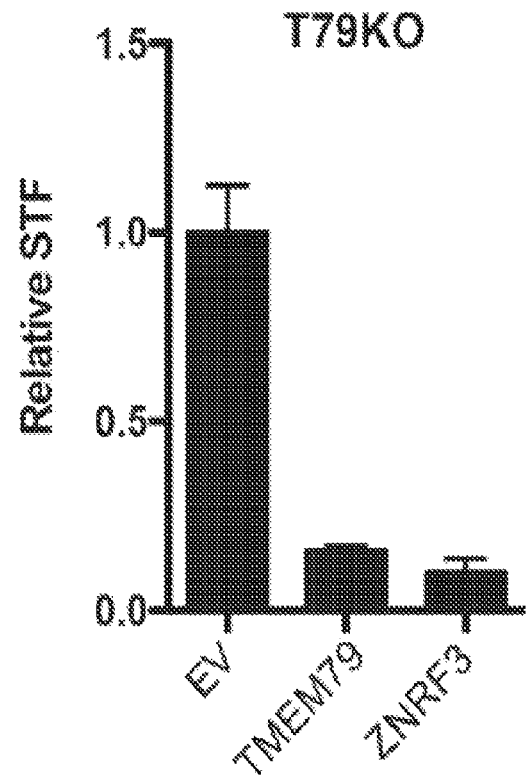
Figure 3F:
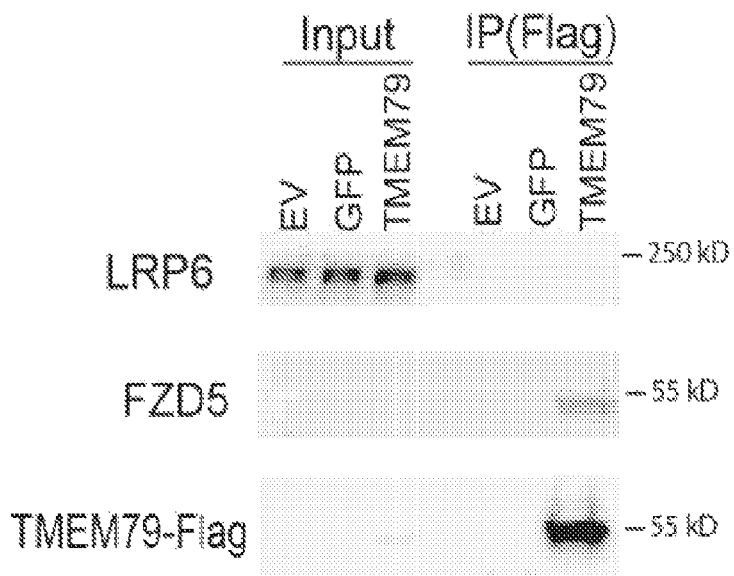
Figure 3G:
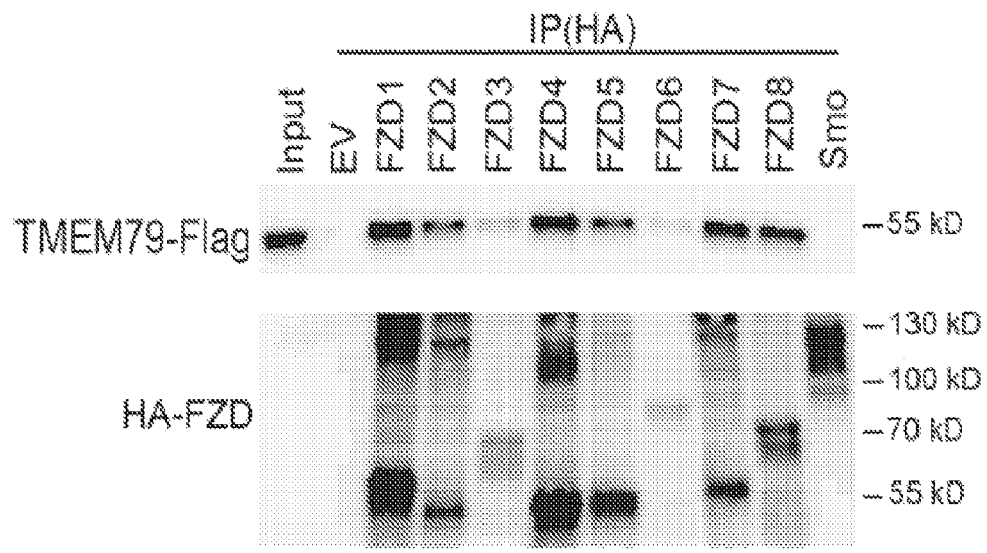
Figure 3H:
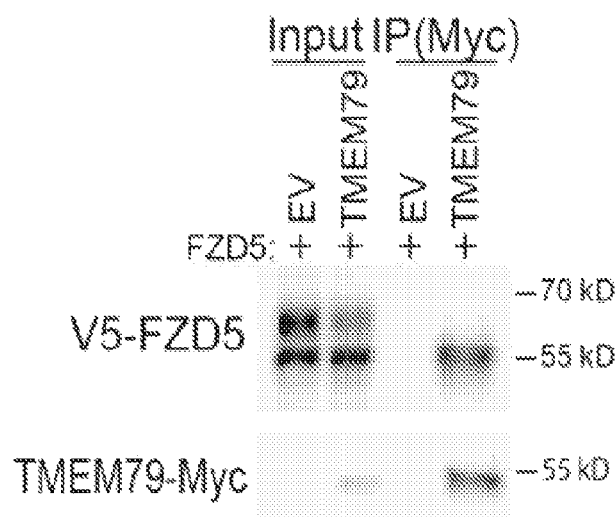
Figure 3I:
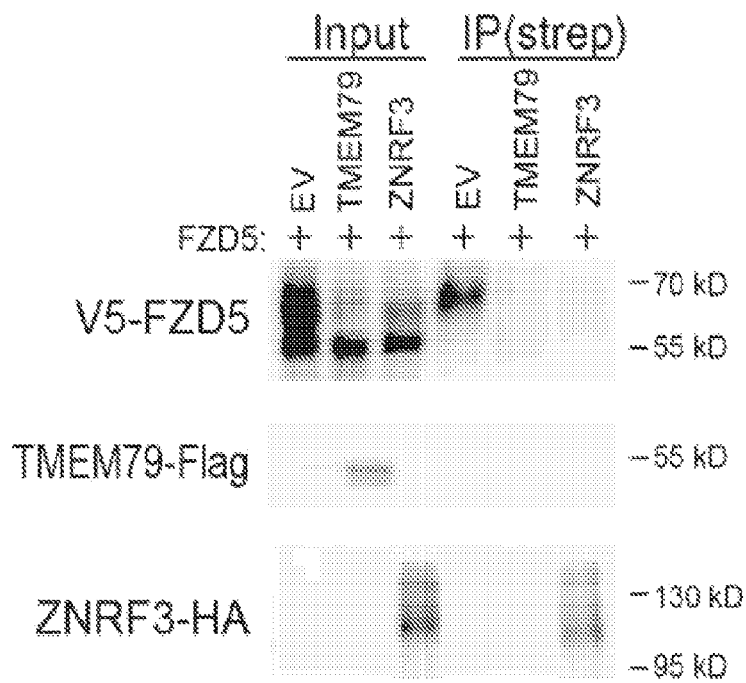
Figure 3J:
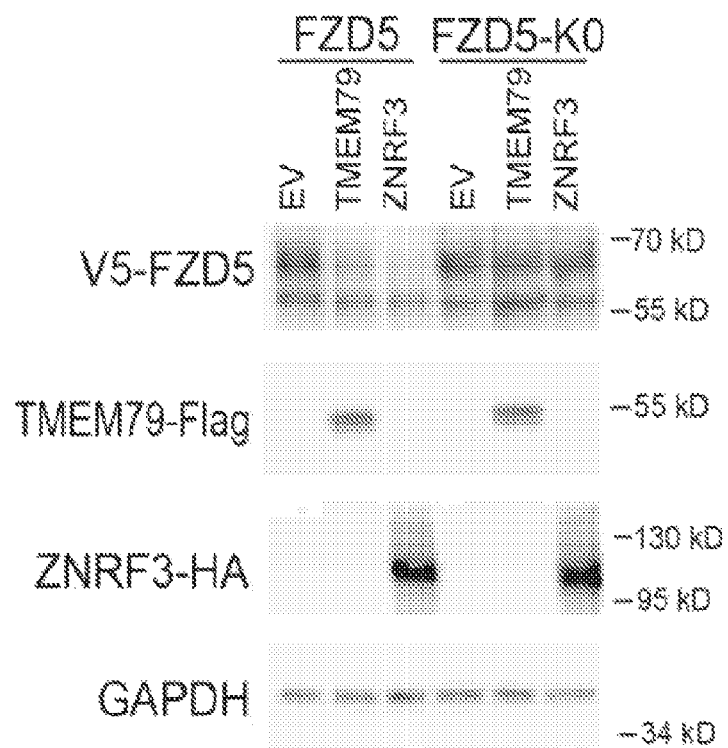
Figure 4A:
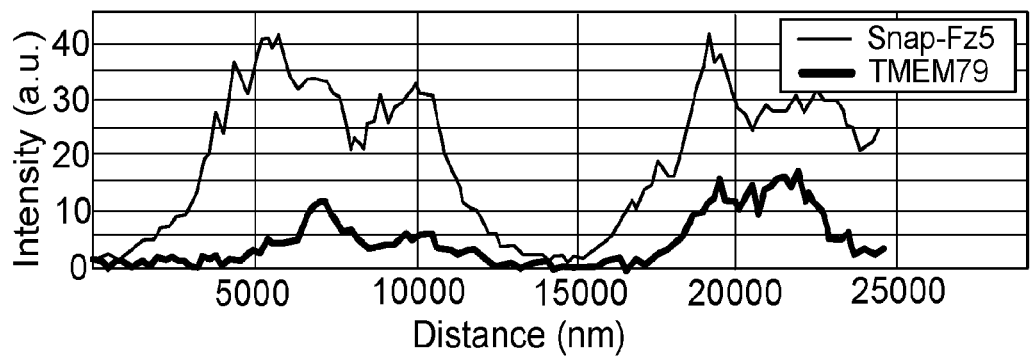
FIGS. 4A-4D show TMEM79 is an ER-resident protein. Panel A shows that TMEM79 is not present at the PM. The PM was labeled by transfected Snap-FZD5 using SNAP-Surface® 488. No overlap was observed between TMEM79 and the PM marker. Extensive overlap was seen between TMEM79 and Snap-FZD5 internally, likely in ER. Panel B shows that TMEM79 is at the ER. PDI (protein disulfide isomerase) served as an ER marker, TMEM79 and PDI staining patterns overlapped extensively. Panel C shows that TMEM79 was observed at the lysosome. LAMP1 (lysosomal-associated membrane protein 1) served as a Lysosomal marker, and TMEM79 and LAMP1 staining patterns overlapped sometimes. Panel D shows that TMEM79 was not present at the Golgi membrane. TGN46 (trans-Golgi marker 46) served as a Golgi marker. No overlap was observed between TMEM79 and TGN46.
Figure 4B:
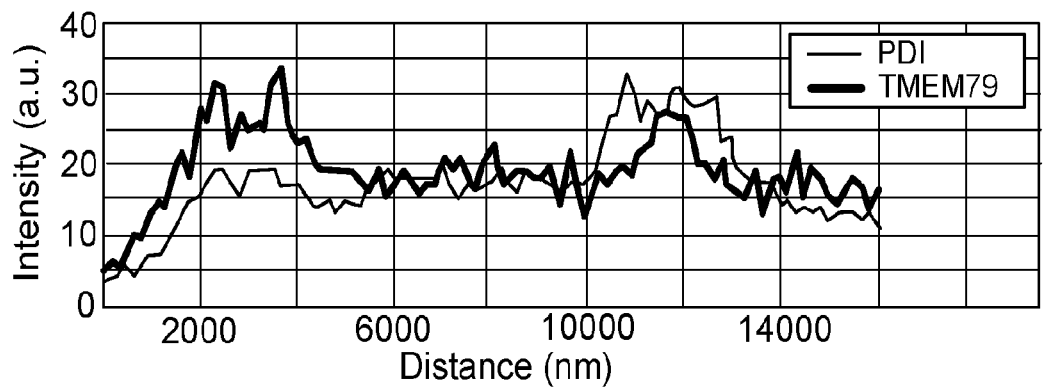
Figure 4C:
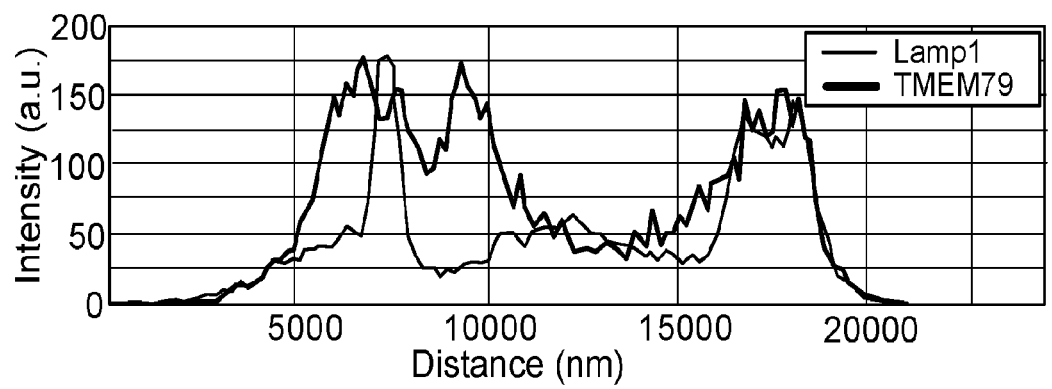
Figure 4D:
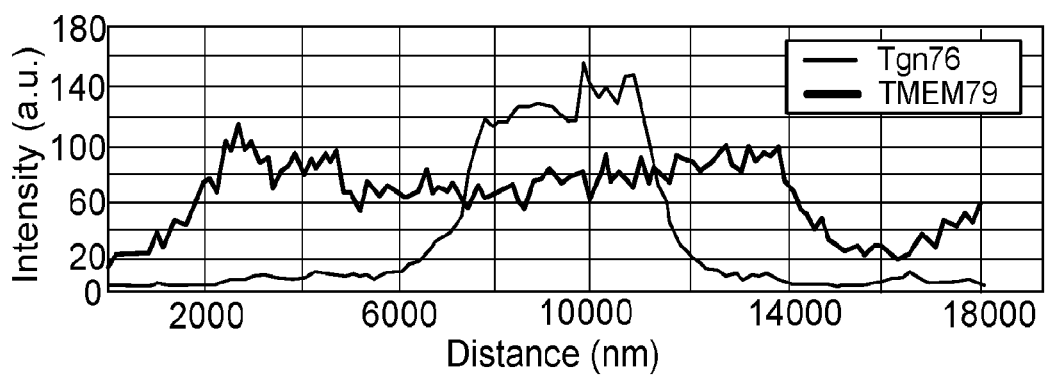
Figure 5A:
FIGS. 5A-5I shows TMEM79 inhibition of FZD deubiquitination by USP8. Panel A is a schematic diagram of USP8. USP8N, USP8 N terminus; USP8C, USP8 C terminus. Panel B shows activation of Top-Flash reporter activity by USP8C was abolished by porcupine inhibitor IWP-2 or by TMEM79. Panel C shows TMEM79 bound to USP8C or USP8CA, in which the 14-3-3 binding motif is deleted, but not USP8N. Panel D shows levels of mature FZD5 were reduced by TMEM79 or TMEM79-AC, but none of the other TMEM79 mutants. Panel E shows that TMEM79 or TMEM79-AC, but none of the other TMEM79 mutants, bound to USP8C. Panel F shows that Wnt response in USP8-KO cells was reduced, and was no longer inhibited by TMEM79. Panel G shows that USP8 or USP8C bound preferentially to the immature form of FZD5. Panels H and I show that TMEM79 inhibited USP8C deubiquitination of FZD5, but not SMO.
Figure 5B:
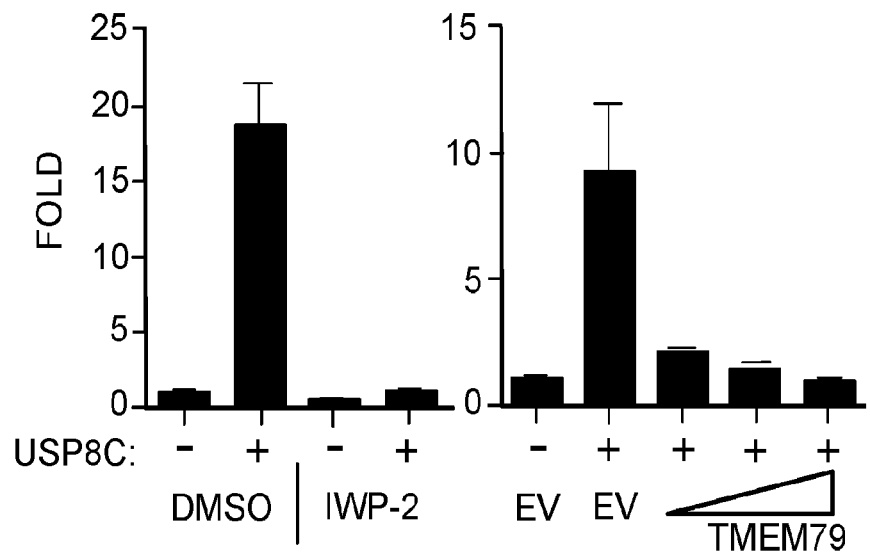
Figure 5C:
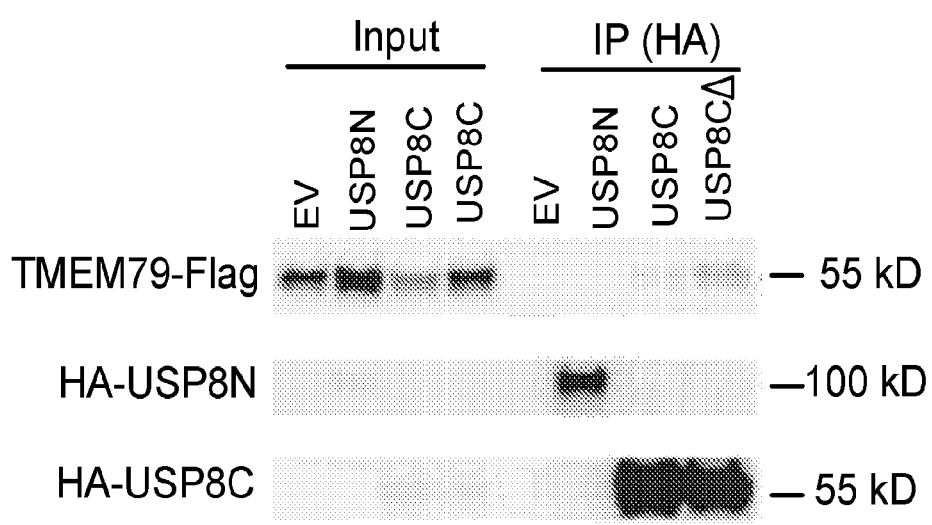
Figure 5D:
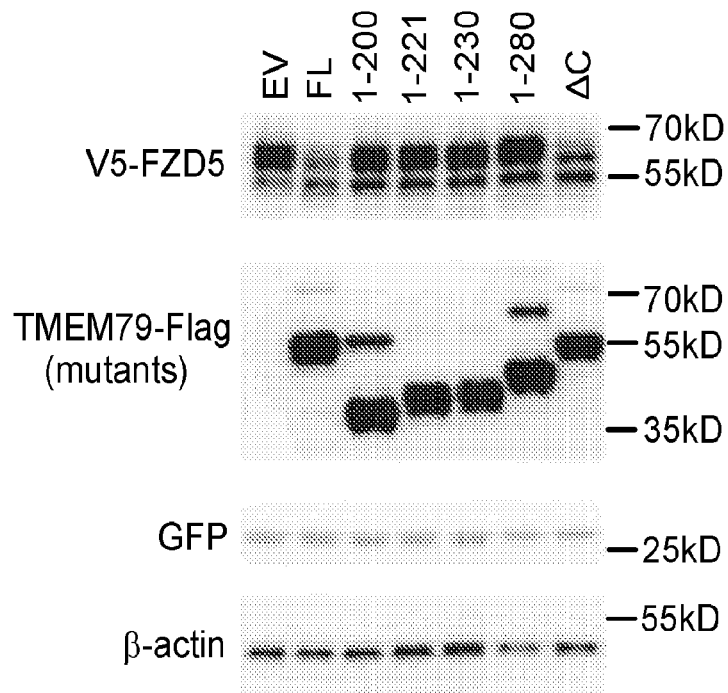
Figure 5E:
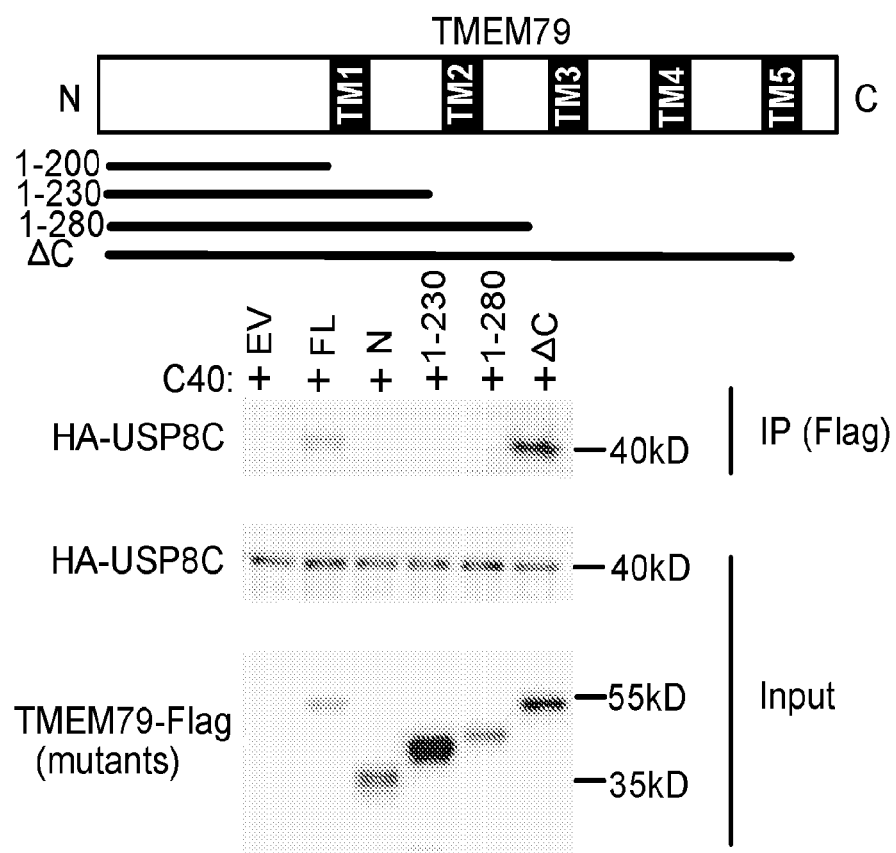
Figure 5F:
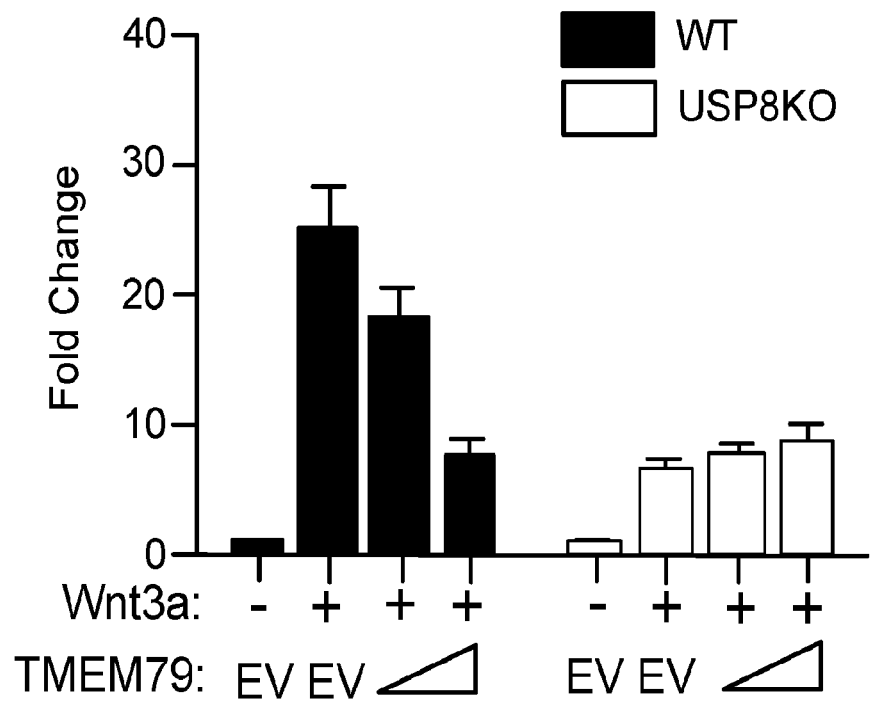
Figure 5G:
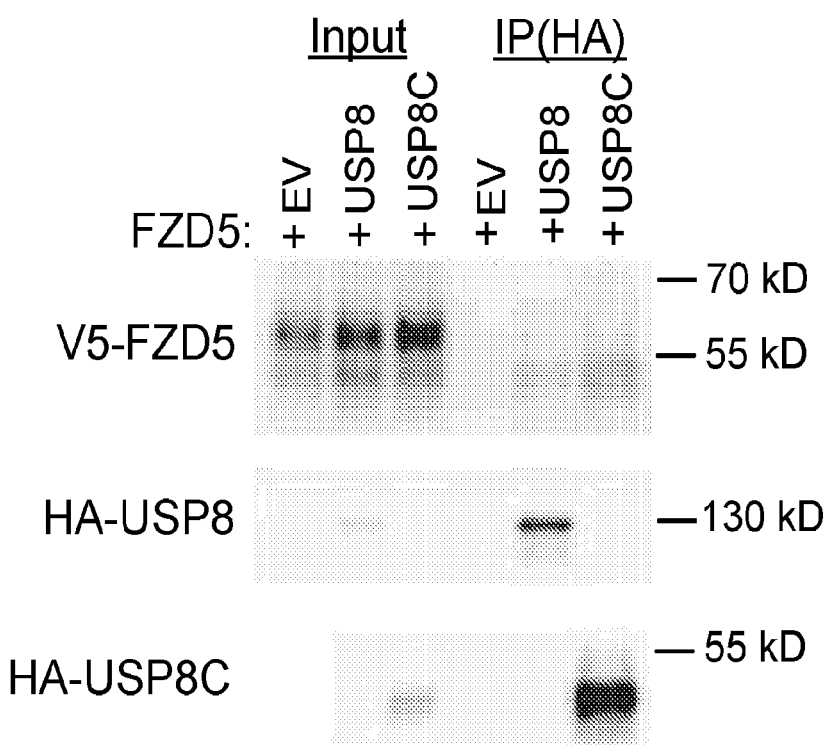
Figure 5H:
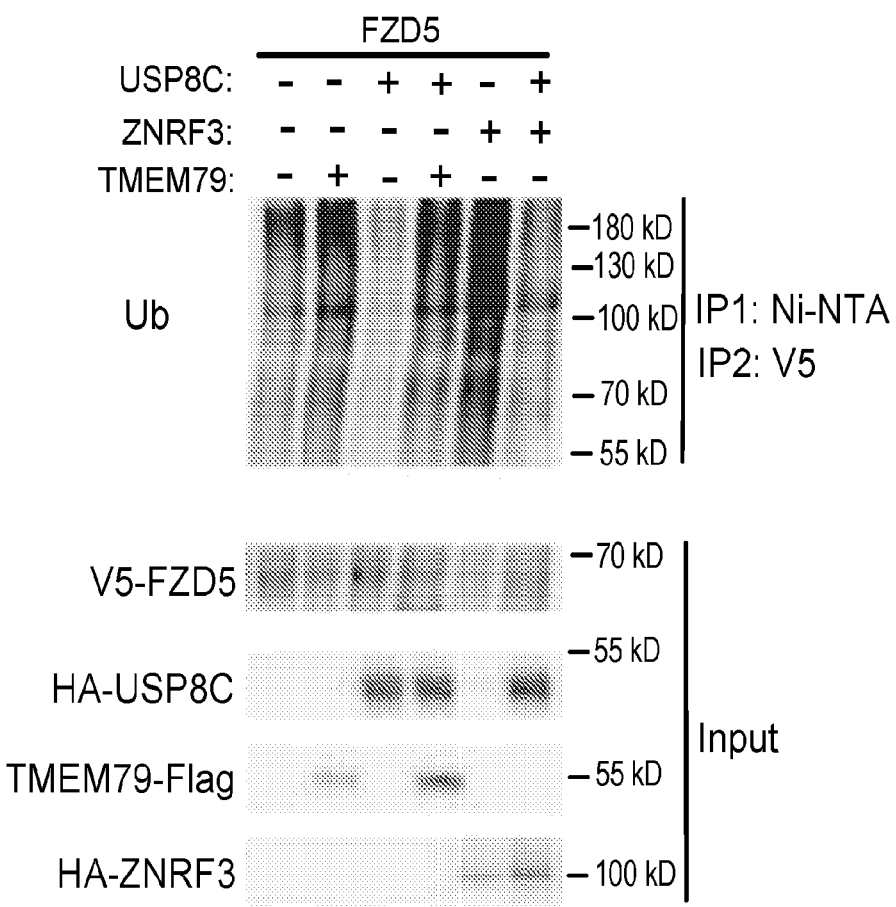
Figure 5I:
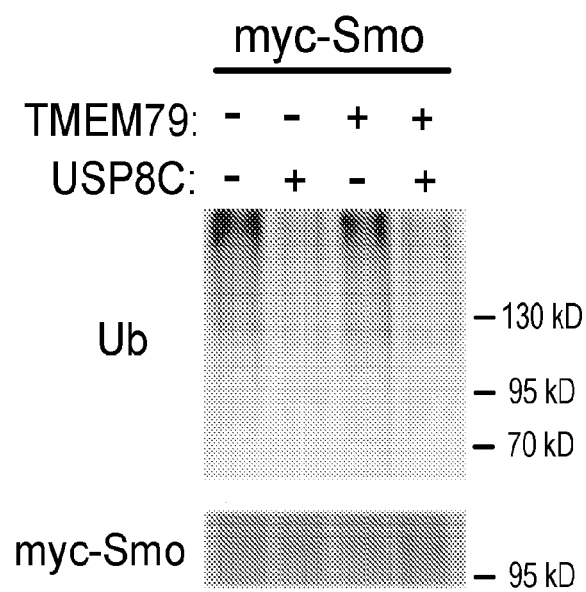

Complementary to the screening results, depletion of TMEM79 via siRNAs increased a WNT-responsive reporter (TOP-Flash) activity with or without Wnt3a stimulation, similar to that by siRNA depletion of ZNRF3 (FIG. 2, Panel A), while overexpression of TMEM79 decreased TOP-Flash activation by Wnt3a (FIG. 2, Panel B). TMEM79 knockdown or overexpression had no effect on the control FOP-Flash (FIG. 2, Panel B) or other stimuli responsive reporters (FIG. 9, Panels A-D). In Xenopus embryo explants, TMEM79 blocked signaling by Wnt8, but not by FGF (fibroblast growth factor), Nodal/TGFβ (transforming growth factor-β), BMP (bone morphogenic protein), or Shh (Sonic Hedgehog) (FIG. 2, Panel C), attesting TMEM79 as a specific Wnt antagonist. TMEM79 did not inhibit signaling by β-catenin (FIG. 2, Panel C) or by a compound GSK3 inhibitor that stabilizes β-catenin (FIG. 9, Panel E), thus acting upstream of the β-catenin degradation complex.

TMEM79 Downregulates the FZD Protein Level Independent of ZNRF3 RNF43

IWP-2, a compound inhibitor specific for the PORCUPINE acyl-transferase required for Wnt lipid modification and secretion (Chen et al., 2009, Nature chemical biology 5:100-107; Willert and Nusse, 2012, PLOS biology 10: e1001238), suppressed elevated levels of TOP-Flash and β-catenin protein caused by depletion of either TMEM79 or ZNRF3 (FIG. 3, Panel A and FIG. 10, Panel A), suggesting that autocrine Wnt production is required for enhanced Wnt signaling upon TMEM79 depletion as for that by ZNRF3/RNF43 depletion (Hao et al., 2012, Nature 485:195-200). Elevated levels of phosphorylated LRP6 and phosphorylated DVL (Dishevelled), which is a FZD downstream component, were observed in TMEM79 knockout (T79K0) or ZNRF3/RNF43 double knockout (ZRKO) cells (Jiang et al., 2015, Molecular cell 58:522-533), and IWP-2 suppressed elevated levels of both phosphoproteins (FIG. 3, Panel B and FIG. 10, Panel B). These results suggest that TMEM79, like ZNRF3, acts to downregulate Wnt responsiveness through FZD, which controls phosphorylation of both LRP6 and DVL (Gammons and Bienz, 2018, Current opinion in cell biology 51:42-49; MacDonald et al., 2009, Developmental cell 17:9-26). Indeed levels of endogenous FZD5 proteins were increased in T79KO cells comparably as in ZRKO cells (FIG. 3, Panel C). Despite their similar activities, however, TMEM79 and ZNRF3 appear to act independently. Thus TMEM79 antagonized Wnt signaling in ZRKO cells, so did ZNRF3 in T79KO cells (FIG. 3, Panels D and E; FIG. 10, Panel C). Therefore TMEM79 and ZNRF3/RNF43 act on the common target FZD but in parallel pathways.

Our results suggest that the action site of TMEM79 is primarily at the ER. Immunostaining via confocal microscopy showed localization of endogenous TMEM79 at the ER predominantly and the lysosome to a lesser extent, but not at the Golgi or PM (FIGS. 4A-D), corroborating results from biochemical analyses. Immunofluorescence microscopy analysis of endogenous TMEM79 and PM and organelle markers was performed in HEK293T cells. The nucleus was labeled by DAPI. Fluorescence intensity of TMEM79 and the PM or organelle marker was measured between the two arrowheads and plotted in FIGS. 4A-D. The same results were seen in HeLa cells.

Lysosomal inhibitor Bafilomycin A1 (Baf A1), but not proteasomal inhibitor MG132, resulted in elevated levels of both immature and matured forms of FZD5, suggesting lysosomal degradation of both FZD forms (FIG. 10, Panel F). Indeed degradation of matured FZD by ZNRF3/RNF43 is prevented by Baf A1 and is thus mediated by the lysosome (Koo et al., 2012, Nature 488:665-669). Noticeably Baf A1 blocked immature FZD5 degradation without increasing the level of matured FZD5 at the PM (FIG. 10, Panel F), consistent with the notion that TMEM79 directs FZD from the ER to the lysosome. Baf A1 apparently also prevented lysosomal degradation of TMEM79 (FIG. 10, Panel F), which is found in the lysosome and probably chaperones FZD towards degradation there.

TMEM79 is Associated with USP8 and Inhibits its Deubiquitination of FZD

TMEM79 does not have any known functional motif. We performed tandem-affinity purification for TMEM79-interacting proteins (FIG. 11, Panel A). Mass spectrometry revealed a dozen proteins, among which is USP8 (also called UBPy). Of interest, USP8 has been implicated in deubiquitination of various transmembrane proteins including Fzd and Smo in Drosophila (Mukai et al., 2010, The EMBO journal 29:2114-2125; Xia et al., 2012, PLOS biology 10: e1001238), and EGFR (epidermal growth factor receptor) and other receptor tyrosine kinases (RTKs), thereby enhancing signaling by Wnt, Shh, and RTKs (Alwan and van Leeuwen, 2007, The Journal of biological chemistry 282: 1658-1669; Mizuno et al., 2005, Molecular biology of the cell 16, 5163-5174; Niendorf et al., 2007, Molecular and cellular biology 27, 5029-5039; Row et al., 2006, The Journal of biological chemistry 281, 12618-12624). Oncogenic activation of USP8 by mutations or chromosomal translocation underlie Cushing's Disease (caused by a pituitary adenoma (Ma et al., 2015, Cell research 25:306-317; Reincke et al., 2015, Nature genetics 47, 31-38) and leukemia (Janssen et al., 1998), respectively, and USP8 overexpression is associated with poor prognosis of lung and cervical cancer cases (Kim et al., 2017, Pathology international 67:292-301; Yan et al., 2018, Medical science monitor: international medical journal of experimental and clinical research 24:4934-4943). But regulation of USP8 and its substrate specificity is not well understood. USP8C, which represents the C-terminal half of the protein containing the deubiquitination enzyme (DUB) domain (FIG. 5, Panel A) and is presumably a mutationally activated form generated in Cushing's Disease (Reincke et al., 2015, Nature genetics 47, 31-38), induced the TOP-Flash reporter, and this induction was inhibited by IWP-2 (FIG. 5, Panel B), consistent with USP8 acting through FZD stabilization (Mukai et al., 2010, The EMBO journal 29:2114-2125). Importantly TMEM79 inhibited activation of TOP-Flash by USP8C (FIG. 5, Panel B). USP8C, but not with USP8N, the N-terminal half of USP8, co-IPed TMEM79 (FIG. 5, Panel C). The ability of TMEM79 or its mutant forms to down-regulate the FZD5 level at the PM was fully correlated with its capacity to associate with USP8. Thus only TMEM79AC was able to interact with USP8C and was functionally active as the full length TMEM79, while other truncation mutants were each inactive, including TMEM79 (1-280) encoded by the Tmem 79ma allele (FIG. 1, Panel D, FIG. 5, Panels D and E), which therefore represent a functional null. Our mutational-functional analysis thus corroborates genetic studies showing matted and Tmem79 KO mice with essentially indistinguishable phenotypes (Emrick et al., 2018, Proceedings of the National Academy of Sciences of the United States of America 115: E12091-E12100) and is consistent with sequence conservation pattern among Tmem 79 proteins among species.

USP8 KO HEK293T cells exhibited Wnt responsiveness but at a significantly reduced level (FIG. 5, Panel F and FIG. 11, Panel B), consistent with USP8 promoting FZD deubiquitination and stability. Importantly, inhibition of the Wnt response by TMEM79, but not by ZNRF3, was abolished in USP8 KO cells (FIG. 5, Panel F and FIG. 11, Panel C), demonstrating that TMEM79 acts strictly through USP8. USP8C promoted deubiquitination of both FZD5 and SMO as reported (Mukai et al., 2010, The EMBO journal 29:2114-2125; Xia et al., 2012, PLOS biology 10: e1001238), but TMEM79 blocked deubiquitination of FZD5, but not of SMO, by USP8C (FIG. 5, Panels H and I), demonstrating a stringent control of TMEM79 on USP8 specificity towards FZD, and corroborating TMEM79 specific binding to FZD but not SMO and inhibition of Wnt but not Shh signaling (FIG. 2, Panel C). Interestingly like TMEM79, USP8 or USP8C associated only with immature FZD5 (FIG. 5, Panel G), consistent with predominant localizations of USP8 at endomembranes that resemble ER and intracellular vesicles (Mukai et al., 2010, The EMBO journal 29:2114-2125; Niendorf et al., 2007, Molecular and cellular biology 27, 5029-5039; Xia et al., 2012, PLOS biology 10: e1001238). It thus appears that immature FZD is a primary substrate of USP8. FZD-USP8 interaction was unaffected by TMEM79 overexpression or KO (FIG. 11, Panels D and E), ruling out a scenario in which TMEM79 competes with FZD for USP8-binding. Conversely TMEM79-USP8 interaction was unaffected in FZD KO cells in which all 10 FZD genes have been deleted (Eubelen et al., 2018, Science 361) (FIG. 11, Panel F). These data suggest that the FZD-USP8-TMEM79 complex, in which USP8 action on FZD is inhibited, assembles likely through multivalent interactions.

Tmem79 Inhibition of Wnt Signaling is Required for Vertebrate Embryogenesis

Figure 6A:
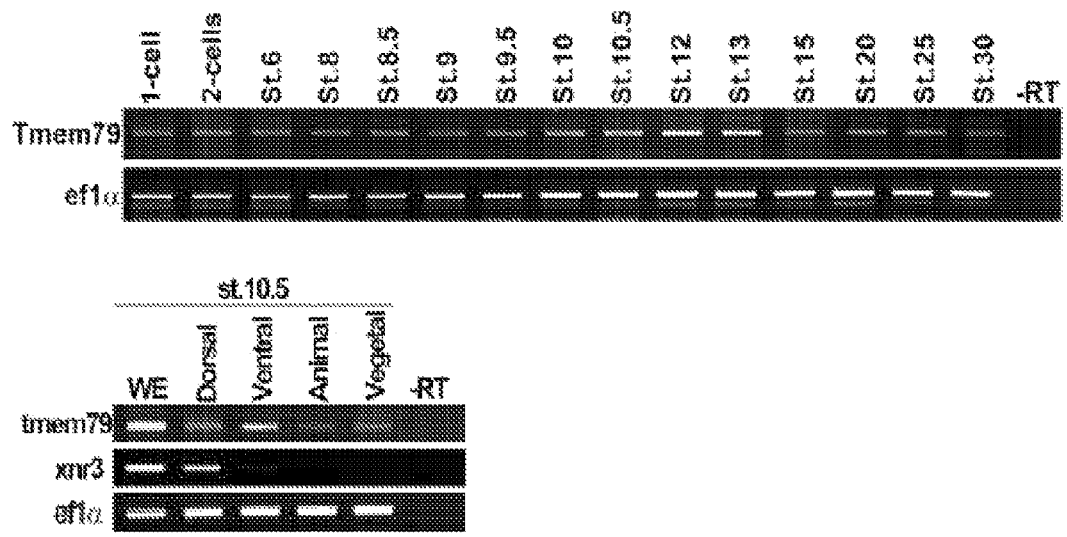
FIGS. 6A-6F show that Tmem79 is required for anterior development in xenopus embryos. In Panel A, RT-PCR shows that Tmem79 was expressed throughout Xenopus embryogenesis from the 1-cell stage to stage 26 (top) and broadly in early gastrula embryos (stage 10.5) in animal, vegetal, dorsal, and ventral regions. (bottom).-RT: without reverse transcriptase. Panel B is a whole-mount in situ hybridization of Tmem79, showing dorsal view at 4-cell (a1), and stage 6.5, 8 and 9 (a2 to a4), bisected and lateral views at stage 9 (a5 and a6), vegetal and lateral views at stage 10 (with the arrow pointing to Spemann's Organizer, a7 and a8). Panel C shows that dorsal injection of Tmem79 mRNA induced an enlarged head, with some embryos exhibiting spina bifida, a possible consequence of perturbed FZD planar polarity signaling. Panel D shows dorso-animal injection of Tmem79MO caused anterior deficiency, which was rescued by co-injection of mouse Tmem79 mRNA or Usp8MO or β-cateninMO. Note that Usp8MO or β-cateninMO alone caused enlarged head, consistent with that little or no Wnt signaling promoted anterior development. COMO, Control Morpholino. Panel E shows that Tmem79MO reduced neural plate formation (Sox2+), and expanded epidermal region (cytokeratin+). These reciprocal changes were rescued by Tmem79 mRNA or Usp8MO. Panel F shows that neural induction by Noggin in animal pole explants was abolished by Tmem79MO, but was rescued by Tmem79 mRNA or Usp8MO or β-cateninMO. Efl α, a loading control. Pan-neural, anterior and mid brain markers are assayed, as is an epidermal marker (keratin).
Figure 6B:
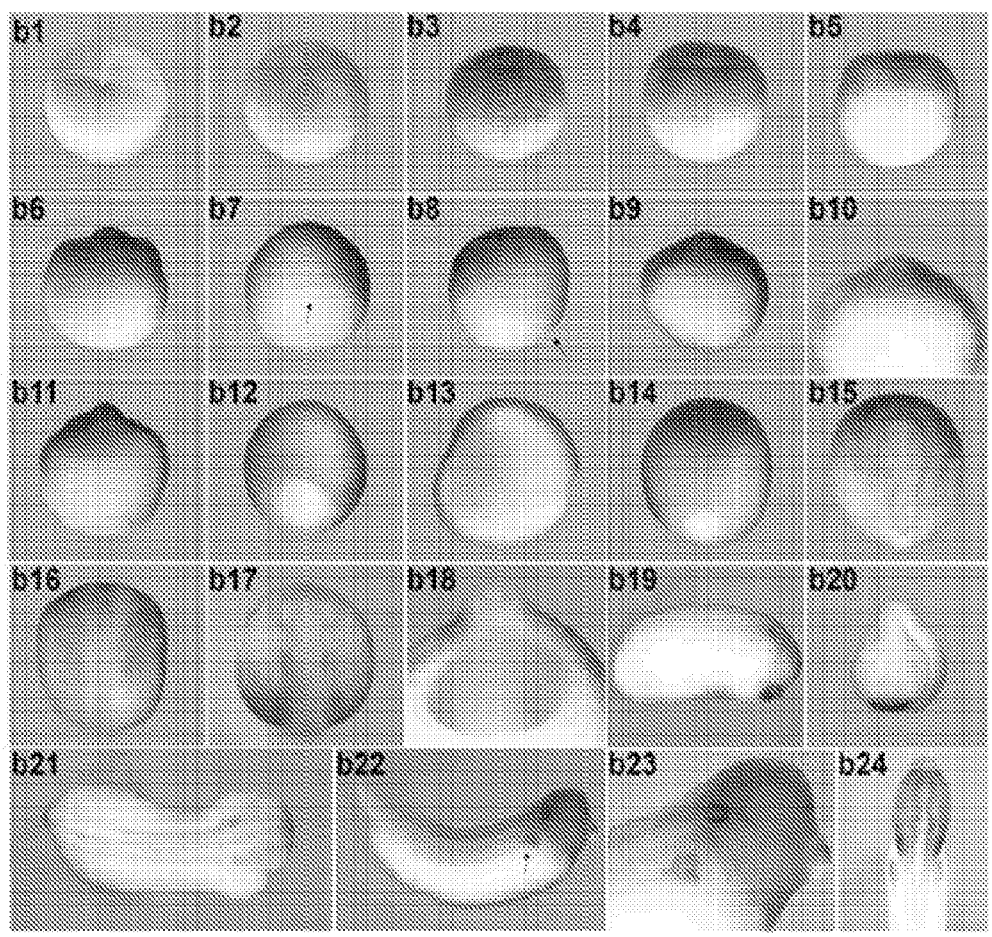
Figure 6C:
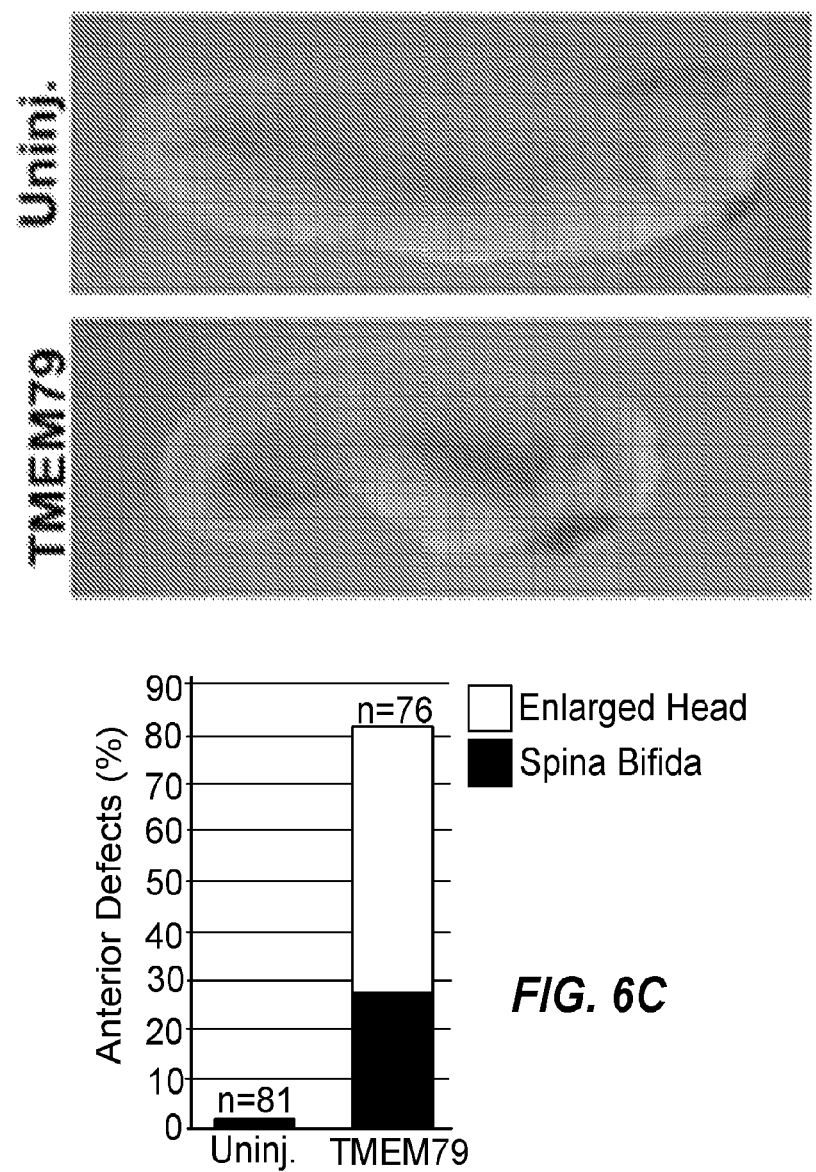
Figure 6D:
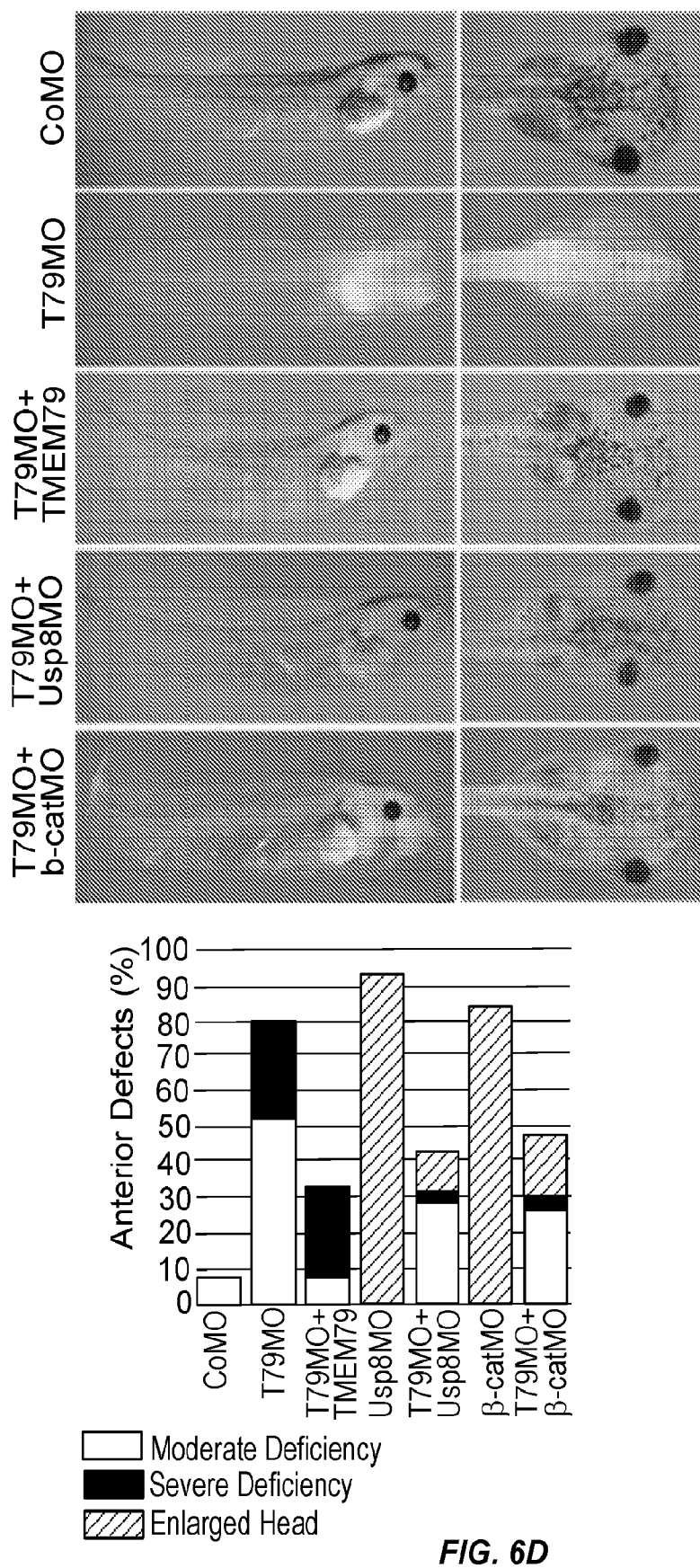
Figure 6E:
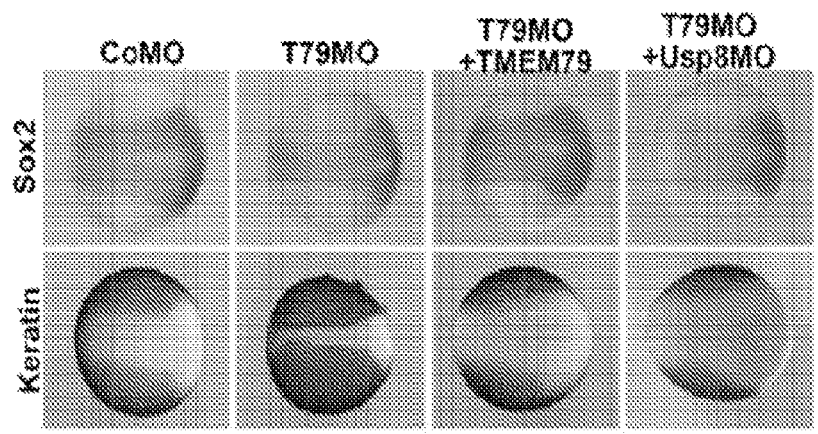
Figure 6F:
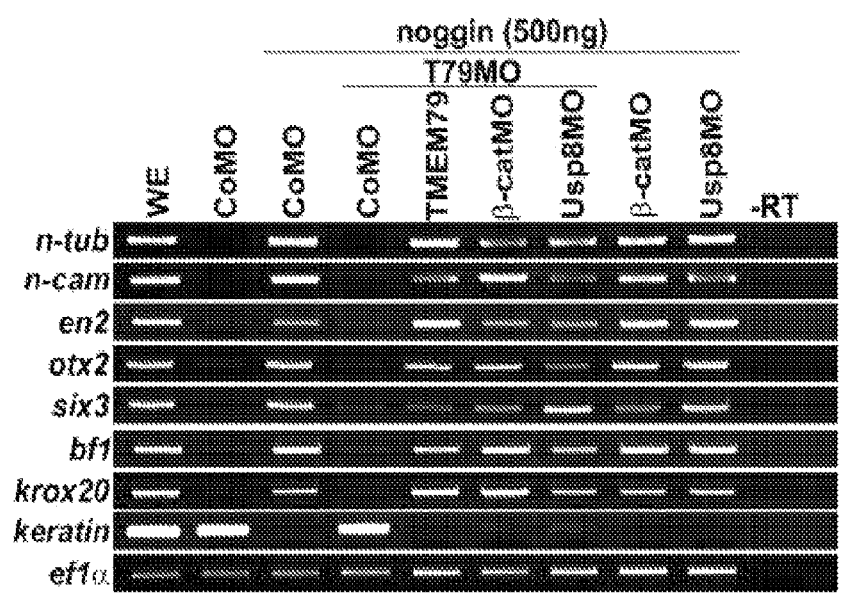

The Tmem 79 gene is conserved in vertebrates only (FIG. 8). We examined Tmem79 functions in *Xenopus*, which like other vertebrates employ Wnt signaling for anteroposterior patterning during early embryogenesis (De Robertis and Kuroda, 2004, Annual review of cell and developmental biology 20:285-308; Niehrs, 2004, Nature reviews Genetics 5:425-434). Tmem79 is expressed maternally and broadly throughout embryogenesis, including in the animal, vegetal, dorsal, and ventral regions in early gastrula (stage 10.5) embryos (FIG. 6, Panel A). Whole mount in situ hybridization showed Tmem79 expression in animal blastomeres at the 4-cell stage and stage 6.5, and broadly in the animal region in blastula (stages 8.5 and 9.5) and early gastrula embryos (stages 10 and 10.5), showed strong expression in naïve ectoderm (FIG. 6, Panel B). Tmem79 was detected in the animal pole at 4-cell stage and in the naïve ectoderm at blastula stages (a1 to a6). At the early gastrula stage Tmem79 was detected in dorsal and ventral sides covering the entire animal part of the embryo (a7 and a8). Bisected views at stage 10.5 with an enlarged animal-pole view showed strong expression in naïve ectoderm (a9 and a10). Bisected and lateral views at stage 11 (a11 and a12) and stage 12 (a13 and a14), and anterior and dorsal views at stage 20 (a15 to a18) are also shown. Note that Tmem79 is detected in the anterior neural plate initially, but is later excluded from nervous system primordia (a18 to a21). Lateral and anterior views at the tail bud stage indicate Tmem79 expression in the cement gland (a19, a20 and a22 to a24). A lateral view with an enlarged view and ventral view at the early tadpole stage indicate Tmem79 expression in the primitive kidney (arrow, a 22) and otic vesicle (a22 to a24). The apparent lack of hybridization signal in the vegetal pole and derived tissues may be technical due to yolk. During neurula stages Tmem79 was detected in the anterior neural plate initially but is later excluded from CNS primordia (FIG. 6, Panel B). Thus, Tmem79 exhibits dynamic expression during *Xenopus* early embryogenesis, in particular during neural induction and AP patterning. Injection of Tmem79 mRNA dorsally resulted in an enlarged head (FIG. 6, Panel C and Table 2) indistinguishable from that caused by other Wnt antagonists (Glinka et al., 1998, Nature 391:357-362; Zhang et al., 2012, Cell 149:1565-1577). We generated an antisense morpholino oligonucleotide (MO) against Tmem79, Tmem79-MO, which blocked synthesis of *Xenopus* Tmem 79 protein specifically (FIG. 12, Panel B). Depletion of Tmem79 from the animal region/naïve ectoderm by Tmem79-MO resulted in deficient anterior development (FIG. 6, Panel D and FIG. 12, Panel D; Tables 3 and 4), and reduced neural plate formation (FIG. 6, Panel E; Table 5), while gene expression in the dorsal Organizer was unaffected (FIG. 23, Panel E; Table 6). While animal pole explants from control embryos (or embryos injected with a control MO) were neutralized by BMP antagonist Noggin ex vivo, those from Tmem79-MO injected embryos failed to do so but instead adopted an epidermal fate in the presence of Noggin (FIG. 6, Panel F), suggesting that Tmem79 in naïve ectoderm is required for anterior and neural fate determination. Note that these phenotypes caused by Tmem79 depletion were rescued by TMEM79 mRNA, demonstrating the MO specificity, and more importantly, were rescued by co-depletion of β-catenin or Usp8 through respective MOs (Heasman et al., 2000, Developmental biology 222:124-134) (FIG. 6F and S6C). Thus Tmem79 has an obligatory function as a Wnt antagonist for vertebrate early embryogenesis, fully corroborating biochemical data in human cells.

TABLE 2

Statistics for FIG. 6, Panel C

| | n | Normal | % of embryos Spina Bifida | Enlarged Head |
|---|---|---|---|---|
| GFP | 76 | 97.6 | 2.4 | 0.0 |
| TMEM79 | 93 | 18.2 | 27.3 | 54.5 |

TABLE 3

Statistics for FIG. 6, Panel D

| | n | Normal | Moderate Deficiency | Severe Deficiency | Enlarged Head |
|---|---|---|---|---|---|
| Co MO | 64 | 92.2 | 7.8 | 0.0 | 0.0 |
| Tmem79 MO | 79 | 20.0 | 52.2 | 27.8 | 0.0 |
| Tmem79 MO + TMEM79 | 72 | 66.7 | 6.9 | 26.4 | 0.0 |
| Usp8 MO | 48 | 6.8 | 0.0 | 0.0 | 93.2 |
| Tmem79 MO + Usp8 MO | 83 | 56.4 | 28.0 | 3.1 | 12.6 |
| β-catenin MO | 34 | 15.8 | 0.0 | 0.0 | 84.2 |
| Tmem79MO + β-catenin MO | 29 | 52.1 | 25.2 | 4.1 | 18.6 |

TABLE 4

Statistics for FIG. 12, Panel D

| | | n | % of embryos Normal | Affected |
|---|---|---|---|---|
| XAG | Co MO | 35 | 91.4 | 8.6 |
| | Tmem79 MO | 34 | 64.7 | 35.3 |
| | Tmem79 MO + TMEM79 | 32 | 81.3 | 18.8 |
| BF1 | Co MO | 51 | 88.2 | 11.8 |
| | Tmem79 MO | 44 | 27.3 | 72.7 |
| | Tmem79 MO + TMEM79 | 50 | 68.0 | 32.0 |
| EN2 | Co MO | 35 | 95.4 | 4.6 |
| | Tmem79 MO | 34 | 54.7 | 45.3 |
| | Tmem79 MO + TMEM79 | 32 | 71.3 | 28.8 |
| Krox 20 | CO MO | 45 | 91.1 | 8.9 |
| | Tmem79 MO | 67 | 32.8 | 67.2 |
| | Tmem79 MO + TMEM79 | 50 | 66.0 | 34.0 |
| n-tub | Co MO | 34 | 94.1 | 5.9 |
| | Tmem79 MO | 38 | 52.6 | 47.4 |
| | Tmem79 MO + TMEM79 | 36 | 83.3 | 16.7 |

TABLE 5

Statistics for FIG. 6, Panel E

| | Sox2 % of embryos | | | Keratin % of embryos | | |
|---|---|---|---|---|---|---|
| | n | Normal | Reduced | n | Normal | Reduced |
| Co MO | 34 | 85.7 | 14.3 | 49 | 89.5 | 10.5 |
| Tmem79 MO | 42 | 31.8 | 68.2 | 58 | 38.9 | 61.1 |
| Tmem79 MO + TMEM79 | 53 | 73.9 | 26.1 | 45 | 76.0 | 24.0 |

TABLE 6

Statistics for FIG. 12, Panel E

| | | n | % of embryos Normal | Affected |
|---|---|---|---|---|
| Gsc | Co MO | 38 | 88.9 | 11.1 |
| | Tmem79 MO | 39 | 89.5 | 10.5 |
| | Tmem79 MO + TMEM79 | 38 | 88.9 | 11.1 |
| Chd | Co MO | 39 | 89.5 | 10.5 |
| | Tmem79 MO | 42 | 81.8 | 18.2 |
| | Tmem79 MO + TMEM79 | 37 | 82.4 | 17.6 |
| Dkk | Co MO | 36 | 100.0 | 0.0 |
| | Tmem79 MO | 40 | 90.0 | 10.0 |
| | Tmem79 MO + TMEM79 | 39 | 84.2 | 15.8 |
| Lim1 | Co MO | 36 | 100.0 | 0.0 |
| | Tmem79 MO | 40 | 90.0 | 10.0 |
| | Tmem79 MO + TMEM79 | 39 | 84.2 | 15.8 |
| Xnr3 | Co MO | 17 | 100.0 | 0.0 |
| | Tmem79 MO | 20 | 90.0 | 10.0 |
| | Tmem79 MO + TMEM79 | 16 | 87.5 | 12.5 |
| xNot | Co MO | 29 | 90.0 | 10.0 |
| | Tmem79 MO | 40 | 85.0 | 15.0 |
| | Tmem79 MO + TMEM79 | 39 | 78.9 | 21.1 |

Figure 7:
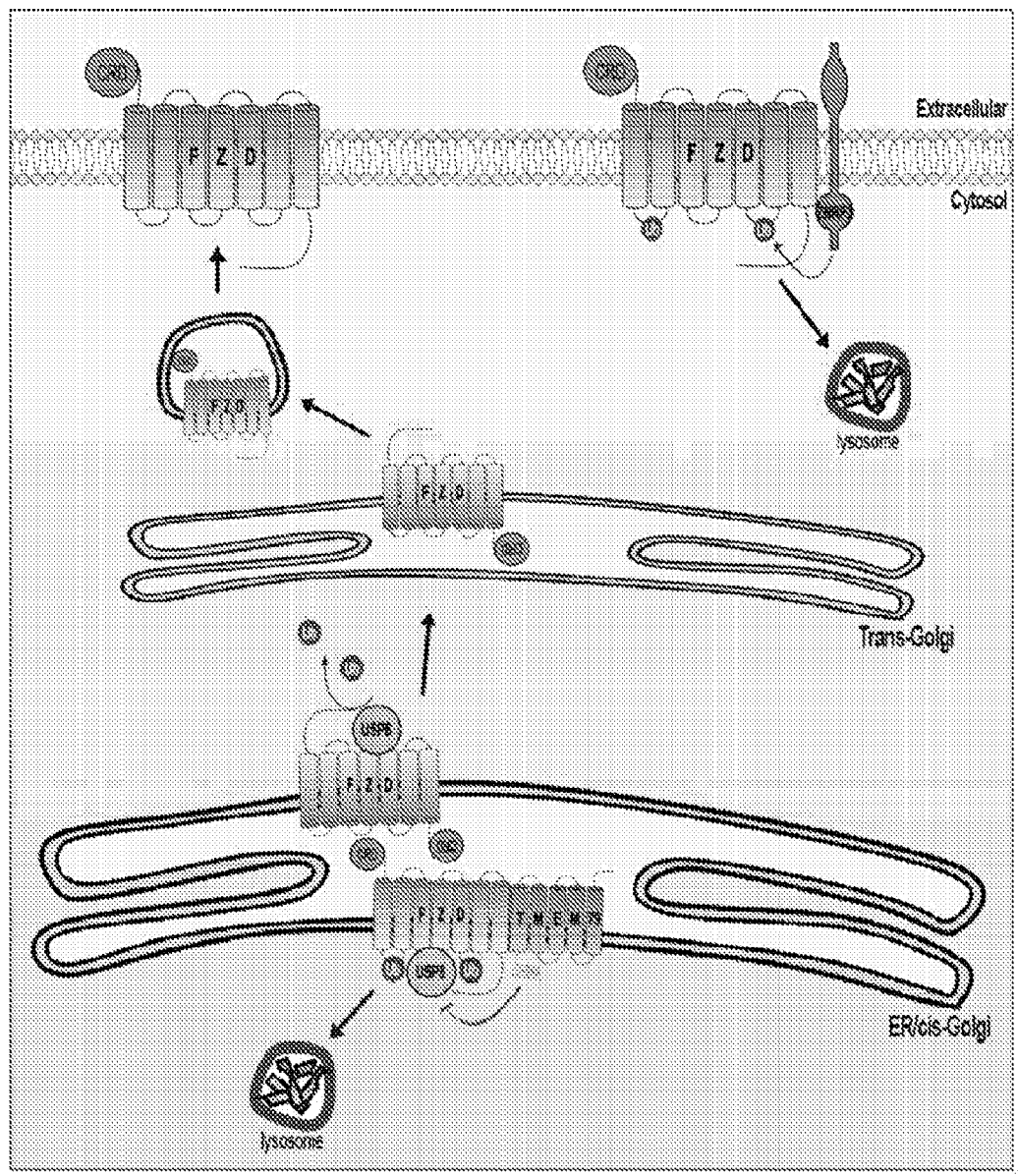
FIG. 7 is a working model of FZD regulation by USP8 and TMEM79.

We have provided compelling evidence for an unrecognized FZD degradation pathway that involves ER-resident protein TMEM79 and has critical implications to vertebrate development and human pathogenesis. TMEM79 acts as a specific antagonist of Wnt/FZD signaling by complexing with FZD during biogenesis, thereby targeting FZD in the ER for lysosomal destruction (FIG. 7). Briefly, FIG. 7 shows that FZD is synthesized in the ER and is ubiquininated (by an unknown E3 ligase). FZD deubiquitination by USP8 permits FZD to traffic to Golgi and PM ultimately. ER-resident TMEM79 acts by complexing with FZD and USP8 and inhibiting USP8 deubiquitination of FZD, thereby targeting ubiquitinated FZD in the ER to the lysosome for degradation. ZNRF3 promotes FZD ubiquitination at the PM, leading to endosomal-lysosomal degradation of FZD. These two complementary mechanisms ensure a rate-limiting amount of FZD at the PM.

Example 2. In Vivo Amelioration of AD Phenotypes

PORCUPINE (PORCN) is an ER acyl-transferase specifically required for biogenesis and secretion of all WNT proteins. A diverse group of small molecules, referred to as IWP2, LGK974, and C59, each binds to and inhibits PORCN, thereby blocking WNT production. LGK974 and C59 are in phase I clinical trials for cancers that rely on autocrine or local WNT production (Proffitt, K. D., et al., Cancer Res, 2013, 73 (2): p. 502-7; Jiang, X., et al., Proc Natl Acad Sci USA, 2013. 110 (31): p. 12649-54). We showed that PORCN inhibition suppresses elevated WNT signaling caused by TMEM79 knockdown In HEK293T cells. To confirm that topical application of inhibitors of porcn in the skin suppresses AD phenotypes in Tmem79 ma mice, we use LGK974, a newer and more potent PORCN inhibitor with enhanced drug properties that is in phase I trials (Jiang, X., et al., Proc Natl Acad Sci USA, 2013. 110 (31): p. 12649-54) and is commercially available. A cream is formulated containing LGK974 (1.5 mM) including N-methyl-pyrrolidone (6.25%), isopropyl myristate (6.25%), and petroleum jelly (87.5%) (vol/vol), which provide enhanced compound solubility, stability, and permeability through the skin, and are commonly used in topical applications of bioactive drugs such as antibiotics, steroids, and anti-inflammatory compounds (Barry, B. W., D. Southwell, and R. Woodford, J Invest Dermatol, 1984, 82 (1): p. 49-52; Lamberti, J.C.B.A., AR), Long acting injectable parasiticidal composition and the process for its preparation, in U.S. Pat. No. 6,054,140, B.S.A., April 2000; Hedstrom, K. L., et al., Proc Natl Acad Sci USA, 2014. 111 (6): p. 2325-30; Apelian, H. M. C., NJ), Coffin-beach, David (Kendall Park, NJ), Huq, Abu S. (Plainsboro, NJ), Pharmaceutical composition of florfenicol, in U.S. Pat. No. 5,082,862, S. Corporation, January 1992; Malook, S. U. N., GB5), Boon, Peter F. G. (Horsham, GB2), Morgan, James P. (Navan, IE), Method of reducing the swelling or pain associated with antibiotics compositions, in U.S. Pat. No. 4,772,460, L. Bimeda Research and Development, September 1988.). A control cream is made that contains the same ingredients without LGK974.

ma ma mice in C57BL/6 have been used as a reliable model for human AD and will be housed under the SPF (specific pathogen-free) conditions at BCH, and analyzed at 2, 4, and 8 weeks for skin phenotypes as described (Sasaki, T., et al., J Allergy Clin Immunol, 132 (5): p. 1111-1120 e4, 2013; Saunders, S. P., et al., J Allergy Clin Immunol, 132 (5): p. 1121-9, 2013). AD phenotypes in ma ma mice are observable at as early as 1-week, such as acanthosis with leukocyte infiltration in histopathology, and enhanced transepidermal water loss (TEWL) as a result of skin barrier defects (Kelleher, M., et al., J Allergy Clin Immunol, 2015. 135 (4): p. 930-5 e1); scratching behavior caused by itching becomes more prominent at 4- and 8-weeks (Sasaki, T., et al., J Allergy Clin Immunol, 132 (5): p. 1111-1120 e4, 2013; Saunders, S. P., et al., J Allergy Clin Immunol, 132 (5): p. 1121-9, 2013). Compared to WT mice, ma ma mice also spontaneously have elevated serum IgE levels; when challenged with house dust mite (HDM) allergen through cutaneous exposure, ma ma mice exhibit further up-regulation of TEWL and HDM-specific IgE, IgG1, and IgG2a while WT mice do not (Sasaki, T., et al., J Allergy Clin Immunol, 132 (5): p. 1111-1120 e4, 2013; Saunders, S. P., et al., J Allergy Clin Immunol, 132 (5): p. 1121-9, 2013). Therefore skin histopathology, measurements of TEWL and serum IgE, and scratching behavior under SPF conditions, and additional measurements of HDM-specific IgE and IgGs under allergen exposure conditions, will provide rich data to evaluate AD phenotypes of ma ma mice at 3 different mouse age groups, which correspond approximately to pediatric and young adult patients. Cream (LGK974 or control) is applied twice daily to the skin of ma mice at weaning (3-week) for 1 week, and the skin and other measurements are examined. We collect data from 6 to 8 mice per group in 2 or more separate experiments, and the Student t test or 2-way ANOVA will be used to determine statistical differences between groups as described (Oyoshi, M. K., N. Venturelli, and R. S. Geha, J Allergy Clin Immunol, 2016; Oyoshi, M. K., N. Ramesh, and R. S. Geha, J Invest Dermatol, 2012. 132 (4): p. 1299-301; Oyoshi, M. K., et al., Proc Natl Acad Sci USA, 2012. 109 (13): p. 4992-7; Oyoshi, M. K., J. Y. Wang, and R. S. Geha, J Allergy Clin Immunol, 2011. 128 (4): p. 890-892 e3; Jin, H., et al., J Clin Invest, 2009. 119 (1): p. 47-60).

We anticipate that AD phenotypes of ma mice are ameliorated by LG974 at the appropriate dose, which will be determined empirically using escalating doses.

To control for the effectiveness of the testing compound, we employ a transgenic TOP-GAL line (generated by Dr. Elaine Fuchs and available from JAX, strain/004623) (DasGupta R; Fuchs E, Development, 1999, 126 (20): 4557-68), which harbors an in vivo WNT-responsive reporter. +/+; TOP-Gal, and ma ma; TOP-GAL mice will be generated through appropriate crosses, and the level of WNT signaling in the skin will be monitored. We anticipate that (i) ma ma; TOP-Gal mice will exhibit higher levels of TOP-GAL activities in the skin than WT mice, supporting our hypothesis that elevated WNT signaling underlies AD phenotypes; and (ii) the testing compound that reduces TOP-GAL levels in the skin will have ameliorating effect on AD phenotypes in ma/ma; TOP-GAL mice.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of treating a subject who has atopic dermatitis (AD), the method comprising administering a therapeutically effective amount of a porcupine (PORCN) inhibitor to a subject in need thereof, wherein the porcupine (PORCN) inhibitor is selected from the group consisting of LGK974; C59; ETC-159; ETC-131; and IWP compounds.

2. The method of claim 1, wherein the subject has a mutation in TMEM79.

3. A method of treating a subject who has atopic dermatitis (AD), the method comprising:
obtaining a sample comprising genomic DNA from the subject;
performing an assay to determine presence or absence of a mutation in TMEM79 in the genomic DNA from the subject; and
administering a therapeutically effective amount of a porcupine (PORCN) inhibitor to a subject who has a mutation in TMEM79 that is associated with AD, wherein the porcupine (PORCN) inhibitor is selected from the group consisting of LGK974; C59; ETC-159; ETC-131; and IWP compounds.

4. The method of claim 3, wherein performing an assay to determine the presence or absence of a mutation in TMEM79 comprises performing an assay to detect the presence of a mutation known to be associated with AD.

5. The method of claim 3, wherein performing an assay to determine the presence or absence of a mutation in TMEM79 comprises:
sequencing all or part of a TMEM79 gene;
comparing the sequence to a reference sequence in an unaffected subject;

identifying a sequence that differs from the reference sequence as a mutation;

determining whether the mutation has an effect on TMEM79 activity or expression; and identifying a subject who has a sequence that differs from the reference sequence and reduces TMEM79 activity or expression as having a mutation in TMEM79 that is associated with AD.

6. A method of treating a subject who has atopic dermatitis (AD), the method comprising:

obtaining a sample comprising affected skin cells from the subject;

performing an assay to determine a level or activity of TMEM79 in the cells from the subject;

detecting a reduction in level or activity of TMEM79 in the sample; and administering a therapeutically effective amount of a porcupine (PORCN) inhibitor to a subject who has a reduced level or activity of TMEM79 in the sample, wherein the porcupine (PORCN) inhibitor is selected from the group consisting of LGK974; C59; ETC-159; ETC-131; and IWP compounds.

7. The method of claim 1, wherein the subject does not have a mutation in a filaggrin gene (FLG).

8. The method of claim 1, wherein the IWP compounds are selected from the group consisting of IWP-2, IWP-L6, GNF6231, Compound 4:

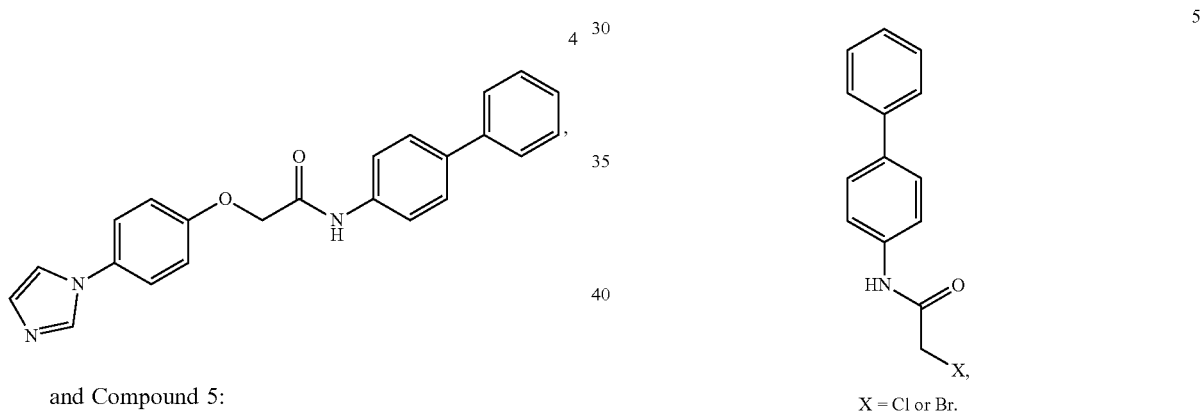

and Compound 5:

9. The method of claim 2, wherein the mutation in TMEM79 is one of SEQ ID NOs: 1 to 18.

10. The method of claim 9, wherein the mutation that is associated with AD is a methionine at rs6684514.

11. The method of claim 3, wherein performing an assay to determine presence or absence of a mutation in TMEM79 comprises performing an assay to detect the presence of a mutation, wherein the mutation is one of SEQ ID NOs: 1 to 18.

12. The method of claim 4, wherein the mutation known to be associated with AD is a methionine at rs6684514.

13. The method of claim 3, wherein the IWP compounds are selected from the group consisting of IWP-2, IWP-L6, GNF6231, Compound 4:

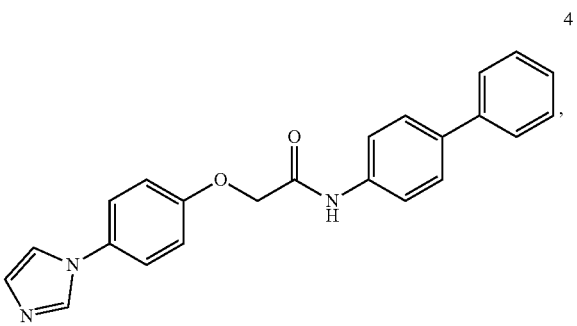 [SMILES: O=C(COc1ccc(-n2ccnc2)cc1)Nc1ccc(-c2ccccc2)cc1]

and Compound 5:

14. The method of claim 3, wherein the subject does not have a mutation in FLG.

15. The method of claim 6, wherein the IWP compounds are selected from the group consisting of IWP-2, IWP-L6, GNF6231, Compound 4:

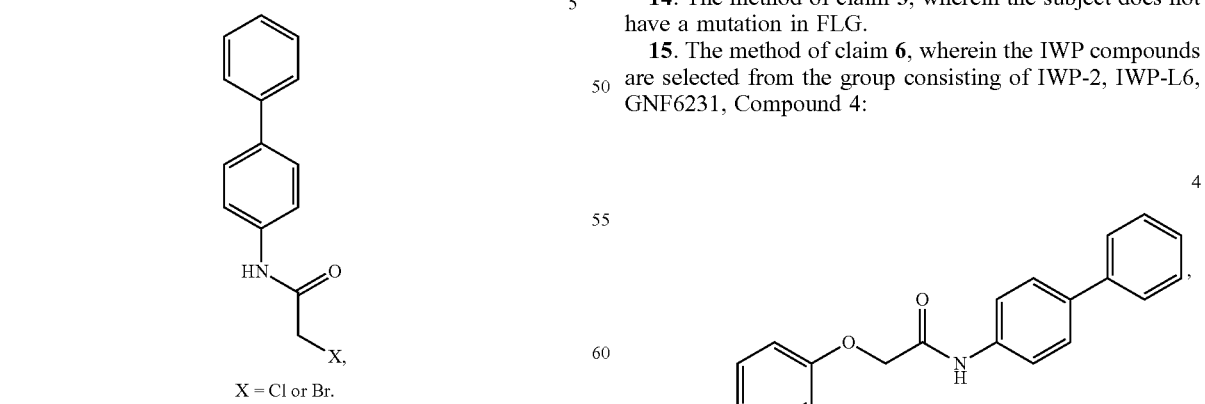

and Compound 5:
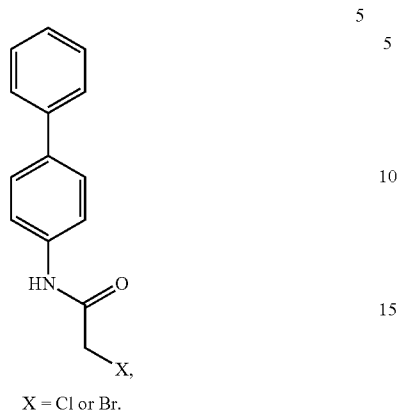
X = Cl or Br.
16. The method of claim 6, wherein the subject does not have a mutation in FLG.
* * * * *

SEQUENCE LISTING

```
<160> NUMBER OF SEQ ID NOS: 43

<210> SEQ ID NO 1
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 1
gcggcagccc caagaagacc ttatcntgcg ctgtgaggca ggcgagggcg a              51

<210> SEQ ID NO 2
<211> LENGTH: 51
<212> TYPE: DNA
<213> ORGANISM: Homo sapiens
<220> FEATURE:
<221> NAME/KEY: misc_feature
<222> LOCATION: (26)..(26)
```

<223> OTHER INFORMATION: n is a, c, g, or t

<400> SEQUENCE: 2
acttaccaag ctagaggagc tgcccnaaga cgatgccaac ctgctgcctg a        51

<210> SEQ ID NO 3
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 3
tcattctctt cccttgccta ctatangggg catatgcctt cctgccgttt g        51

<210> SEQ ID NO 4
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 4
cctccgacta caggccccgc ccctgnggct gagcctctcc gccctcgccc t        51

<210> SEQ ID NO 5
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 5
ctggactacc cggaccacgc ccgctnggcc tccgactaca ggccccgccc c        51

<210> SEQ ID NO 6
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 6
agtcggtcca gctctttatt ctctanttct tcaacctggc cgtgctttcc a        51

<210> SEQ ID NO 7
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 7
acggcgggag gtggagatcc accggngata tgtgcccag tcggtccagc t         51

<210> SEQ ID NO 8
<211> LENGTH: 51

```
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 8
ccgtgccttc gtgcctattg acctanagtg cattgagcgg cagccccaag a         51

<210> SEQ ID NO 9
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 9
tgcgggagct gtggagaccg tgagtngcta agggctgtgg cctccgtggg a         51

<210> SEQ ID NO 10
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 10
ccggcgatat gtggcccagt cggtcnagct ctttattctc tacttcttca a         51

<210> SEQ ID NO 11
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 11
ctgtgaggca ggcgagggcg agtgcngaac cttcatgccc ccccgggtca c         51

<210> SEQ ID NO 12
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 12
ctgccaccga gagccgcctg gactanccgg accacgcccg ctcggcctcc g         51

<210> SEQ ID NO 13
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 13
```
tgatgctcgg ccctttccaa ggaaantttc acatgcactt tttgtttgtt t        51

<210> SEQ ID NO 14
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 14
tgttccctgc aggatgacat gacctngtgg tagatcccag aactgaggcc c        51

<210> SEQ ID NO 15
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 15
gtggacttga ggagggcagg gcctgnctgg tgtggggagc aggaggattt c        51

<210> SEQ ID NO 16
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 16
ggacttcgcc cccaggccta ggaccncggt gggtggaacc ctgctactgc c        51

<210> SEQ ID NO 17
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 17 tctgcccca gcttactgcc tcttgngccc ttccctgcc ttttctgacc c         51

<210> SEQ ID NO 18
<211> LENGTH: 51
<212> TYPE: DNA
<213> ORGANISM: Homo sapiens
<220> FEATURE:
<221> NAME/KEY: misc_feature
<222> LOCATION: (26)..(26)
<223> OTHER INFORMATION: n is a, c, g, or t

<400> SEQUENCE: 18
gtaagtgagg ctgccacctt gccctngggg actggccctc agcccagtgc t        51

<210> SEQ ID NO 19
<211> LENGTH: 21
<212> TYPE: RNA
<213> ORGANISM: Homo sapiens

<400> SEQUENCE: 19

-continued caggcgaggg cgagugccga a                                              21

<210> SEQ ID NO 20
<211> LENGTH: 19
<212> TYPE: RNA
<213> ORGANISM: Homo sapiens

<400> SEQUENCE: 20
ccaugaguuc ccgccugau                                                 19

<210> SEQ ID NO 21
<211> LENGTH: 21
<212> TYPE: RNA
<213> ORGANISM: Homo sapiens

<400> SEQUENCE: 21
cggcugcuac acugaggacu a                                              21

<210> SEQ ID NO 22
<211> LENGTH: 20
<212> TYPE: DNA
<213> ORGANISM: Xenopus laevis

<400> SEQUENCE: 22
gggaggtgac cattcaccag                                                20

<210> SEQ ID NO 23
<211> LENGTH: 20
<212> TYPE: DNA
<213> ORGANISM: Xenopus laevis

<400> SEQUENCE: 23
agaccgtagc caaatccacg                                                20

<210> SEQ ID NO 24
<211> LENGTH: 25
<212> TYPE: DNA
<213> ORGANISM: Xenopus laevis

<400> SEQUENCE: 24
tctggagcaa ccattggact tctgt                                          25

<210> SEQ ID NO 25
<211> LENGTH: 25
<212> TYPE: DNA
<213> ORGANISM: Xenopus laevis

<400> SEQUENCE: 25
tgtttcagga gacaccattg gactt                                          25

<210> SEQ ID NO 26
<211> LENGTH: 25
<212> TYPE: DNA
<213> ORGANISM: Xenopus laevis

<400> SEQUENCE: 26
gctgcaaatt ctcctctctt atcaa                                          25

<210> SEQ ID NO 27
<211> LENGTH: 394
<212> TYPE: PRT
<213> ORGANISM: Homo sapiens

<400> SEQUENCE: 27

```
Met Thr Glu Gln Glu Thr Leu Ala Leu Leu Glu Val Lys Arg Ser Asp
1               5                   10                  15

Ser Pro Glu Lys Ser Pro Gln Ala Leu Val Pro Asn Gly Arg Gln
            20                  25                  30

Pro Glu Gly Glu Gly Ala Glu Ser Pro Gly Ala Glu Ser Leu Arg
        35                  40                  45

Val Gly Ser Ser Ala Gly Ser Pro Thr Ala Ile Glu Gly Ala Glu Asp
    50                  55                  60

Gly Leu Asp Ser Thr Val Ser Glu Ala Ala Thr Leu Pro Trp Gly Thr
65                  70                  75                  80

Gly Pro Gln Pro Ser Ala Pro Phe Pro Asp Pro Gly Trp Arg Asp
                85                  90                  95

Ile Glu Pro Glu Pro Pro Glu Ser Glu Pro Leu Thr Lys Leu Glu Glu
                100                 105                 110

Leu Pro Glu Asp Asp Ala Asn Leu Leu Pro Glu Lys Ala Ala Arg Ala
            115                 120                 125

Phe Val Pro Ile Asp Leu Gln Cys Ile Glu Arg Gln Pro Gln Glu Asp
            130                 135                 140

Leu Ile Val Arg Cys Glu Ala Gly Glu Gly Glu Cys Arg Thr Phe Met
145                 150                 155                 160

Pro Pro Arg Val Thr His Pro Asp Pro Thr Glu Arg Lys Trp Ala Glu
                165                 170                 175

Ala Val Val Arg Pro Pro Gly Cys Ser Cys Gly Gly Cys Gly Ser Cys
            180                 185                 190

Gly Asp Arg Glu Trp Leu Arg Ala Val Ala Ser Val Gly Ala Ala Leu
        195                 200                 205

Ile Leu Phe Pro Cys Leu Leu Tyr Gly Ala Tyr Ala Phe Leu Pro Phe
    210                 215                 220

Asp Val Pro Arg Leu Pro Thr Met Ser Ser Arg Leu Ile Tyr Thr Leu
225                 230                 235                 240

Arg Cys Gly Val Phe Ala Thr Phe Pro Ile Val Leu Gly Ile Leu Val
                245                 250                 255

Tyr Gly Leu Ser Leu Leu Cys Phe Ser Ala Leu Arg Pro Phe Gly Glu
            260                 265                 270

Pro Arg Arg Glu Val Glu Ile His Arg Arg Tyr Val Ala Gln Ser Val
        275                 280                 285

Gln Leu Phe Ile Leu Tyr Phe Phe Asn Leu Ala Val Leu Ser Thr Tyr
    290                 295                 300

Leu Pro Gln Asp Thr Leu Lys Leu Leu Pro Leu Leu Thr Gly Leu Phe
305                 310                 315                 320

Ala Val Ser Arg Leu Ile Tyr Trp Leu Thr Phe Ala Val Gly Arg Ser
                325                 330                 335

Phe Arg Gly Phe Gly Tyr Gly Leu Thr Phe Leu Pro Leu Leu Ser Met
            340                 345                 350

Leu Met Trp Asn Leu Tyr Tyr Met Phe Val Val Glu Pro Glu Arg Met
        355                 360                 365

Leu Thr Ala Thr Glu Ser Arg Leu Asp Tyr Pro Asp His Ala Arg Ser
    370                 375                 380

Ala Ser Asp Tyr Arg Pro Arg Pro Trp Gly
385                 390
```

<210> SEQ ID NO 28

```
<211> LENGTH: 394
<212> TYPE: PRT
<213> ORGANISM: Pan troglodytes

<400> SEQUENCE: 28

Met Thr Glu Gln Glu Thr Leu Ala Leu Leu Glu Val Lys Arg Ser Asp
1               5                   10                  15

Ser Pro Glu Lys Ser Ser Pro Gln Ala Leu Val Pro Asn Gly Arg Gln
            20                  25                  30

Pro Glu Gly Glu Gly Gly Ala Glu Ser Pro Gly Ala Glu Ser Leu Arg
        35                  40                  45

Val Gly Ser Ser Ala Gly Ser Pro Thr Ala Ile Glu Gly Ala Glu Asp
    50                  55                  60

Gly Leu Asp Ser Thr Val Ser Glu Ala Ala Thr Leu Pro Trp Gly Thr
65                  70                  75                  80

Gly Pro Gln Pro Ser Ala Pro Phe Pro Asp Pro Pro Gly Trp Arg Asp
                85                  90                  95

Ile Glu Pro Glu Pro Pro Glu Ser Glu Pro Leu Thr Lys Leu Glu Glu
            100                 105                 110

Leu Pro Glu Asp Asp Ala Asn Leu Leu Pro Glu Lys Ala Ala Arg Ala
        115                 120                 125

Phe Val Pro Ile Asp Leu Gln Cys Ile Glu Arg Gln Pro Gln Glu Asp
    130                 135                 140

Leu Ile Val Arg Cys Glu Ala Gly Gly Glu Cys Arg Thr Phe Met
145                 150                 155                 160

Pro Pro Arg Val Ile His Pro Asp Pro Thr Glu Arg Lys Trp Ala Glu
                165                 170                 175

Ala Val Val Arg Pro Pro Gly Cys Ser Cys Gly Gly Cys Gly Ser Cys
            180                 185                 190

Gly Asp Arg Glu Trp Leu Arg Ala Val Ala Ser Val Gly Ala Ala Leu
        195                 200                 205

Ile Leu Phe Pro Cys Leu Leu Tyr Gly Ala Tyr Ala Phe Leu Pro Phe
    210                 215                 220

Asp Val Pro Arg Leu Pro Thr Met Ser Ser Arg Leu Ile Tyr Thr Leu
225                 230                 235                 240

Arg Cys Gly Val Phe Ala Thr Phe Pro Ile Val Leu Gly Ile Leu Val
                245                 250                 255

Tyr Gly Leu Ser Leu Leu Cys Phe Ser Ala Leu Arg Pro Phe Gly Glu
            260                 265                 270

Pro Arg Arg Glu Val Glu Ile His Arg Arg Tyr Val Ala Gln Ser Val
        275                 280                 285

Gln Leu Phe Ile Leu Tyr Phe Phe Asn Leu Ala Val Leu Ser Thr Tyr
    290                 295                 300

Leu Pro Gln Asp Thr Leu Lys Leu Leu Pro Leu Leu Thr Gly Leu Phe
305                 310                 315                 320

Ala Val Ser Arg Leu Ile Tyr Trp Leu Thr Phe Ala Val Gly Arg Ser
                325                 330                 335

Phe Arg Gly Phe Gly Tyr Gly Leu Thr Phe Leu Pro Leu Leu Ser Met
            340                 345                 350

Leu Met Trp Asn Leu Tyr Tyr Met Phe Val Val Glu Pro Glu Arg Met
        355                 360                 365

Leu Thr Ala Thr Glu Ser Arg Leu Asp Tyr Pro Asp His Ala Arg Ser
    370                 375                 380

Ala Ser Asp Tyr Arg Pro Arg Pro Trp Gly
```

385    390

<210> SEQ ID NO 29
<211> LENGTH: 391
<212> TYPE: PRT
<213> ORGANISM: Rattus norvegicus

<400> SEQUENCE: 29

Met Thr Glu Pro Glu Thr Leu Ala Leu Leu Asp Met Lys Asp Thr Glu
1               5                   10                  15

Ile Ser Glu Lys Ser Pro Pro Gln Ala Ser Val Leu Gln Pro Glu Glu
            20                  25                  30

Glu Gly Gly Thr Glu Ser Pro Gly Ala Glu Ser Leu Arg Val Gly Ser
        35                  40                  45

Ser Val Gly Ser Pro Thr Val Arg Glu Gly Pro Glu Asp Gly Pro Asp
    50                  55                  60

Ser Thr Ile Ser Glu Ala Ala Thr Leu Pro Trp Gly Thr Asp Pro His
65                  70                  75                  80

Pro Ser Ala Pro Leu Pro Asp Pro Pro Gly Trp Arg Asp Ile Gly Pro
                85                  90                  95

Glu Leu Leu Glu Ser Glu Ala Pro Ile Lys Ser Glu Glu Pro Leu Lys
            100                 105                 110

Glu Asp Ala Asn Leu Leu Pro Glu Lys Thr Val Arg Ala Phe Val Pro
        115                 120                 125

Ile Asp Leu Gln Cys Ile Glu Arg Lys Pro Gln Glu Glu Arg Ile Lys
130                 135                 140

His Arg Glu Ala Gly Pro Gly Glu Leu Arg Asn Phe Leu Pro Ala Arg
145                 150                 155                 160

Leu Ser His Pro Glu Pro Pro Glu Arg Lys Trp Ala Glu Ala Val Val
                165                 170                 175

Arg Pro Pro Gly Arg Ser Cys Gly Gly Cys Gly Ser Cys Gly Gly Arg
            180                 185                 190

Glu Ala Leu Arg Ala Val Ala Ser Val Val Ala Ala Leu Ile Phe Phe
        195                 200                 205

Pro Cys Leu Leu Tyr Gly Ala Tyr Ala Phe Leu Pro Phe Asp Ala Pro
210                 215                 220

Arg Leu Pro Thr Met Ser Ser Arg Leu Val Tyr Thr Leu Arg Cys Gly
225                 230                 235                 240

Val Phe Ala Thr Phe Pro Ile Val Leu Gly Leu Leu Val Tyr Gly Leu
                245                 250                 255

Ser Leu Leu Cys Phe Ser Ala Leu Arg Pro Phe Gly Glu Pro Arg Arg
            260                 265                 270

Glu Val Glu Ile His Arg Gln Tyr Val Ala Gln Ser Val Gln Leu Phe
        275                 280                 285

Ile Leu Tyr Phe Phe Asn Leu Ala Val Leu Ser Thr Tyr Leu Pro Gln
290                 295                 300

Asp Thr Leu Lys Leu Leu Pro Leu Leu Thr Gly Leu Phe Ala Ile Ser
305                 310                 315                 320

Arg Leu Ile Tyr Trp Leu Thr Phe Ala Val Gly Arg Ser Phe Arg Gly
                325                 330                 335

Phe Gly Tyr Gly Leu Thr Phe Leu Pro Leu Leu Ala Met Leu Val Trp
            340                 345                 350

Asn Leu Tyr Tyr Met Phe Val Val Glu Pro Glu Arg Met Leu Ser Ala
        355                 360                 365

Ser Glu Ser Arg Leu Asp Tyr Pro Asp His Val Arg Ser Val Ser Asp
370                 375                 380

Tyr Arg Pro Arg Ser Trp Gly
385                 390

<210> SEQ ID NO 30
<211> LENGTH: 391
<212> TYPE: PRT
<213> ORGANISM: Mus musculus

<400> SEQUENCE: 30

Met Thr Glu Pro Glu Thr Leu Ala Leu Leu Asp Met Lys Glu Pro Glu
1               5                   10                  15

Thr Pro Glu Lys Ser Pro Gln Ala Leu Val Leu Gln Ser Glu Glu
            20                  25                  30

Glu Gly Gly Thr Glu Ser Pro Gly Thr Glu Ser Leu Arg Val Gly Ser
            35                  40                  45

Ser Val Gly Ser Pro Ile Val Arg Glu Gly Pro Glu Asp Gly Pro Asp
50                  55                  60

Ser Thr Ile Ser Glu Ala Ala Thr Leu Pro Trp Gly Thr Asp Pro His
65                  70                  75                  80

Pro Ser Ala Pro Leu Pro Asp Pro Pro Gly Trp Arg Asp Ile Glu Pro
                85                  90                  95

Glu Pro Leu Glu Ser Glu Ala Pro Thr Lys Ser Glu Glu Pro Phe Lys
            100                 105                 110

Glu Asp Ala Asn Leu Leu Pro Glu Lys Thr Val Arg Ala Phe Val Pro
        115                 120                 125

Ile Asp Leu Gln Cys Ile Glu Arg Lys Pro Gln Glu Glu Arg Ile Leu
130                 135                 140

His Arg Asp Ala Gly Pro Gly Glu Leu Arg Asn Phe Leu Pro Ala Arg
145                 150                 155                 160

Leu Ser His Pro Glu Pro Pro Glu Arg Lys Trp Ala Glu Ala Val Val
                165                 170                 175

Arg Pro Pro Gly Arg Ser Cys Gly Cys Gly Ser Cys Gly Gly Arg
            180                 185                 190

Glu Ala Leu Arg Ala Val Ala Ser Val Val Ala Ala Leu Ile Phe Phe
        195                 200                 205

Pro Cys Leu Leu Tyr Gly Ala Tyr Ala Phe Leu Pro Phe Asp Ala Pro
210                 215                 220

Arg Leu Pro Thr Met Ser Ser Arg Leu Val Tyr Thr Leu Arg Cys Gly
225                 230                 235                 240

Val Phe Ala Thr Phe Pro Ile Val Leu Gly Leu Leu Val Tyr Gly Leu
                245                 250                 255

Ser Leu Leu Cys Phe Ser Ala Leu Arg Pro Phe Gly Glu Pro Arg Arg
            260                 265                 270

Glu Val Glu Ile His Arg Gln Tyr Val Ala Gln Ser Val Gln Leu Phe
        275                 280                 285

Ile Leu Tyr Phe Phe Asn Leu Ala Val Leu Ser Thr Tyr Leu Pro Gln
290                 295                 300

Asp Thr Leu Lys Leu Leu Pro Leu Leu Thr Gly Leu Phe Ala Ile Ser
305                 310                 315                 320

Arg Leu Ile Tyr Trp Leu Thr Phe Ala Val Gly Arg Ser Phe Arg Gly
                325                 330                 335

Phe Gly Tyr Gly Leu Thr Phe Leu Pro Leu Leu Ala Met Leu Val Trp
            340                 345                 350

```
Asn Leu Tyr Tyr Met Phe Val Val Glu Pro Glu Arg Met Leu Thr Ala
            355                 360                 365

Ser Glu Ser Arg Leu Asp Tyr Pro Asp His Ala Arg Ser Val Ser Asp
    370                 375                 380

Tyr Arg Pro Arg Ser Trp Gly
385                 390

<210> SEQ ID NO 31
<211> LENGTH: 381
<212> TYPE: PRT
<213> ORGANISM: Gallus gallus
<220> FEATURE:
<221> NAME/KEY: misc_feature
<222> LOCATION: (221)..(221)
<223> OTHER INFORMATION: Xaa can be any naturally occurring amino acid

<400> SEQUENCE: 31

Met Ala Ala Ala Asp Pro Thr Leu Pro Pro Glu Glu Val Ala Leu Leu
1               5                   10                  15

Glu Leu Gly Lys Ala Ala Pro Pro Asp Glu Asp Pro Ala Pro Asp
            20                  25                  30

Asp Gly Arg Gly Asp Pro Asp Ala Thr Leu Leu Trp Asp Gln Arg Gln
            35                  40                  45

His Gly Thr Gln Gly Gln Pro Glu Pro Thr Asp Thr Lys Arg Arg Ser
    50                  55                  60

Ser Pro Glu Gly Ala His Asp Asp Pro Lys Glu Gly Thr Pro Ala Cys
65                  70                  75                  80

Pro Pro Pro Glu Ala Asp Gly Glu Glu Asp Pro Gly Leu Pro Val Met
                85                  90                  95

Ala Asp His Val Phe Val Pro Ile Asp Leu His Cys Ile Glu Arg Thr
            100                 105                 110

Pro Ala Glu Gln Arg Lys Gln Gln Pro Thr Arg Ser Pro Arg Arg Arg
        115                 120                 125

Ala Gly Arg Ala Val Leu Pro Pro Gly Thr Asp Pro Thr Ala Ser Ser
    130                 135                 140

Gln Ser Arg Pro Ser Ser Leu Val Ala Pro His Ser Thr Gly Gly Leu
145                 150                 155                 160

Leu Gly Phe Glu Arg Gln Ala Ala Lys Leu Pro Ala Glu Gly Pro Arg
                165                 170                 175

Cys Pro Cys Ala Glu Val Cys Ser Thr Ala Ala Leu Lys Ala Val Ala
            180                 185                 190

Ser Val Val Gly Ala Leu Phe Leu Cys Pro Cys Leu Ile Tyr Gly Ala
        195                 200                 205

Tyr Val Phe Leu Pro Phe Asp Ala Pro Leu Leu Pro Xaa Ile Ser Thr
    210                 215                 220

Arg Leu Val Tyr Thr Leu Arg Cys Ala Ala Phe Ala Thr Val Pro Ile
225                 230                 235                 240

Val Leu Gly Met Ile Ile Ser Gly Ile Ser Arg Leu Cys Ser Ala Ala
                245                 250                 255

Leu Glu Pro Phe Gly Lys Leu Gln Arg Glu Val Glu Ile His Arg Thr
            260                 265                 270

Tyr Val Ser Gln Ser Val His Leu Phe Ile Leu Tyr Phe Phe Asn Met
        275                 280                 285

Ala Val Leu Ala Thr Tyr Leu Gln Gln Glu Leu Leu Lys Leu Ile Pro
    290                 295                 300
```

Leu Leu Thr Gly Leu Phe Ala Ile Ser Arg Leu Thr Tyr Trp Leu Ser
305                 310                 315                 320

Tyr Ala Phe Gly Arg Ser Phe Arg Ala Phe Gly Phe Ala Met Thr Phe
            325                 330                 335

Leu Pro Leu Val Ala Met Leu Leu Trp Asn Leu Tyr Ser Met Phe Val
        340                 345                 350

Leu Glu Pro Glu Asn Leu Leu Ala Met Ala Thr Ala Lys Pro Glu Glu
    355                 360                 365

Ser Ser Gln Gln Ser Arg Ala Arg Leu Arg Tyr Trp Gly
370                 375                 380

<210> SEQ ID NO 32
<211> LENGTH: 521
<212> TYPE: PRT
<213> ORGANISM: Xenopus laevis

<400> SEQUENCE: 32

Met Val Ala Pro Glu Ala Pro Glu Lys Gln Arg Asp Val Asp Asn Gly
1               5                   10                  15

Val Val Ser Glu Ser Ala Glu Leu Pro Lys Val Thr Ala Gln Pro Asn
            20                  25                  30

Met Asn Val Asp Gln Ala Arg Pro Ile Lys Ser Asn Arg Pro Leu Asp
        35                  40                  45

His Gly Glu Asp Val Asp Arg Lys Pro Thr Leu Asp Pro Gln Asp Ser
    50                  55                  60

Pro Glu Arg Lys Lys Leu Lys Ser Val Gly Phe Cys Glu Val Asp Ile
65                  70                  75                  80

Ser Thr Thr Leu Leu Gln Asn Gly Ala Ser Glu Asp Gln Ser Cys Asp
                85                  90                  95

Arg Ser Leu Asp Ser Gly Ser Leu Asn Asn Asp Lys Asp Ile Ala Met
            100                 105                 110

Asp Leu Pro Glu Ser Lys Asp Gln Ser Ser Pro Ile Thr Thr Gly Leu
        115                 120                 125

Pro Leu Gln Cys Arg Lys His Ser Val Pro Thr Cys Leu Cys Lys Glu
    130                 135                 140

Cys Val Glu Asn Tyr Leu Asn Leu Asn Glu Ser Val Glu Glu Pro His
145                 150                 155                 160

Val Glu Glu Gly Gly Glu Asp Gly Gly Asp Leu Leu Cys Ala Asp Ser
                165                 170                 175

Leu Ser Leu Asp Ser Asn Leu Val Lys Ser Arg Ser Gly Ser Glu Arg
            180                 185                 190

Ser Arg Ser Leu Val Leu Leu Glu Glu Asp Asp Tyr Gly Pro Arg Tyr
        195                 200                 205

Glu Asp Ala Gln Val Thr Leu Pro Tyr Pro Asp Tyr Ser Lys Pro Pro
    210                 215                 220

Asp His Ile Thr Arg Leu Ser Asn Ala Gly Leu Phe Glu Pro Cys Glu
225                 230                 235                 240

Asp Gln Ala Glu Lys Arg Glu Ala Glu Asp Leu Thr Gly Glu Glu Asp
                245                 250                 255

Cys Glu Ser Gln Lys Val Ile Pro Ala Phe Phe Ile Gln His Glu Arg
            260                 265                 270

Gln Glu Ser Phe Ser Gly Ser Ser His Lys Lys Val Gln Leu Glu Met
        275                 280                 285

Cys Glu His Leu Asp Ser Asp Lys Arg Glu Ala Glu Val Glu Pro Leu
    290                 295                 300

```
Leu Arg Ser His Arg Ser Arg Ser Val Asp Val Glu Ser Met Gln Gly
305                 310                 315                 320

Gly Pro Gln Ile Cys Gln Cys Asp Arg Asn Tyr Leu Lys Val Val Gly
            325                 330                 335

Ser Phe Leu Leu Ser Leu Phe Val Phe Pro Ala Phe Leu Cys Leu Ser
        340                 345                 350

Tyr Thr Phe Leu Pro Phe Asp Ala Pro Leu Met Pro Asp Ile Thr Thr
    355                 360                 365

Arg Leu Val Tyr Thr Leu Arg Cys Ala Ala Phe Ala Ser Phe Pro Thr
370                 375                 380

Ile Leu Gly Val Ile Ile His Gly Ile Ser Arg Leu Cys Ala Ser Ser
385                 390                 395                 400

Phe Asp Pro Phe Lys Pro Lys Val Arg Glu Val Thr Ile His Gln Arg
            405                 410                 415

Phe Val Lys Gln Ser Thr Phe Leu Phe Val Leu Tyr Phe Phe Asn Leu
        420                 425                 430

Cys Val Leu Val Thr Tyr Met Pro Gln Asn Tyr Leu Lys Leu Ile Pro
    435                 440                 445

Leu Leu Thr Cys Leu Phe Ala Leu Ser Gln Leu Ile Tyr Trp Leu Ser
450                 455                 460

Phe Ala Val Gly Arg Ser Phe Arg Gly Phe Gly Tyr Gly Leu Ala Phe
465                 470                 475                 480

Leu Pro Leu Val Ser Met Leu Ala Cys Asn Leu Cys Phe Met Phe Leu
            485                 490                 495

Val Asp Pro Glu Arg Met Ile Tyr Leu Gly Leu Pro Arg Lys Glu Asp
        500                 505                 510

Ser Lys Ser Lys Ala Asp Ala Leu Gly
    515                 520

<210> SEQ ID NO 33
<211> LENGTH: 406
<212> TYPE: PRT
<213> ORGANISM: Danio rerio

<400> SEQUENCE: 33

Met Asp Lys Gly Pro Pro Gly Pro Val Ala Val Pro Gln Thr Pro Gln
1               5                   10                  15

Trp Val Ala Glu Val Asp Lys Leu Thr Lys Asp Val Asn Ser Thr Glu
            20                  25                  30

Asp Glu Glu Glu Pro Met Lys Ser Ala Lys Met Glu Pro Ser Thr Leu
        35                  40                  45

Pro Trp Pro Glu Asn Lys Pro Glu Thr Gln Ile Pro Pro Val Arg Asp
    50                  55                  60

Gly Glu Thr Thr Ser Val Arg Ser Asp Cys Thr Ser Leu Arg Gly Gly
65                  70                  75                  80

Leu Ser Arg Thr Glu Ser Glu Arg Glu Glu Phe Met Met Lys Glu Lys
            85                  90                  95

Arg Lys Thr Gly Glu Asp Trp Arg Glu Met Glu Ala Gly Lys Glu Glu
        100                 105                 110

Arg Val Ser Asp Ile Gly Leu Arg Asn Gly Val Lys Ser Thr Leu Thr
    115                 120                 125

Glu Ile Glu Leu Glu Glu Val Asn Thr Met Pro Glu Asn Ala Ala Arg
130                 135                 140

Val Phe Ser Pro Ser Ile Thr Ile Leu Arg Ser Thr Ser Gln Gln Glu
```

```
                145                 150                 155                 160
Ala Ala Glu His Trp Arg Asp Gln Glu Glu Ala Arg Ser Pro Phe
                165                 170                 175

Leu Gly Ser His Gly Thr His Gly Thr Pro Leu Glu Glu Tyr Tyr Gln
                180                 185                 190

Asp Trp Pro Asp Thr His Arg Ser His Cys Cys Asn Cys Gly Cys Cys
                195                 200                 205

Asn Arg Asp Ala Leu Lys Leu Gly Ala Ser Met Phe Thr Ser Ala Leu
                210                 215                 220

Ile Phe Pro Leu Leu Val Trp Gly Gly Tyr Val Phe Leu Pro Phe Asp
225                 230                 235                 240

Ala Pro Leu Leu Asp Ser Ala Pro Leu Arg Leu Val Tyr Thr Leu Arg
                245                 250                 255

Cys Ser Val Phe Ala Val Ile Pro Ile Val Leu Gly Met Leu Val Leu
                260                 265                 270

Gly Val Ser Arg Leu Trp Tyr Arg Ser Leu Lys Pro Arg Phe Glu Gly
                275                 280                 285

Glu Lys Glu Val Lys Gln Val Ala Val His Gln Arg Tyr Val Glu Asp
                290                 295                 300

Ser Ile Ser Leu Phe Leu Leu Tyr Phe Leu Gln Leu Thr Val Met Ala
305                 310                 315                 320

Ala Tyr Leu Asn Gln Asp Leu Leu Lys Leu Ile Pro Leu Leu Thr Ile
                325                 330                 335

Val Phe Ala Phe Gly Arg Leu Leu Tyr Trp Val Ala Ala Ala Cys Gly
                340                 345                 350

Ser Ser Leu Arg Gly Val Gly Phe Gly Phe Ser Phe Leu Pro Met Leu
                355                 360                 365

Val Met Leu Val Ala Asn Ile Tyr Phe Ile Phe Leu Ser Glu Ser Ala
                370                 375                 380

Gly Ser Ile Phe Ala Pro Asn Ile Pro Asp Pro Pro Val Pro Ser Asn
385                 390                 395                 400

Lys Gln Arg Phe Trp Gly
                405

<210> SEQ ID NO 34
<211> LENGTH: 410
<212> TYPE: PRT
<213> ORGANISM: Latimeria chalumnae

<400> SEQUENCE: 34

Met Ser Ala Ser Glu Pro Leu Ala Thr Ser Lys Ala Ile Lys Asn Leu
1               5                   10                  15

Asp Gly Lys Lys Asp Leu Asn Asp Val Gly Glu Lys Ala Glu Asn Asp
                20                  25                  30

Leu Ile His Cys Ser Asn Thr Leu Glu Trp Ser Gly Thr Asn Pro Ala
                35                  40                  45

Ser Leu Cys Asp Asp Asp Lys Leu Asn Ser Gly Lys Val Leu Ala Asn
                50                  55                  60

Met Glu Pro Leu Pro Ala Ala Glu Glu Pro Ser Gly Leu Glu Lys
65                  70                  75                  80

Gly Glu Ser Phe Val Ala Asp Glu Gly Val Lys Asp Arg Pro Pro Ala
                85                  90                  95

Gln Asp Glu Asn Val Cys Gln Glu Leu Asp Lys Pro Leu Lys Ser Pro
                100                 105                 110
```

```
Ser His Asp Gly Glu Glu Asp Asn Val Met Pro Pro Ser Ala Ala Gln
            115                 120                 125

Val Phe Val Pro Ser Ile Arg Ile Val Pro His Ser Ala His Asn Pro
130                 135                 140

Asp Ala Lys Lys Ser Met Asp Leu Leu Glu Met His Glu Met Ile Ser
145                 150                 155                 160

Leu Glu Asn Glu Asn Gly Ile His Glu Arg Gln Pro Phe Leu Asn Ser
                165                 170                 175

Ser Gly Ala Gln Tyr Leu Ala His Asn Tyr Gly Pro Thr Gly Gly Asp
            180                 185                 190

Trp Pro Asp Pro Gly Asp Pro Gln Arg Arg Ser Gly Cys Ala Lys Cys
            195                 200                 205

Asp Cys Cys Thr Gly Gly Gly Leu Lys Trp Ile Ala Ser Leu Met Gly
210                 215                 220

Ala Leu Ile Ile Phe Pro Cys Phe Leu Tyr Gly Ala Tyr Val Phe Leu
225                 230                 235                 240

Pro Phe Asp Ala Pro Leu Met Thr Asp Met Gly Asn Arg Leu Val Tyr
                245                 250                 255

Thr Leu Arg Cys Gly Val Phe Gly Thr Phe Pro Ile Val Ile Gly Val
            260                 265                 270

Val Val Tyr Gly Ile Ala Arg Leu Cys Ser Ser Ser Val Asp Ser Phe
            275                 280                 285

Ser Glu Lys Leu Gln Glu Val Glu Ile His Arg His Tyr Val Thr Asp
290                 295                 300

Ser Ile His Gln Phe Val Leu Tyr Phe Phe Asn Val Ala Val Leu Ser
305                 310                 315                 320

Thr Tyr Leu Pro Gln Glu Phe Leu Lys Leu Ile Pro Leu Leu Thr Gly
                325                 330                 335

Leu Phe Ala Ile Ser Arg Leu Ile Tyr Trp Leu Ala Phe Ala Ile Gly
            340                 345                 350

Ser Ala Phe Arg Gly Phe Gly Phe Gly Leu Thr Phe Leu Pro Met Val
            355                 360                 365

Thr Met Met Leu Cys Asn Phe Tyr Phe Met Phe Val Leu Glu Pro Gly
370                 375                 380

Lys Met Leu Val Thr Glu Arg Asp Glu Ala Ala Lys Thr Glu Thr Pro
385                 390                 395                 400

Ala Pro Asn Ser Lys Leu His Phe Trp Gly
                405                 410

<210> SEQ ID NO 35
<211> LENGTH: 229
<212> TYPE: PRT
<213> ORGANISM: Mus musculus

<400> SEQUENCE: 35

Met Thr Gly Leu Gln Arg Gln Ala Gly Gly Val Ser Ser Leu His Cys
1               5                   10                  15

Thr Thr Trp Pro Tyr Leu Tyr Pro Thr Gln Ala Ser Phe Leu Gln Ser
                20                  25                  30

Arg Arg Lys Trp Phe Leu Cys Arg Ser Leu Ser Ser Gln Ala Val Phe
            35                  40                  45

Ser Gln Leu Val Gly Ile Pro Leu Leu Ser Pro Asp Arg His Pro Gly
        50                  55                  60

His Leu Lys Thr Glu Thr Lys Ile Gly Ser Met Ala Asp Leu Arg Gln
65                  70                  75                  80
```

```
Leu Met Asp Asn Glu Val Leu Met Ala Phe Thr Ser Tyr Ala Thr Ile
                85                  90                  95

Ile Leu Thr Lys Met Met Phe Met Ser Ser Ala Thr Ala Phe Gln Arg
            100                 105                 110

Ile Thr Asn Lys Val Phe Ala Asn Pro Glu Asp Cys Ala Gly Phe Gly
        115                 120                 125

Lys Gly Glu Asn Ala Lys Lys Phe Val Arg Thr Asp Glu Lys Val Glu
    130                 135                 140

Arg Val Arg Arg Ala His Leu Asn Asp Leu Glu Asn Ile Val Pro Phe
145                 150                 155                 160

Leu Gly Ile Gly Leu Leu Tyr Ser Leu Ser Gly Pro Asp Leu Ser Thr
                165                 170                 175

Ala Leu Met His Phe Arg Ile Phe Val Gly Ala Arg Ile Tyr His Thr
            180                 185                 190

Ile Ala Tyr Leu Thr Pro Leu Pro Gln Pro Asn Arg Gly Leu Ala Phe
        195                 200                 205

Phe Val Gly Tyr Gly Val Thr Leu Ser Met Ala Tyr Arg Leu Leu Arg
    210                 215                 220

Ser Arg Leu Tyr Leu
225

<210> SEQ ID NO 36
<211> LENGTH: 82
<212> TYPE: PRT
<213> ORGANISM: Mus musculus

<400> SEQUENCE: 36

Met Ala Gly Asp Ser Ser Leu Leu Ala Ala Val Ser Leu Leu Ser Ala
1               5                   10                  15

Cys Gln Gln Ser Tyr Phe Ala Trp Arg Val Gly Arg Ala Arg Leu Lys
                20                  25                  30

His Lys Ile Ala Pro Pro Ala Val Thr Gly Pro Leu Glu Phe Glu Arg
            35                  40                  45

Ile Phe Arg Ala Gln Gln Asn Ser Leu Glu Phe Tyr Pro Val Phe Ile
        50                  55                  60

Val Met Leu Trp Met Ala Gly Trp Tyr Phe Asn Gln Gly Ser Pro Val
65                  70                  75                  80

Ser Asp

<210> SEQ ID NO 37
<211> LENGTH: 153
<212> TYPE: PRT
<213> ORGANISM: Mus musculus

<400> SEQUENCE: 37

Met Ala Val Leu Ser Lys Glu Tyr Gly Phe Val Leu Leu Thr Gly Ala
1               5                   10                  15

Ala Ser Phe Val Met Val Leu His Leu Ala Ile Asn Val Gly Lys Ala
                20                  25                  30

Arg Lys Lys Tyr Lys Val Glu Tyr Pro Val Met Tyr Ser Thr Asp Pro
            35                  40                  45

Glu Asn Gly His Met Phe Asn Cys Ile Gln Arg Ala His Gln Asn Thr
        50                  55                  60

Leu Glu Val Tyr Pro Pro Phe Leu Phe Phe Leu Thr Val Gly Gly Val
65                  70                  75                  80
```

```
Tyr His Pro Arg Ile Ala Ser Gly Leu Gly Leu Ala Trp Ile Ile Gly
                85                  90                  95

Arg Val Leu Tyr Ala Tyr Gly Tyr Thr Gly Asp Pro Ser Lys Arg
            100                 105                 110

Tyr Arg Gly Ala Val Gly Ser Leu Ala Leu Phe Ala Leu Met Gly Thr
            115                 120                 125

Thr Val Cys Ser Ala Phe Gln His Leu Gly Trp Ile Arg Pro Gly Leu
            130                 135                 140

Gly Tyr Gly Ser Arg Ser Cys His His
145                 150
```

<210> SEQ ID NO 38
<211> LENGTH: 161
<212> TYPE: PRT
<213> ORGANISM: Mus musculus

<400> SEQUENCE: 38

```
Met Asp Gln Glu Ala Val Gly Asn Val Leu Leu Ala Leu Val Thr
1               5                   10                  15

Leu Ile Ser Val Val Gln Asn Ala Phe Phe Ala His Lys Val Glu His
                20                  25                  30

Glu Ser Lys Ala His Asn Gly Arg Ser Phe Gln Arg Thr Gly Thr Leu
            35                  40                  45

Ala Phe Glu Arg Val Tyr Thr Ala Asn Gln Asn Cys Val Asp Ala Tyr
50                  55                  60

Pro Thr Phe Leu Val Val Leu Trp Thr Ala Gly Leu Leu Cys Ser Gln
65                  70                  75                  80

Val Pro Ala Ala Phe Ala Gly Leu Met Tyr Leu Phe Val Arg Gln Lys
                85                  90                  95

Tyr Phe Val Gly Tyr Leu Gly Glu Arg Thr Gln Ser Thr Pro Gly Tyr
            100                 105                 110

Ile Phe Gly Lys Arg Ile Ile Leu Phe Leu Phe Leu Met Ser Phe Ala
            115                 120                 125

Gly Ile Leu Asn His Tyr Leu Ile Phe Phe Phe Gly Ser Asp Phe Glu
130                 135                 140

Asn Tyr Ile Arg Thr Val Ser Thr Thr Ile Ser Pro Leu Leu Leu Ile
145                 150                 155                 160

Pro
```

<210> SEQ ID NO 39
<211> LENGTH: 150
<212> TYPE: PRT
<213> ORGANISM: Mus musculus

<400> SEQUENCE: 39

```
Met Lys Asp Glu Val Ala Leu Leu Ala Thr Val Thr Leu Val Gly Val
1               5                   10                  15

Leu Leu Gln Ala Tyr Phe Ser Leu Gln Val Ile Ser Ala Arg Arg Ala
                20                  25                  30

Phe His Val Ser Pro Pro Leu Thr Ser Gly Pro Pro Glu Phe Glu Arg
            35                  40                  45

Val Phe Arg Ala Gln Val Asn Cys Ser Glu Tyr Phe Pro Leu Phe Leu
50                  55                  60

Ala Thr Leu Trp Val Ala Gly Ile Phe Phe His Glu Gly Ala Ala Ala
65                  70                  75                  80

Leu Cys Gly Leu Phe Tyr Leu Phe Ala Arg Leu Arg Tyr Phe Gln Gly
```

```
                    85                  90                  95
Tyr Ala Arg Ser Ala Gln Leu Arg Leu Thr Pro Leu Tyr Ala Ser Ala
                100                 105                 110

Arg Ala Leu Trp Leu Leu Val Ala Met Ala Ala Leu Gly Leu Leu Val
            115                 120                 125

His Phe Leu Pro Gly Thr Leu Arg Thr Ala Leu Phe Arg Trp Leu Gln
    130                 135                 140

Met Leu Leu Pro Met Ala
145                 150

<210> SEQ ID NO 40
<211> LENGTH: 70
<212> TYPE: DNA
<213> ORGANISM: Homo sapiens

<400> SEQUENCE: 40
aggatggtct agacagcaca gtaagtgagg ctgccacctt gccctggggg actggccctc      60
agcccagtgc                                                            70

<210> SEQ ID NO 41
<211> LENGTH: 62
<212> TYPE: DNA
<213> ORGANISM: Homo sapiens

<400> SEQUENCE: 41
aggatggtct agacagcaca gtaagtgagg ctgccctggg ggactggccc tcagcccagt      60
gc                                                                    62

<210> SEQ ID NO 42
<211> LENGTH: 70
<212> TYPE: DNA
<213> ORGANISM: Homo sapiens

<400> SEQUENCE: 42
gcttcagttc ctaaagaact ctacctcagt tcttcactaa aagaccttaa taagaagaca      60
gaagttaaac                                                            70

<210> SEQ ID NO 43
<211> LENGTH: 60
<212> TYPE: DNA
<213> ORGANISM: Homo sapiens

<400> SEQUENCE: 43
gcttcagttc ctaaagaact ctacctcaga aagaccttaa taagaagaca gaagttaaac      60
```